(12) United States Patent
Shinkai et al.

(10) Patent No.: US 9,618,790 B2
(45) Date of Patent: Apr. 11, 2017

(54) DISPLAY AND ILLUMINATION UNIT

(75) Inventors: Shogo Shinkai, Miyagi (JP); Kentaro Okuyama, Miyagi (JP); Akira Ebisui, Miyagi (JP); Harumi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 1292 days.

(21) Appl. No.: 13/450,106

(22) Filed: Apr. 18, 2012

(65) Prior Publication Data

US 2012/0274867 A1    Nov. 1, 2012

(30) Foreign Application Priority Data

Apr. 28, 2011    (JP) .................. 2011-102505

(51) Int. Cl.
| | |
|---|---|
| G02B 27/22 | (2006.01) |
| G02F 1/1335 | (2006.01) |
| G02F 1/1347 | (2006.01) |
| F21V 8/00 | (2006.01) |
| G02F 1/1334 | (2006.01) |

(52) U.S. Cl.
CPC ....... *G02F 1/133606* (2013.01); *G02B 6/005* (2013.01); *G02F 1/13476* (2013.01); *G02F 1/133615* (2013.01); *G02B 27/22* (2013.01); *G02F 1/1334* (2013.01); *G02F 2001/133626* (2013.01); *G02F 2203/62* (2013.01)

(58) Field of Classification Search
CPC .............. G02F 1/134363; G02B 27/2214
See application file for complete search history.

(56) References Cited

U.S. PATENT DOCUMENTS

| | | | |
|---|---|---|---|
| 7,967,494 B2* | 6/2011 | Chi ....................... | G02B 6/0036 349/65 |
| 8,274,556 B2* | 9/2012 | Cha .................... | G02B 27/2214 345/102 |
| 8,508,692 B2* | 8/2013 | Han .................. | G02F 1/133615 349/65 |
| 8,659,586 B2* | 2/2014 | Kadowaki .......... | G02B 27/2214 345/208 |
| 9,069,208 B2* | 6/2015 | Shinkai ................ | G02B 6/0036 |
| 2005/0002174 A1* | 1/2005 | Min ..................... | G02B 6/0038 362/609 |
| 2011/0001894 A1* | 1/2011 | Owaku ................. | G02F 1/1347 349/15 |
| 2011/0043715 A1* | 2/2011 | Ohyama ............ | G02B 27/2214 349/15 |

* cited by examiner

*Primary Examiner* — Dennis Y Kim
(74) *Attorney, Agent, or Firm* — K&L Gates LLP

(57) ABSTRACT

An illumination unit includes: a light modulation layer disposed in a gap between a first transparent substrate and a second transparent substrate, and exhibiting a scattering property or transparency with respect to light from a light source, depending on magnitude of an electric field; and an electrode generating an electric field in the light modulation layer, when a voltage is applied thereto, in which the light modulation layer generates a plurality of strip-like illumination light beams extending in a direction intersecting with a first end surface of the first or second transparent substrate with use of light from the light source, when an electric field for a three-dimensional display mode is applied from the electrode to the light modulation layer, and a light emission area per unit area of each of the strip-like illumination light beams varies with a distance from the light source.

16 Claims, 66 Drawing Sheets

32A 32A 32A 32A 32A 32A 32A 32A 32A 32A
(32c)(32a)(32b)(32c)(32a)(32b)(32c)(32a)(32b)(32c)

32A 32A 32A 32A 32A 32A 32A 32A 32A 32A
(32c)(32a)(32b)(32c)(32a)(32b)(32c)(32a)(32b)(32c)

20 μm

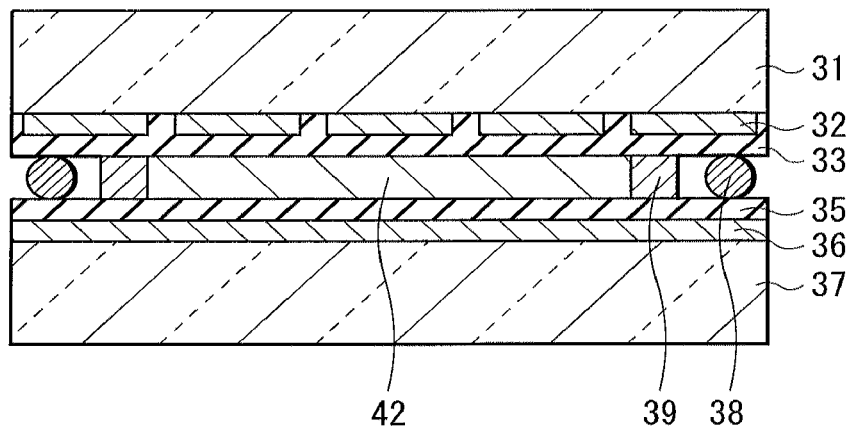
FIG. 23A
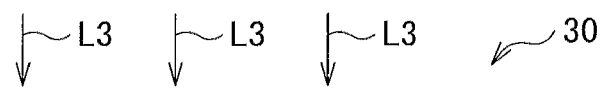
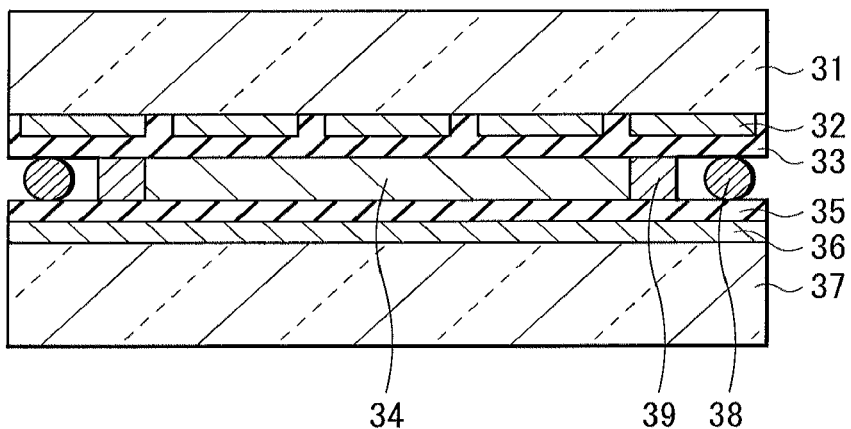
FIG. 23B
FIG. 23C

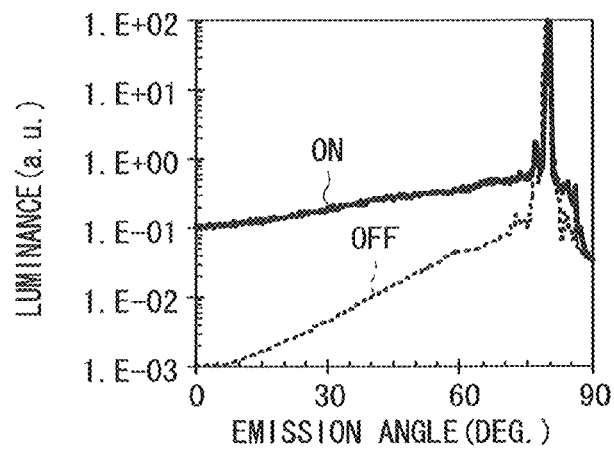
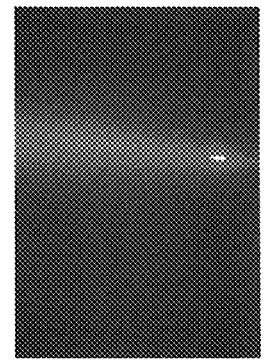
FIG. 36A
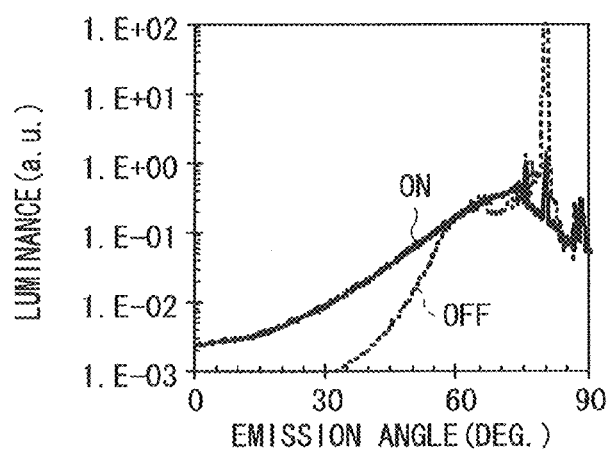
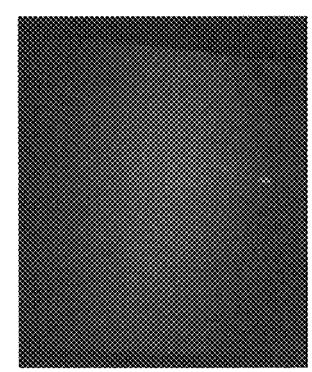
FIG. 36B
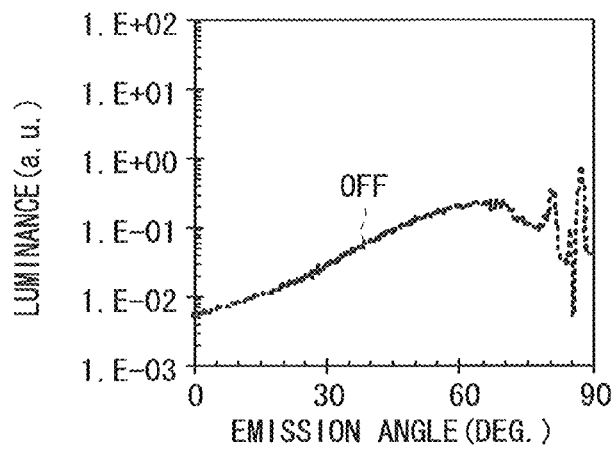
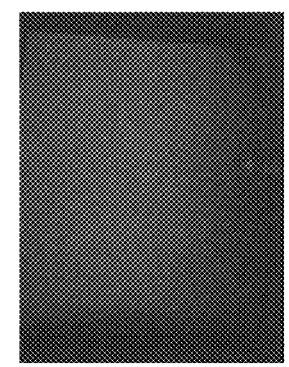
FIG. 36C

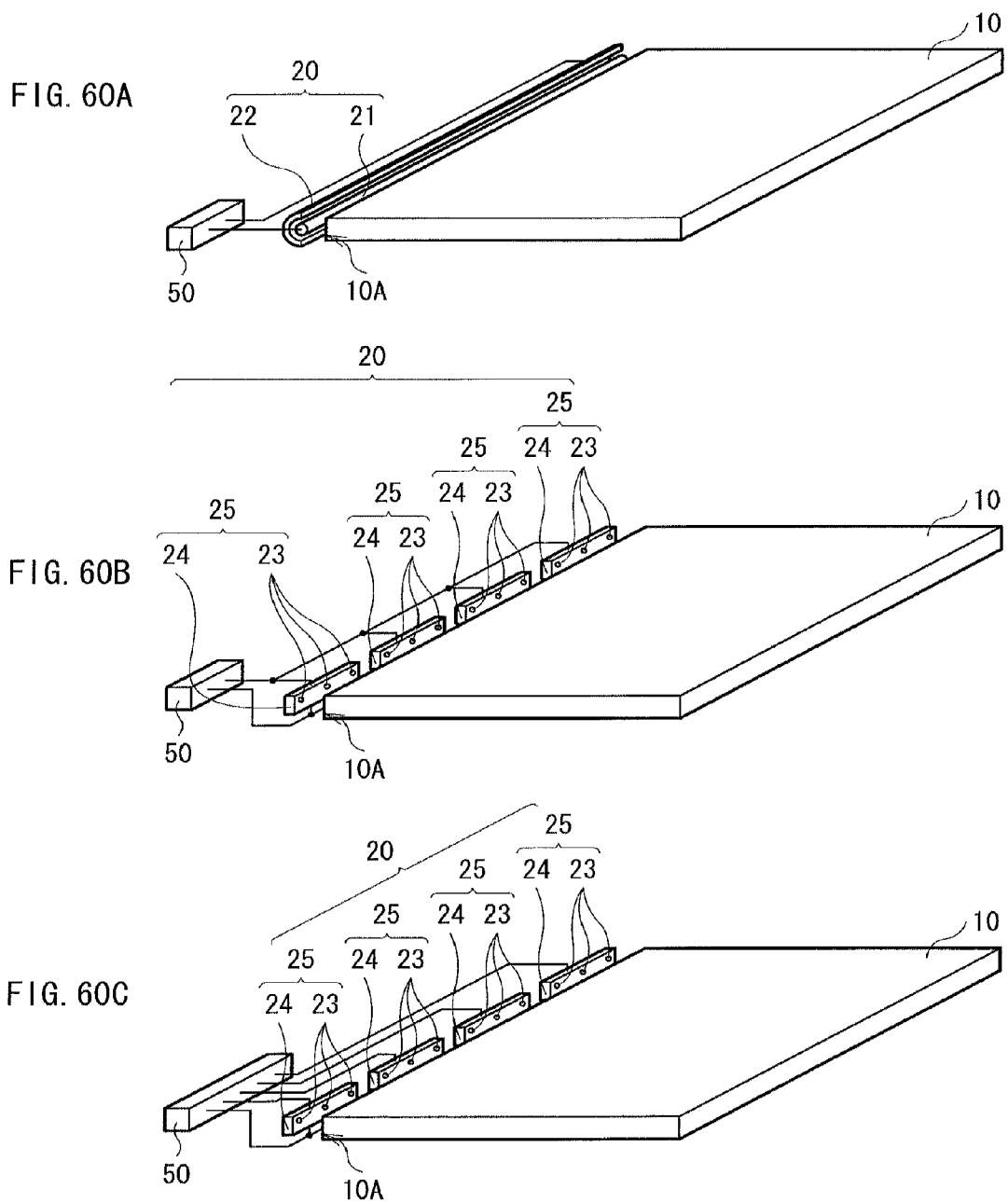

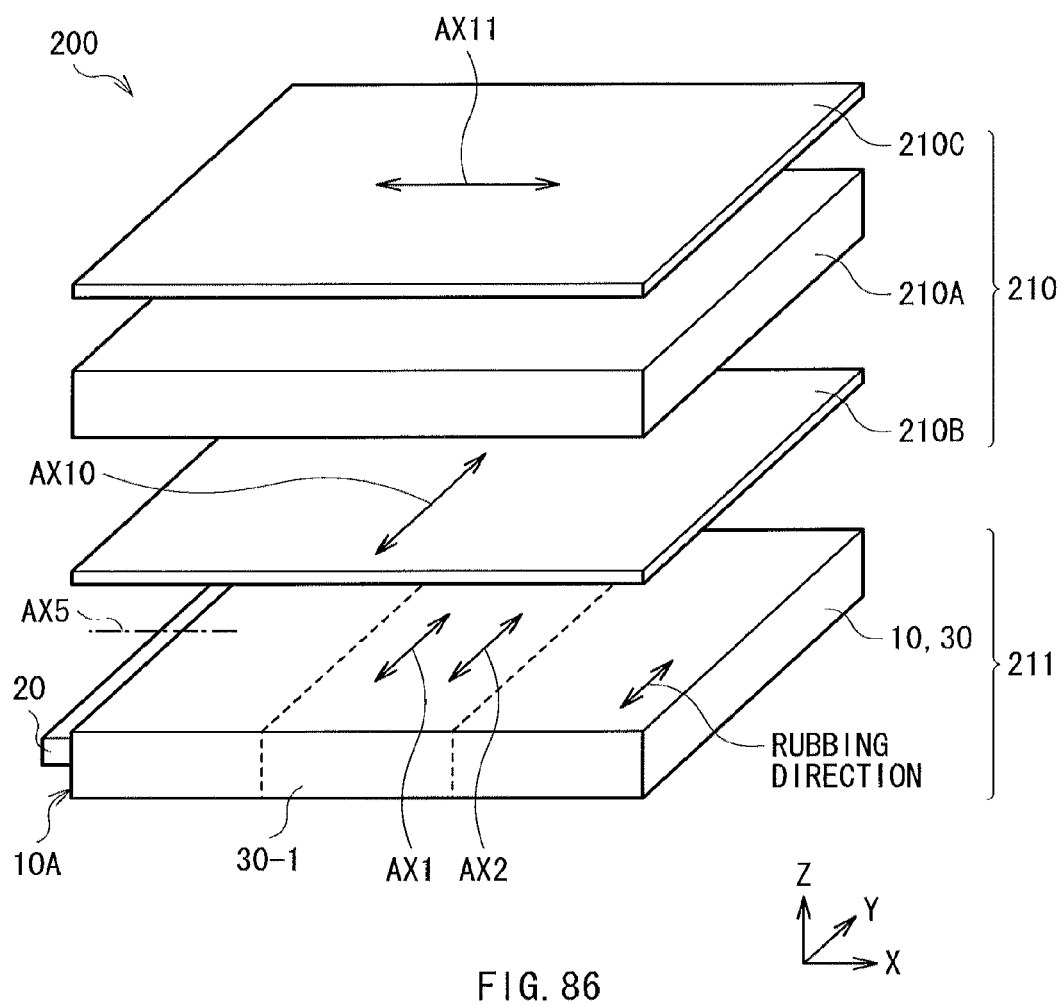
F I G. 86

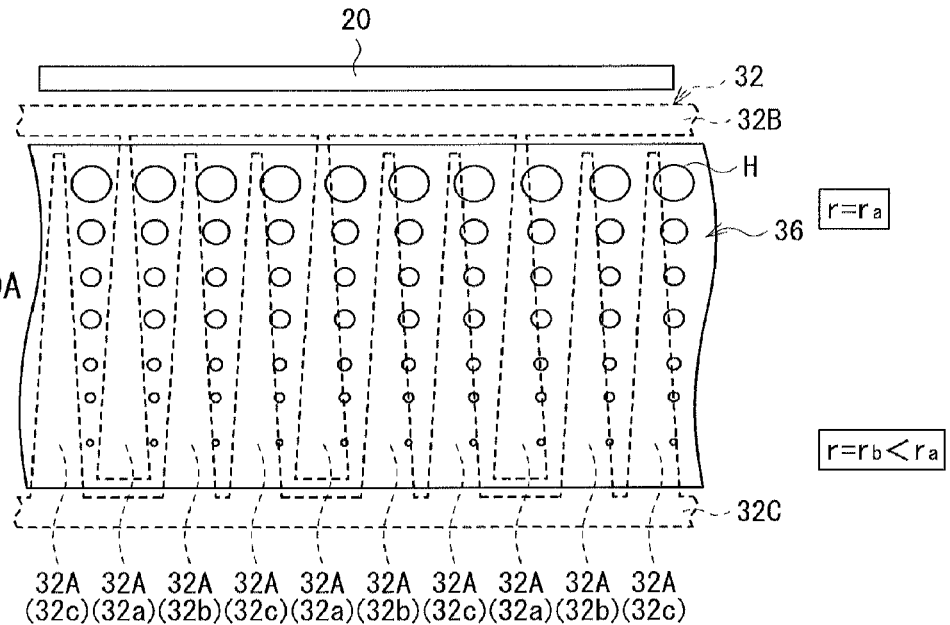
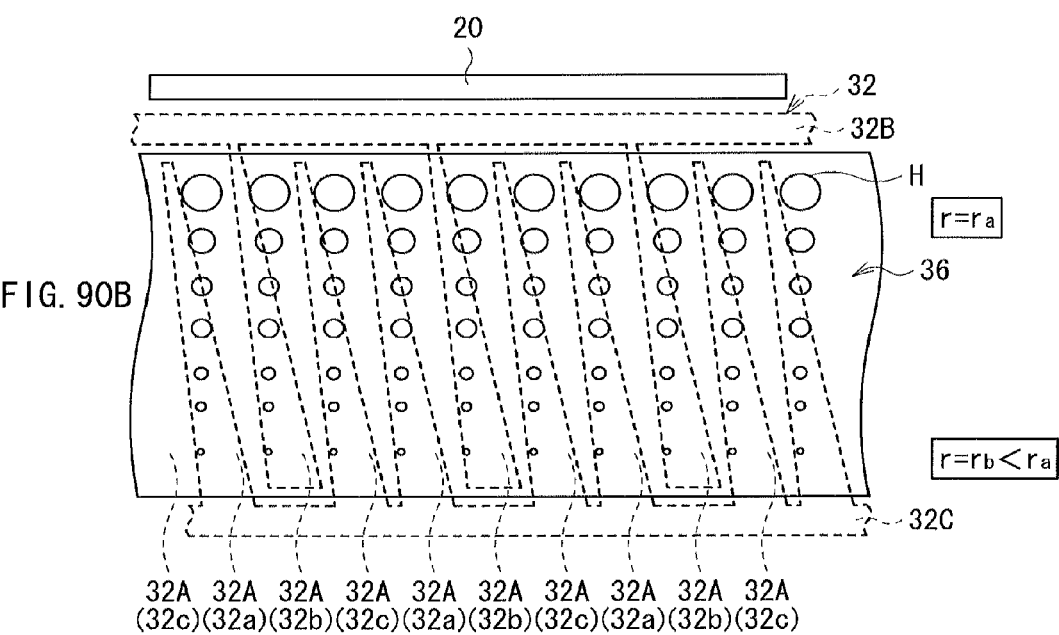

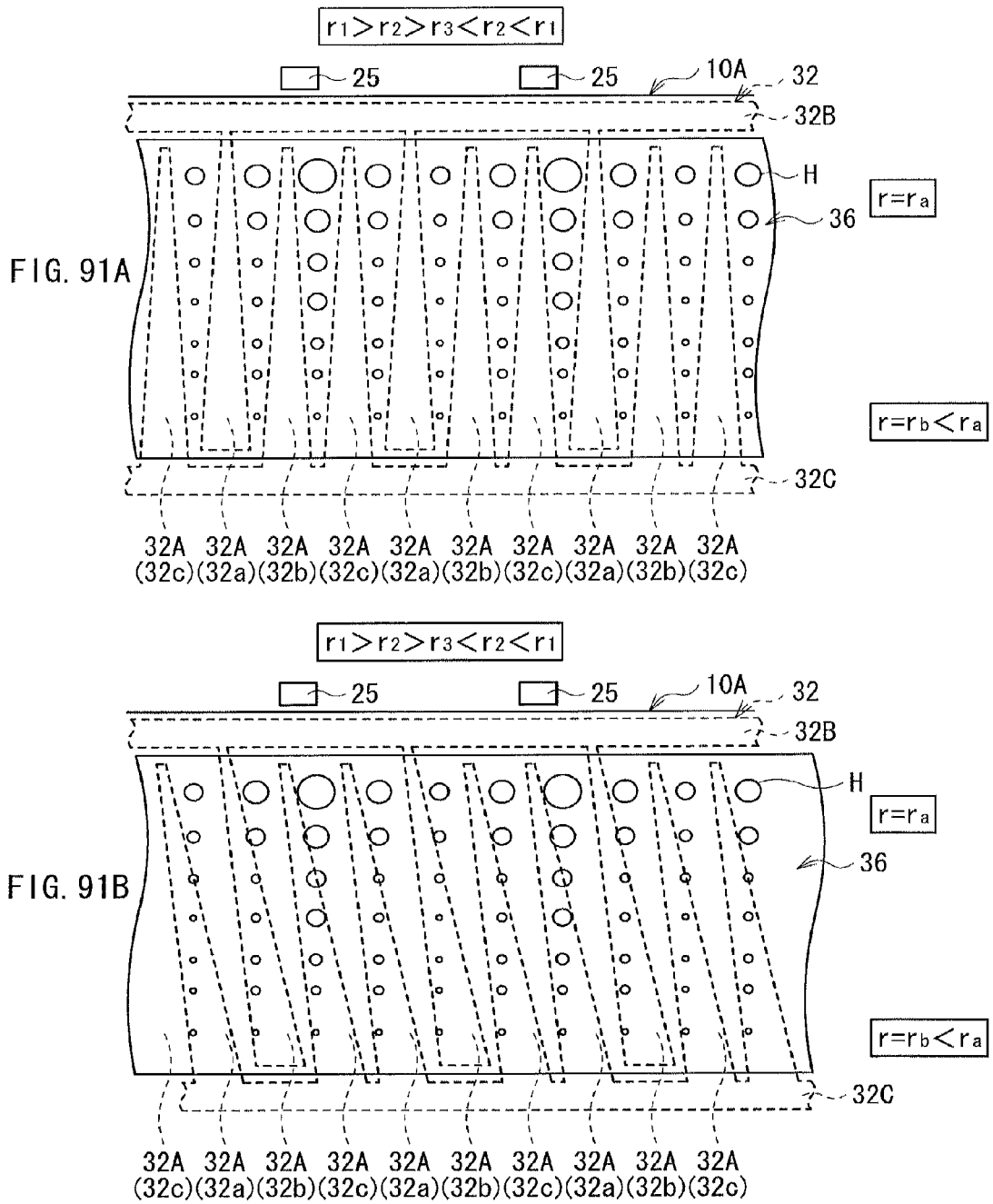

DISPLAY AND ILLUMINATION UNIT

CROSS REFERENCES TO RELATED APPLICATIONS

The present application claims priority to Japanese Priority Patent Application JP 2011-102505 filed in the Japan Patent Office on Apr. 28, 2012, the entire content of which is hereby incorporated by reference.

BACKGROUND

The present application relates to a display capable of performing two-dimensional display (planar display) and three-dimensional display (stereoscopic display), and an illumination unit suitably applicable to such a display as a backlight.

In recent years, improvements in image quality and energy conservation of liquid crystal displays have been accelerated, and systems achieving an improvement in dark-room contrast by modulating light intensity in a partial region of a backlight have been proposed. As a main technique of achieving an improvement in dark-room contrast, some of light-emitting diodes (LEDs) used as light sources of a backlight are driven to modulate backlight light based on a display image. Moreover, in large-screen liquid crystal displays, as in the case of small-screen liquid crystal displays, a reduction in profile has been strongly desired; therefore, attention has been given not to a system in which cold cathode fluorescent lamps (CCFLs) or LEDs are arranged directly below a liquid crystal panel, but to an edge light system in which a light source is arranged on an edge of a light guide plate. However, in the edge light system, it is difficult to perform a partial drive to modulate light intensity in a partial region of the light source.

SUMMARY

As a technique of extracting light propagating through a light guide plate, for example, Japanese Unexamined Patent Application Publication No. H6-347790 proposes a display using a polymer dispersed liquid crystal (PDLC) allowed to switch between a transmission state and a scattering state. This technique is proposed to reduce glare or the like, and is a technique of switching between the transmission state and the scattering state by applying a voltage to a partial region of the PDLC.

On the other hand, in an edge light system backlight, to uniformize in-plane luminance, for example, a technique of varying a print pattern, density of an extraction shape, or the size of one pattern with a distance from a light source such as an LED or a CCFL is known (for example, refer to Japanese Unexamined Patent Application Publication No. H11-142843). The technique disclosed in Japanese Unexamined Patent Application Publication No. H11-142843 is a technique of uniformly extracting light from a light guide plate, and considers only extracting light. As another technique of uniformizing in-plane luminance, for example, a technique of gradually varying light diffusivity of a diffusion sheet with a distance from a light source is known (for example, refer to Japanese Unexamined Patent Application Publication No. 2004-253335).

It is considered to uniformize in-plane luminance of backlight light with use of a combination of the technique in Japanese Unexamined Patent Application Publication No. H11-142843 or 2004-253335 and the PDLC in Japanese Unexamined Patent Application Publication No. H6-347790. However, in such a case, although luminance is allowed to be uniformized, luminance in dark display becomes higher; therefore, it is difficult to increase a modulation ratio between bright-display luminance and dark-display luminance. Such an issue is serious specifically in display performing two-dimensional display and three-dimensional display.

Displays performing two-dimensional display and three-dimensional display include displays in need of wearing special glasses for three-dimensional display and displays without need of the special glasses. In the latter displays, for example, a parallax barrier is used to perceive a stereoscopic image with naked eyes. However, in the case where the parallax barrier is used, when three-dimensional display is performed, light is absorbed by the parallax barrier to reduce display luminance. Therefore, when the above-described backlight is applied to such displays, there is an issue that a modulation ratio in a display image is reduced.

It is desirable to provide an illumination unit capable of increasing a modulation ratio in three-dimensional display while uniformizing in-plane luminance, and a display including the illumination unit.

According to an embodiment of the application, there is provided an illumination unit including: a first transparent substrate and a second transparent substrate being separated from and facing each other; and a light source emitting light to a first end surface of the first transparent substrate or the second transparent substrate. The illumination unit further includes a light modulation layer disposed in a gap between the first transparent substrate and the second transparent substrate, and exhibiting a scattering property or transparency with respect to light from the light source, depending on magnitude of an electric field; and an electrode generating an electric field in the light modulation layer, when a voltage is applied thereto. The light modulation layer generates a plurality of strip-like illumination light beams extending in a direction intersecting with the first end surface with use of light from the light source, when an electric field for a three-dimensional display mode is applied from the electrode to the light modulation layer. In this case, a light emission area per unit area of each of the strip-like illumination light beams varies with a distance from the light source.

According to an embodiment of the application, there is provided a display including: a display panel being driven based on an image signal; and an illumination unit illuminating the display panel, the illumination unit including a first transparent substrate and a second transparent substrate being separated from and facing each other, a light source emitting light to a first end surface of the first transparent substrate, a light modulation layer disposed in a gap between the first transparent substrate and the second transparent substrate, and exhibiting a scattering property or transparency with respect to light from the light source, depending on magnitude of an electric field, and an electrode generating an electric field in the light modulation layer, when a voltage is applied thereto. The light modulation layer generates a plurality of strip-like illumination light beams extending in a direction intersecting with the first end surface with use of light from the light source, when an electric field for a three-dimensional display mode is applied from the electrode to the light modulation layer. In this case, a light emission area per unit area of each of the strip-like illumination light beams varies with a distance from the light source.

In the illumination unit and the display according to the embodiment of the application, the illumination unit includes the light modulation layer exhibiting the scattering property or transparency with respect to light from the light source, depending on magnitude of an electric field. Therefore, light emitted from the light source and propagating through the first transparent substrate and the like passes through a region exhibiting transparency by electric field control of the light modulation layer to be totally reflected by a top surface of the illumination unit or to be reflected by the top surface of the illumination unit with high reflectivity. As a result, luminance in a region corresponding to a region exhibiting transparency in a light emission region (hereinafter simply referred to as "transparent region in the light emission region") of the illumination unit is reduced, compared to the case where light is uniformly emitted from the entire surface of the illumination unit. On the other hand, light propagating through the first transparent substrate and the like is scattered by a region exhibiting the scattering property by the electric field control of the light modulation layer to pass through the top surface of the illumination unit. As a result, luminance in a region corresponding to a region exhibiting the scattering property in the light emission region (hereinafter simply referred to "scattering region in the light emission region") of the illumination unit is increased, compared to the case where light is uniformly emitted from the entire surface of the illumination unit. Moreover, luminance in white display is partially increased (partial luminance enhancement) by a reduced amount of the luminance of the transparent region in the light emission region. Further, in the embodiment of the application, the light emission area per unit area of each of the strip-like illumination light beams generated in the light modulation layer varies with the distance from the light source. Therefore, a density distribution of the transparent region and the scattering region in the light emission region is allowed to be adjusted to become a desired distribution. As a result, compared to the case where a light emission area per unit area of each of the strip-like illumination light beams does not vary with the distance from the light source, luminance on a side closer to the light source of the light emission region is allowed to be become lower, and luminance on a side farther from the light source of the light emission region is allowed to become higher.

In this case, when a high potential difference is applied to the light modulation layer, the light modulation layer may exhibit the scattering property, and when a low potential difference is applied to the light modulation layer (or no potential difference is applied to the light modulation layer), the light modulation layer may exhibit transparency. In this case, a width of each of the strip-like illumination light beams may be smaller at a shorter distance from the light source and larger at a longer distance from the light source. Moreover, in the case where the light modulation layer has the above-described property, and an edge of each of the strip-like illumination light beams has a concavo-convex shape, concavo-convex amplitude of the concavo-convex shape may be larger at a shorter distance from the light source and smaller at a longer distance from the light source.

It is to be noted that, in contrast, when a high potential difference is applied to the light modulation layer, the light modulation layer may have transparency, and when a low potential difference is applied to the light modulation layer (or no potential difference is applied to the light modulation layer), the light modulation layer may exhibit the scattering property. In this case, the width of each of the strip-like illumination light beams may be larger at a shorter distance from the light source and smaller at a longer distance from the light source. Moreover, in the case where the light modulation layer has the above-described property, and the edge of each of the strip-like illumination light beams have a concavo-convex shape, concavo-convex amplitude of the concavo-convex shape may be larger at a shorter distance from the light source and smaller at a longer distance from the light source. At this time, in the case where the edge of each of the strip-like illumination light beams have a very fine concavo-convex shape, the width of each of the strip-like illumination light beams hardly varies macroscopically; however, a light emission area varies microscopically.

In the illumination unit and the display according to the embodiment of the application, compared to the case where the light emission area per unit area of each of the strip-like illumination light beams does not vary with a distance from the light source, luminance on a side closer to the light source in the light emission region is allowed to be decreased, and luminance on a side farther from the light source in the light emission region is allowed to be increased; therefore, in three-dimensional display, while in-plane luminance is uniformized, a modulation ratio is allowed to be increased.

It is to be understood that both the foregoing general description and the following detailed description are exemplary, and are intended to provide further explanation of the application as claimed.

Additional features and advantages are described herein, and will be apparent from the following Detailed Description and the figures.

BRIEF DESCRIPTION OF THE FIGURES

The accompanying drawings are included to provide a further understanding of the disclosure, and are incorporated in and constitute a part of this specification. The drawings illustrate embodiments and, together with the specification, serve to explain the principles of the application.

FIGS. 23A to 23C are sectional views for describing manufacturing steps following FIGS. 22A to 22C.

FIGS. 36A to 36C are diagrams illustrating another example of the results determined by measurement with the device in FIGS. 34A and 34B.

FIGS. 60A to 60C are perspective views illustrating examples of a configuration of a light source in each of the embodiments.

FIG. 86 is a diagram illustrating an example of a relationship between optical axes of polarizing plates of the display panel and optical axes of the light modulation layer in FIG. 3.

FIGS. 90A and 90B are plan views illustrating an example of a state where an upper electrode is provided with holes.

FIGS. 91A and 91B are plan views illustrating another example of the state where the upper electrode is provided with holes.

DETAILED DESCRIPTION

Preferred embodiments of the application will be described in detail below referring to the accompanying drawings. It is to be noted that description will be given in the following order.
1. First Embodiment (FIG. 1 to FIGS. 38A to 38C)
An example in which a light modulation device (horizontal alignment inversion PDLC) is used in a backlight
2. Second Embodiment (FIG. 39 to FIGS. 42A to 42C)
An example in which a light modulation device (vertical alignment inversion PDLC) is used in a backlight
3. Modifications (FIG. 43 to FIGS. 91A and 91B)
4. Examples (FIG. 92 to FIG. 95)
(1. First Embodiment)
[Configuration of Television Broadcast Signal Transmitter/Receiver System]

Figure 1:
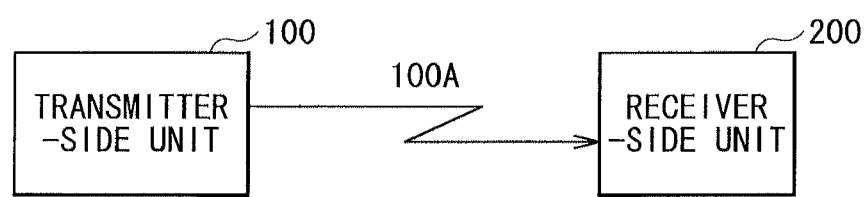
FIG. 1 is a diagram illustrating an example of a television broadcast signal transmitter/receiver system according to a first embodiment of the application.

FIG. 1 is a block diagram illustrating a configuration example of a transmitter/receiver system, which includes a receiver-side unit 200 according to a first embodiment of the application, with use of a television broadcast signal 100A. The transmitter/receiver system includes a transmitter-side unit 100 transmitting the television broadcast signal 100A through, for example, wired communication (such as cable TV) or wireless communication (such as terrestrial digital waves or satellite waves), and the receiver-side unit 200 receiving the television broadcast signal 100A from the transmitter-side unit 100 through the above-described wired or wireless communication. It is to be noted that the receiver-side unit 200 corresponds to a specific example of "display" in the application.

The television broadcast signal 100A includes image data for two-dimensional display (planar display) or image data for three-dimensional display (stereoscopic display). In this description, the image data for two-dimensional display refers to two-dimensional image data without perspective information. Moreover, the image data for three-dimensional display refers to two-dimensional image data with perspective information, and the image data for three-dimensional display includes plural sets of two-dimensional image data with perspectives different from one another. The transmitter-side unit 100 is, for example, a television broadcast signal transmitter installed in a broadcasting station, or a server on the Internet.

[Functional Block of Receiver-Side Unit 200]

Figure 2:
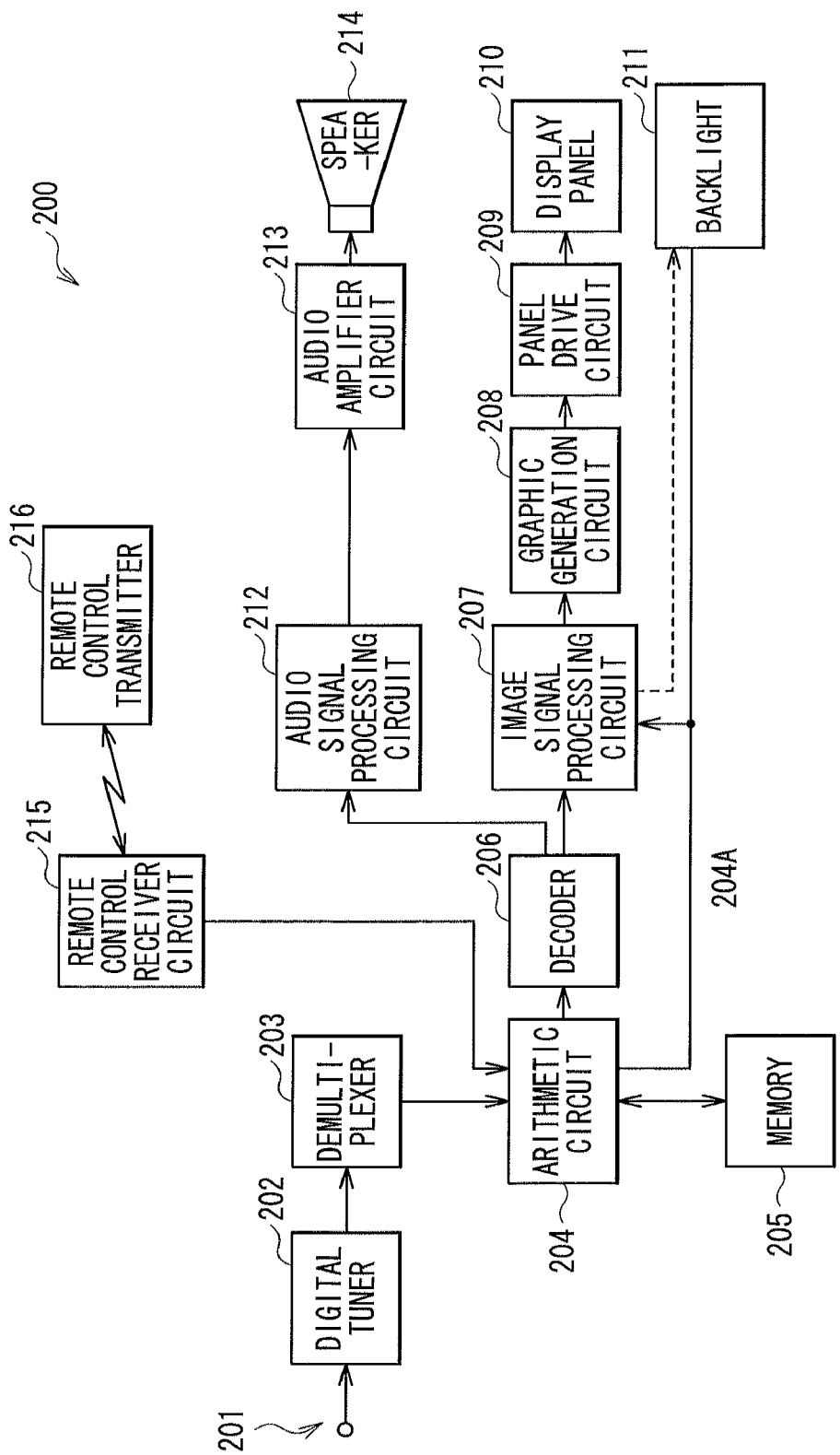
FIG. 2 is a diagram illustrating an example of functional blocks of a receiver-side unit in FIG. 1.

FIG. 2 is a block diagram of a configuration example of the receiver-side unit 200. The receiver-side unit 200 is, for example, a television capable of being connected to the above-described wired or wireless communication. The receiver-side unit 200 includes, for example, an antenna terminal 201, a digital tuner 202, a demultiplexer 203, an arithmetic circuit 204, and a memory 205. The receiver-side unit 200 further includes, for example, a decoder 206, an image signal processing circuit 207, a graphic generation circuit 208, a panel drive circuit 209, a display panel 210, a backlight 211, an audio signal processing circuit 212, an audio amplifier circuit 213, and a speaker 214. The receiver-side unit 200 further includes, for example, a remote control receiver circuit 215 and a remote control transmitter 216. It is to be noted that the display panel 210 corresponds to a specific example of "display panel" in the application, and the backlight 211 corresponds to a specific example of "illumination unit" in the application.

The antenna terminal 201 is a terminal receiving the television broadcast signal 100A received by a receiving antenna (not illustrated). For example, the digital tuner 202 processes the television broadcast signal 100A having entered into the antenna terminal 201 to output a predetermined transport stream associated with a channel selected by a user. For example, the demultiplexer 203 extracts a partial TS (Transport Stream) associated with the channel selected by the user from the transport stream obtained in the digital tuner 202.

The arithmetic circuit 204 controls operations of respective components of the receiver-side unit 200. For example, the arithmetic circuit 204 allows the memory 205 to hold the partial TS obtained by the demultiplexer 203, or transmits the partial TS read from the memory 205 to the decoder 206. Moreover, for example, the arithmetic circuit 204 transmits a control signal 204A specifying two-dimensional display or three-dimensional display to the image signal processing circuit 207 and the backlight 211. The arithmetic circuit 204 provides the above-described control signal 204A based on, for example, setting information stored in the memory 205, predetermined information included in the partial TS, or setting information supplied from the remote control receiver circuit 215.

For example, the memory 205 holds the setting information of the receiver-side unit 200 and manages data. The memory 205 is allowed to hold, for example, the partial TS obtained by the demultiplexer 203 or setting information such as display method.

For example, the decoder 206 performs a decoding process on an image PES (Packetized Elementary Stream) packet included in the partial TS which is obtained by the demultiplexer 203 to obtain image data. For example, the decoder 206 also performs a decoding process on an audio PES packet included in the partial TS which is obtained by the demultiplexer 203 to obtain audio data. In this description, the image data refers to image data for two-dimensional display or image data for three-dimensional display.

For example, the image signal processing circuit 207 and the graphic generation circuit 208 perform, as necessary, multiple image processing, a graphic data superimposing process, or the like on the image data obtained by the decoder 206.

In the case where the image signal processing circuit 207 receives a signal specifying three-dimensional display as the control signal 204A from the arithmetic circuit 204, and image data supplied from the decoder 206 is image data for three-dimensional display, the image signal processing circuit 207 generates, for example, one set of two-dimensional image data with use of plural sets of two-dimensional image data with perspectives different from one another included in the image data for three-dimensional display supplied from the decoder 206 to select the generated two-dimensional image data as image data which is to be supplied to the graphic generation circuit 208. For example, in the case where the image data for three-dimensional display includes two sets of two-dimensional image data with perspectives different from each other, the image signal processing circuit 207 performs a process of alternately arranging the two sets of two-dimensional image data in a horizontal direction from one row to another to generate one set of image data in which the two sets of two-dimensional image data are alternately arranged in the horizontal direction. Likewise, for example, in the case where the image data for three-dimensional display includes four sets of two-dimensional image data with perspectives different from one another, the image signal processing circuit 207 performs a process of periodically alternately arranging the four sets of two-dimensional image data in the horizontal direction from one row to another to generate one set of image data in which four sets of two-dimensional image data are periodically alternately arranged in the horizontal direction.

In the case where the image signal processing circuit 207 receives a signal specifying two-dimensional display as the control signal 204A from the arithmetic circuit 204, and image data supplied from the decoder 206 is image data for three-dimensional display, for example, the image signal processing circuit 207 selects, as image data which is to be supplied to the graphic generation circuit 208, one set of image data from plural sets of two-dimensional image data with perspectives different from one another which are included in image data for three-dimensional display supplied from the decoder 206. In the case where the image signal processing circuit 207 receives the signal specifying two-dimensional display as the control signal 204A from the arithmetic circuit 204, and the image data supplied from the decoder 206 is image data for two-dimensional display, for example, the image signal processing circuit 207 selects image data for two-dimensional display supplied from the decoder 206 as image data which is to be supplied to the graphic generation circuit 208.

The graphic generation circuit 208 generates, for example, a UI (User Interface) screen which is to be used for screen display. For example, the panel drive circuit 209 drives the display panel 210 based on image data supplied from the graphic generation circuit 208.

Configurations of the display panel 210 and the backlight 211 will be described in detail later. For example, the audio signal processing circuit 212 performs a process such as D/A conversion on audio data obtained by the decoder 206. The audio amplifier circuit 213 amplifies, for example, an audio signal supplied from the audio signal processing circuit 212 to supply the amplified audio signal to the speaker 214.

The remote control receiver circuit 215 receives, for example, a remote control signal transmitted from the remote control transmitter 216 to supply the remote control signal to the arithmetic circuit 204. The arithmetic circuit 204 controls, for example, respective components of the receiver-side unit 200 in response to the remote control signal.

[Sectional Configuration of Receiver-Side Unit 200]

Figure 3:
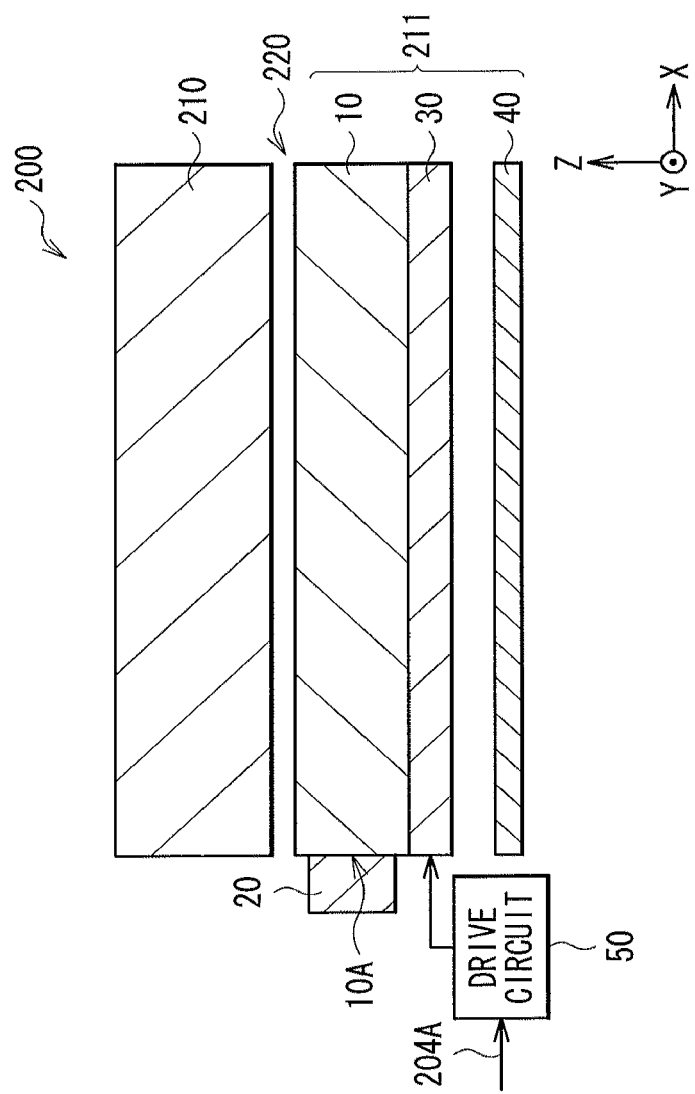
FIG. 3 is a sectional view illustrating an example of a configuration of a display section in the receiver-side unit in FIG. 1.

FIG. 3 illustrates an example of a sectional configuration of a display section of the receiver-side unit 200. It is to be noted that FIG. 3 is a schematic illustration, and dimensions and shapes in the illustration are not necessarily the same as actual dimensions and shapes. The receiver-side unit 200 includes the display panel 210 and the backlight 211 disposed behind the display panel 210.

The display panel 210 includes a plurality of pixels which are two-dimensionally arranged, and displays an image by driving respective pixels or specific pixels. The display panel 210 is, for example, a transmissive liquid crystal display panel (LCD) in which respective pixels or specific pixels are driven based on an image signal, and has a configuration in which a liquid crystal layer is sandwiched between a pair of transparent substrates. The display panel 210 includes a polarization plate, a transparent substrate, pixel electrodes, an alignment film, a liquid crystal layer, an alignment film, a common electrode, a color filter, a transparent substrate, and a polarization plate in order from the backlight 211.

The transparent substrates are configured of substrates transparent to visible light, for example, plate glass. It is to be noted that an active drive circuit (not illustrated) including TFTs (thin film transistors), wiring, and the like electrically connected to the pixel electrodes is formed on the transparent substrate located closer to the backlight 211. The pixel electrodes and the common electrode are made of, for example, indium tin oxide (ITO). The pixel electrodes are two-dimensionally arranged on the transparent substrate, and function as electrodes for respective pixels. On the other hand, the common electrode is formed on an entire surface of the color filter, and functions as a common electrode facing the respective pixel electrodes. The alignment films are made of a polymer material such as polyimide, and perform an alignment process on a liquid crystal.

The liquid crystal layer is made of, for example, a VA (Vertical Alignment) mode, TN (Twisted Nematic) mode or STN (Super Twisted Nematic) mode liquid crystal, and has a function of changing the direction of a polarizing axis of emitted light from the backlight 211 in each pixel by a voltage applied from the drive circuit (not illustrated). It is to be noted that liquid crystal alignment is changed in a stepwise manner to adjust the direction of a transmission axis of each pixel in a stepwise manner. In the color filter, color filters separating light having passed through the liquid crystal layer into, for example, three primary colors of red (R), green (G), and blue (B), or four colors such as R, G, B, and white (W), respectively, are arranged corresponding to the arrangement of the pixel electrodes.

The polarization plates are optical shutters of one kind, and allow only light (polarized light) in a certain vibration direction to pass therethrough. It is to be noted that the polarization plates may be absorption polarizers absorbing light (polarized light) in a vibration direction other than a transmission axis, but the polarization plates are preferably reflective polarizers reflecting light toward the backlight 211 in terms of an improvement in luminance. The two polarization plates are disposed to allow their polarizing axes to be different by 90° from each other, thereby allowing emitted light from the backlight 211 to pass therethrough via the liquid crystal layer, or to be shielded.

The backlight 211 illuminates, for example, the display panel 210 from a back side thereof, and includes a light guide plate 10, a light source 20 disposed on a side surface of the light guide plate 10, a light modulation device 30 and a reflective plate 40 disposed behind the light guide plate 10, and a drive circuit 50 driving the light modulation device 30. It is to be noted that the light guide plate 10 corresponds to a specific example of "first transparent substrate" or "second transparent substrate" in the application. The light source 20 corresponds to a specific example of "light source" in the application.

The light guide plate 10 guides light from the light source 20 disposed on the side surface of the light guide plate 10 to a top surface of the light guide plate 10. The light guide plate 10 has a shape corresponding to the display panel 210 disposed on the top surface of the light guide plate 10, for example, a rectangular parallelepiped shape surrounded by a top surface, a bottom surface, and side surfaces. It is to be noted that a side surface where light from the light source 20 enters of the side surfaces of the light guide plate 10 is hereinafter referred to as a "light incident surface 10A". It is to be noted that the light incident surface 10A corresponds to a specific example of "first end surface" in the application.

In the light guide plate 10, one or both of the top surface and the bottom surface have a predetermined patterned shape, and the light guide plate 10 has a function of scattering and uniformizing light incident from the light incident surface 10A. It is to be noted that, in the case where a voltage applied to the backlight 211 is modulated to uniformize luminance, a flat light guide plate which is not patterned may be used as the light guide plate 10. The light guide plate 10 is formed by mainly including a transparent thermoplastic resin such as a polycarbonate resin (PC) or an acrylic resin (polymethylmethacrylate (PMMA)).

The light source 20 is a linear light source, and is configured of, for example, a hot cathode fluorescent lamp (HCFL), a cold cathode fluorescent lamp (CCFL), or a plurality of LEDs (Light Emitting Diodes) linearly arranged. In the case where the light source 20 is configured of a plurality of LEDs, all of the LEDs are preferably white LEDs in terms of efficiency, a reduction in profile, and uniformity. It is to be noted that the light source 20 may be configured of, for example, red LEDs, green LEDs, and blue LEDs. The light source 20 may be disposed on only one side surface of the light guide plate 10 (refer to FIG. 3), or on two side surfaces, three side surfaces, or all side surfaces of the light guide plate 10.

The reflective plate 40 returns light leaked from the back side of the light guide plate 10 through the light modulation device 30 to the light guide plate 10, and has, for example, functions such as reflection, diffusion, and scattering. The reflective plate 40 allows light emitted from the light source 20 to be efficiently used, and is also useful to improve front luminance. The reflective plate 40 is made of, for example, foamed PET (polyethylene terephthalate), a silver-evaporated film, a multilayer reflective film, or white PET. It is to be noted that, for example, the reflective plate 40 may not be included, as necessary.

Figure 4:
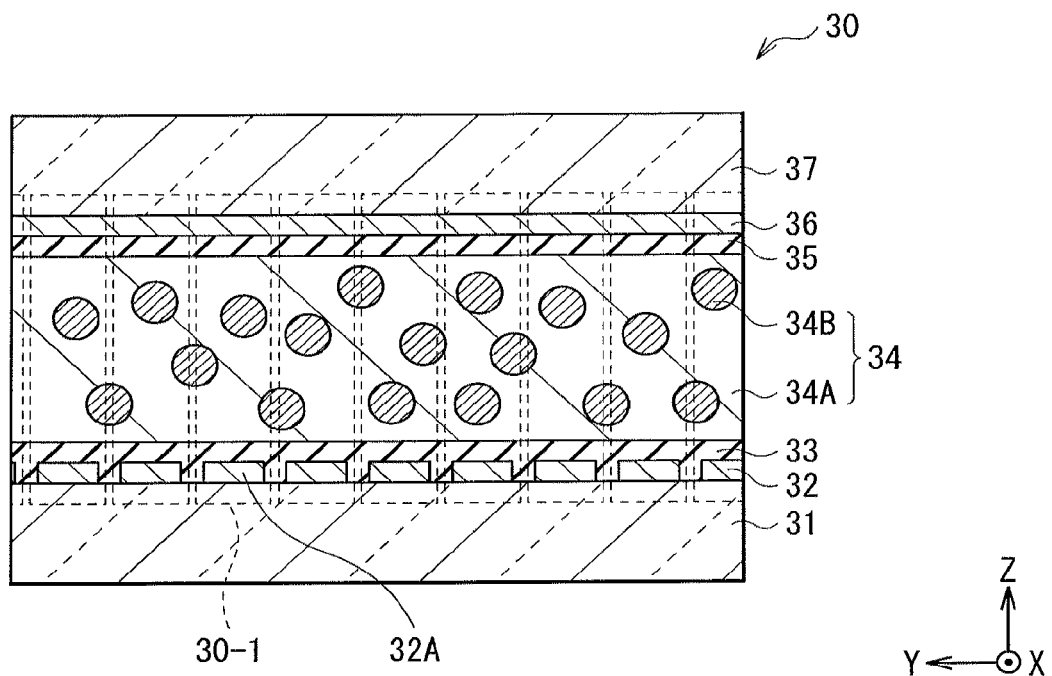
FIG. 4 is a sectional view illustrating an example of a configuration of a light modulation device in FIG. 3.

In the embodiment, the light modulation device 30 is in close contact with a back side (the bottom surface) of the light guide plate 10 without an air layer in between, and is bonded to the back side of the light guide plate 10 with, for example, an adhesive (not illustrated) in between. For example, as illustrated in FIG. 4, the light modulation device 30 is configured by arranging a transparent substrate 31, a lower electrode 32, an alignment film 33, a light modulation layer 34, an alignment film 35, an upper electrode 36, and a transparent substrate 37 in order from the reflective plate 40.

The transparent substrates 31 and 37 support the light modulation layer 34, and are typically configured of substrates transparent to visible light, for example, glass plates or plastic films. The lower electrode 32 is disposed on a surface located closer to the transparent substrate 37 of the transparent substrate 31, and, for example, as illustrated in FIG. 4, the lower electrode 32 is configured of a plurality of sub-electrodes 32A.

When three-dimensional display is performed in the receiver-side unit 200, two or more specific sub-electrodes 32A (hereinafter referred to as "sub-electrodes 32a") selected from the plurality of sub-electrodes 32A are used to generate strip-like illumination light beams. It is to be noted that the strip-like illumination light beams generated by the sub-electrodes 32a correspond to a specific example of "strip-like illumination light beams" in the application. The strip-like illumination light beams generated by the sub-electrodes 32a each have a shape corresponding to a shape of the sub-electrode 32a, and has a strip-like light emission shape extending in a direction intersecting with or orthogonal (or substantially orthogonal) to the light incident surface 10A.

The two or more sub-electrodes 32a are arranged with a pixel pitch P1 corresponding to (equal to or close to) a pixel pitch P2 (refer to FIG. 24) when three-dimensional display is performed in the receiver-side unit 200. When two-dimensional display is performed in the receiver-side unit 200, other sub-electrodes 32A (hereinafter referred to as "sub-electrodes 32b and 32c") except for the sub-electrodes 32a are used with the sub-electrodes 32a to generate planar illumination light. In other words, when two-dimensional display is performed in the receiver-side unit 200, all sub-electrodes 32A are used to generate planar illumination light. The sub-electrodes 32a, 32b, and 32c are arranged in this order in an arrangement direction (a direction orthogonal to the light incident surface 10A), and a plurality of combinations of the sub-electrodes 32a, 32b, and 32c are arranged in the arrangement direction.

Figure 5:
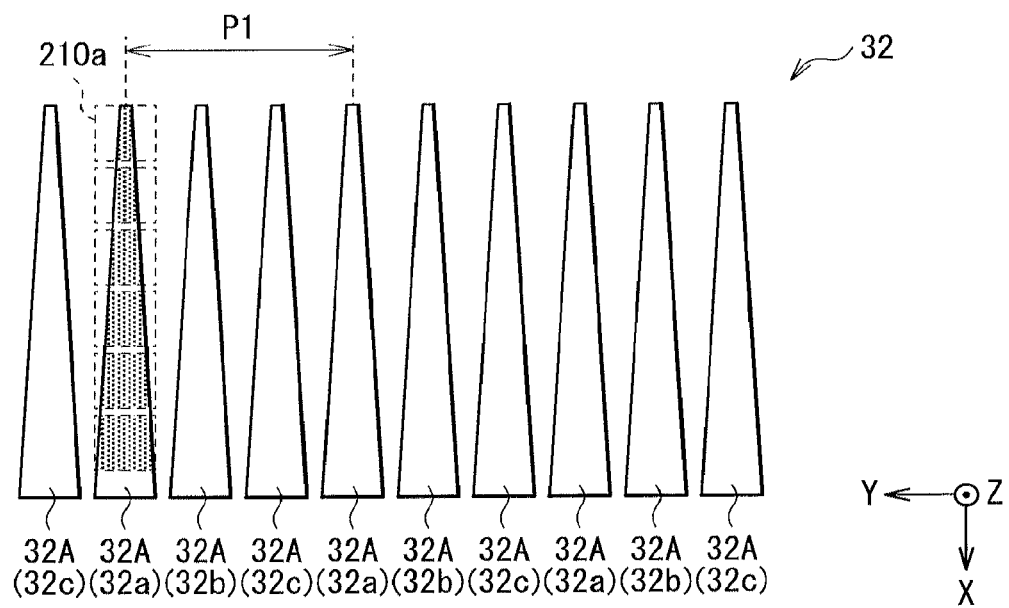
FIG. 5 is a plan view illustrating an example of a lower electrode in FIG. 4.

The sub-electrodes 32A each have a strip-like shape extending in one direction in a plane as well as in a direction intersecting with or orthogonal (or substantially orthogonal) to the light incident surface 10A. For example, as illustrated in FIG. 5, in each of the sub-electrodes 32A, an area of a portion used for one pixel 210a in the display panel 210 (an area of a gray portion in the drawing) varies with a distance from the light source 20. Therefore, a light emission area per unit area of each of the strip-like illumination light beams generated by the sub-electrodes 32A also varies with the distance from the light source 20.

More specifically, the width of each sub-electrode 32A varies with the distance from the light source 20, and is smaller at a shorter distance from the light source 20 and larger at a longer distance from the light source 20. For example, as illustrated in FIG. 5, the width of each sub-electrode 32A is increased in proportion to the distance from the light source 20. Therefore, the width of each of the strip-like illumination light beams generated by the sub-electrodes 32A also varies with the distance from the light source 20, and is smaller at a shorter distance from the light source 20 and larger at a longer distance from the light source 20. For example, although not illustrated, the width of each of the strip-like illumination light beams generated by the sub-electrodes 32A is increased in proportion to the distance from the light source 20.

It is to be noted that, in the case where the width of each of the sub-electrodes 32A varies with the distance from the light source 20, the shapes of the respective sub-electrodes 32A are preferably adjusted to allow central lines in a width direction thereof to be parallel to one another. In this case, central lines in a width direction of the respective strip-like illumination light beams are parallel to one another. It is to be noted that the widths of the respective sub-electrodes 32A may be uniform at ends thereof located farthest from or closest to the light source 20.

Figure 6:
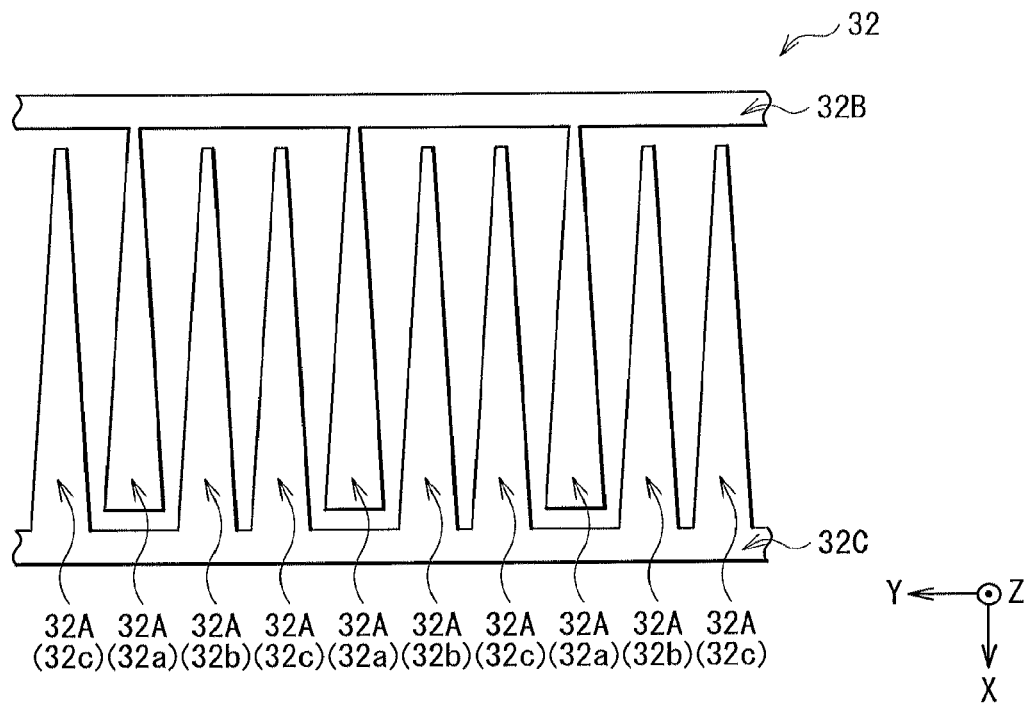
FIG. 6 is a plan view illustrating a first modification of the lower electrode in FIG. 5.
Figure 7:
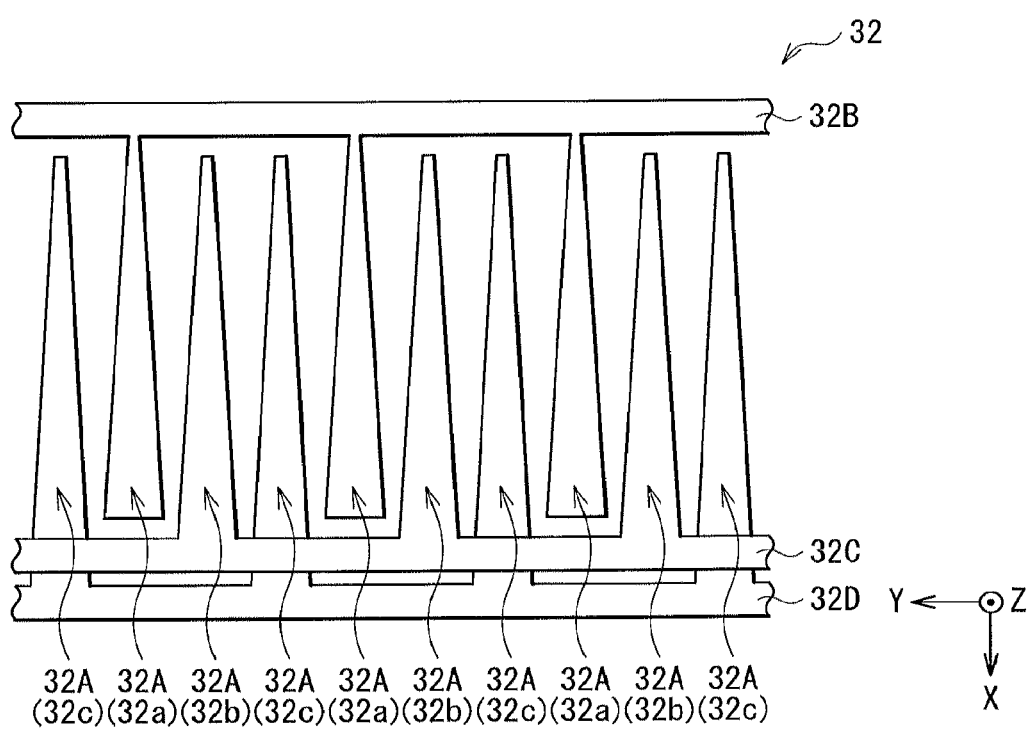
FIG. 7 is a plan view illustrating a second modification of the lower electrode in FIG. 5.
Figure 8:
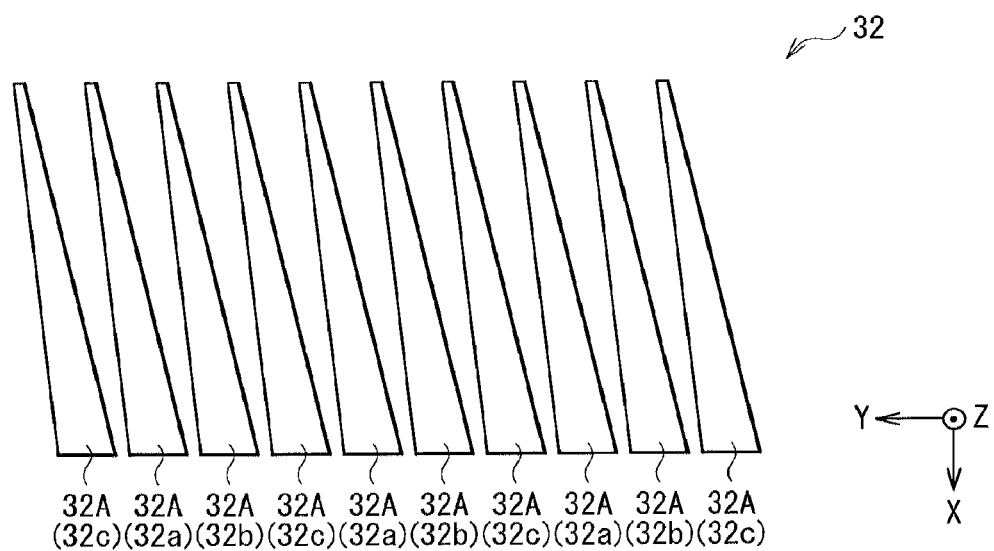
FIG. 8 is a plan view illustrating a third modification of the lower electrode in FIG. 5.
Figure 9:
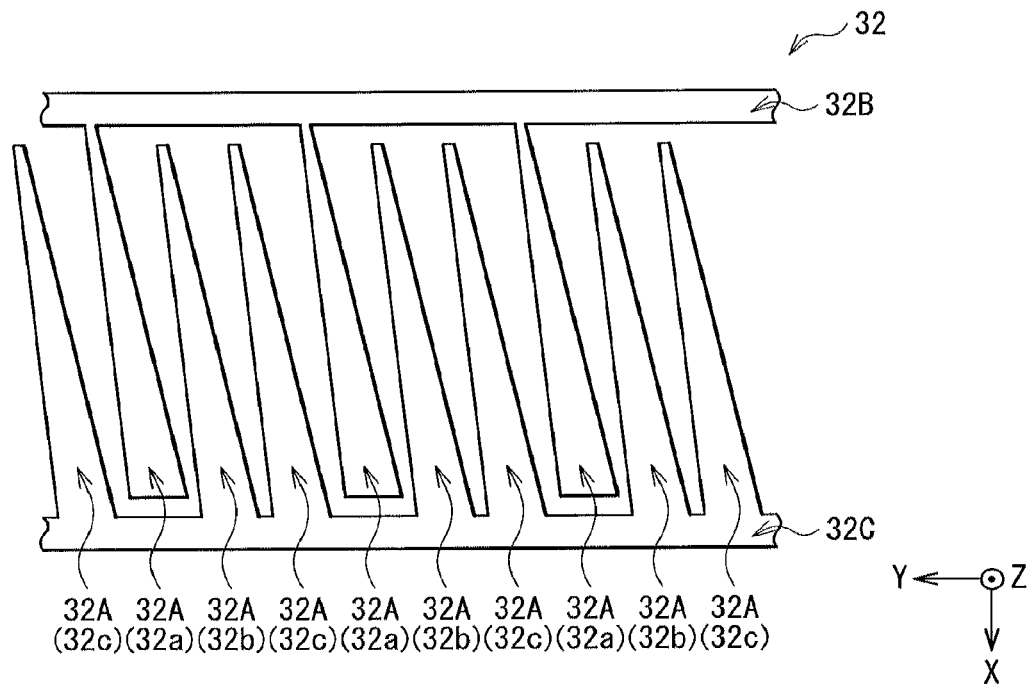
FIG. 9 is a plan view illustrating a fourth modification of the lower electrode in FIG. 5.
Figure 10:
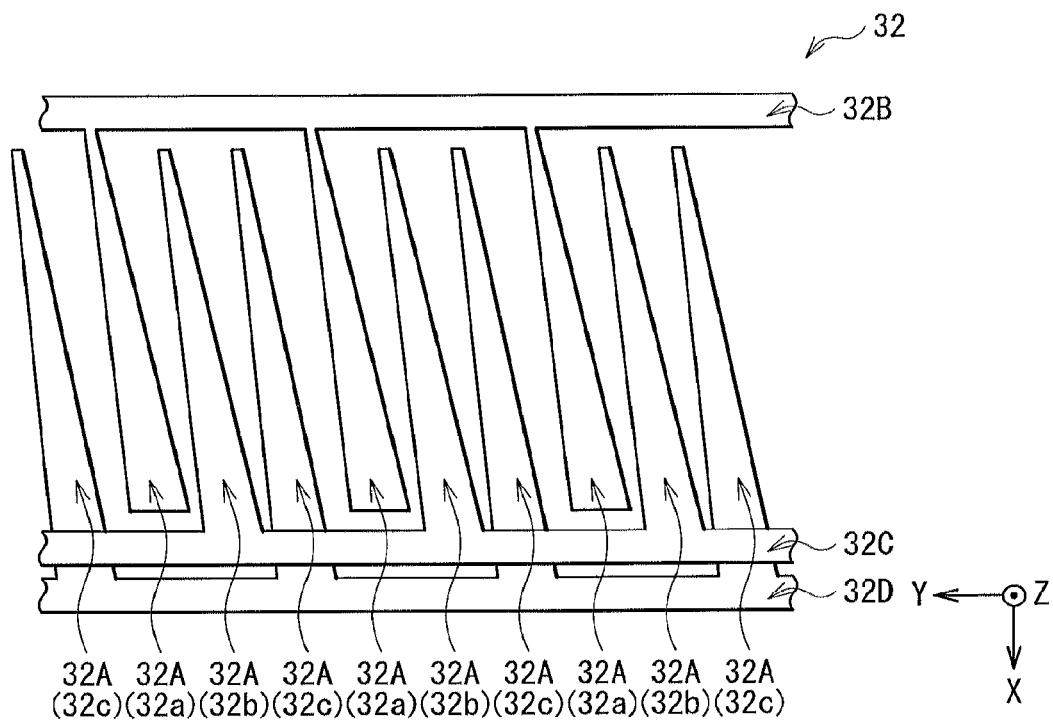
FIG. 10 is a plan view illustrating a fifth modification of the lower electrode in FIG. 5.

For example, as illustrated in FIG. 5, the sub-electrodes 32A may be formed separately from one another and may be allowed to be driven independently of one another; however, all of the sub-electrodes 32a may be electrically connected to one another. For example, as illustrated in FIG. 6, all of the sub-electrodes 32a may be electrically connected to one another through a wiring line 32B extending in the arrangement direction. Moreover, for example, all of the sub-electrodes 32b and 32c may be electrically connected to one another. For example, as illustrated in FIG. 6, all of the sub-electrodes 32b and 32c may be electrically connected to one another through a wiring line 32C extending in the arrangement direction. It is to be noted that, in the case where multi-perspective display is performed in two-dimensional display, the sub-electrodes 32b and the sub-electrodes 32c are preferably electrically separated from each other. In this case, for example, as illustrated in FIG. 7, all of the sub-electrodes 32b may be electrically connected to one another through the wiring line 32C extending in the arrangement direction, and all of the sub-electrodes 32c may be electrically connected to one another through a wiring line 32D extending in the arrangement direction.

For example, as illustrated in FIGS. 4, 8, 9, and 10, the sub-electrodes 32A may extend in a direction diagonally intersecting with a normal to the light incident surface 10A. At this time, the strip-like illumination light beams also extend in the direction diagonally intersecting with the normal to the light incident surface 10A. It is to be noted that, in the case where the sub-electrodes 32A (or the strip-like illumination light beams) extend in the direction diagonally intersecting with the normal to the light incident surface 10A, the extending direction of the sub-electrodes 32A (or the strip-like illumination light beams) preferably extends in a direction intersecting with a pixel arrangement direction of the display panel 210. In such a case, as will be described in detail later, a difference between resolution in a direction parallel to the normal to the light incident surface 10A and resolution in a direction parallel to the light incident surface 10A is allowed to be reduced.

Figure 11:
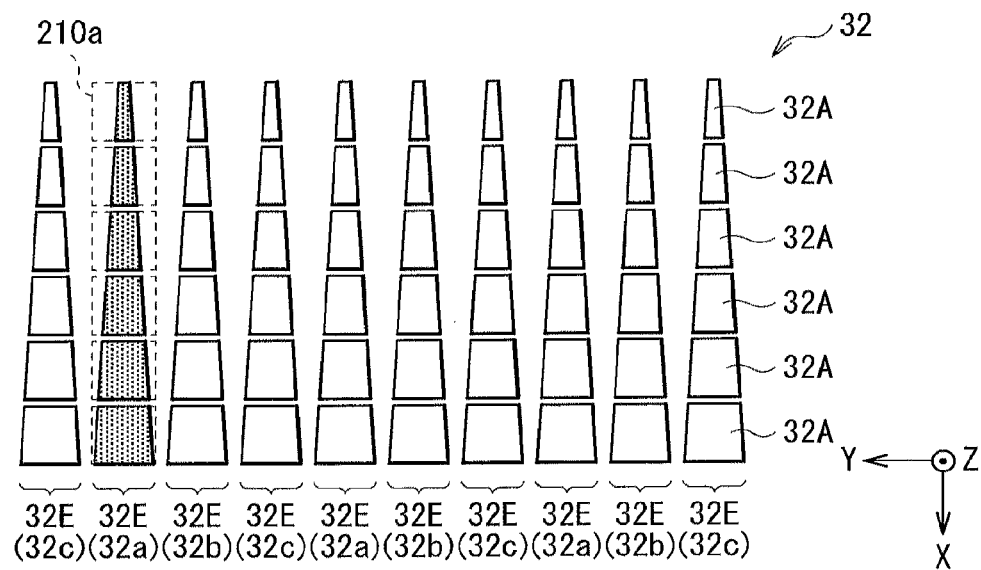
FIG. 11 is a plan view illustrating a sixth modification of the lower electrode in FIG. 5.
Figure 12:
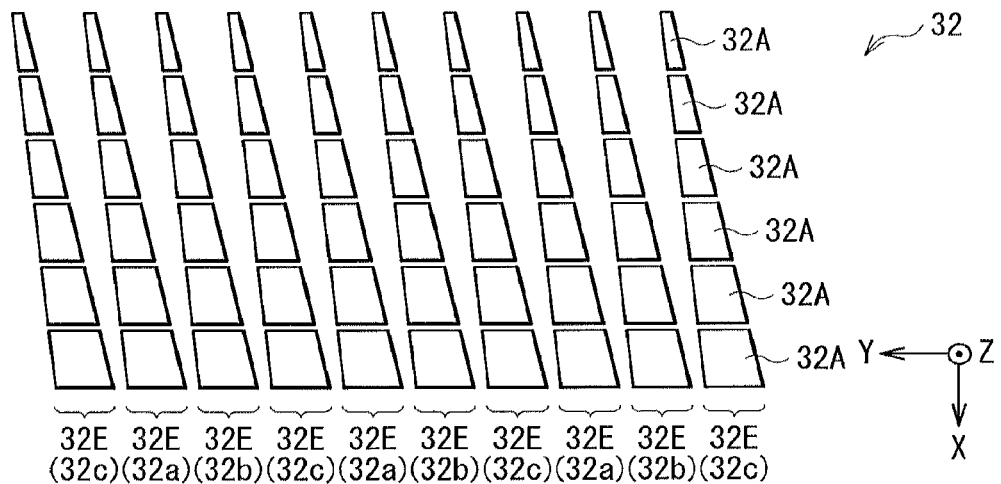
FIG. 12 is a plan view illustrating a seventh modification of the lower electrode in FIG. 5.
Figure 13:
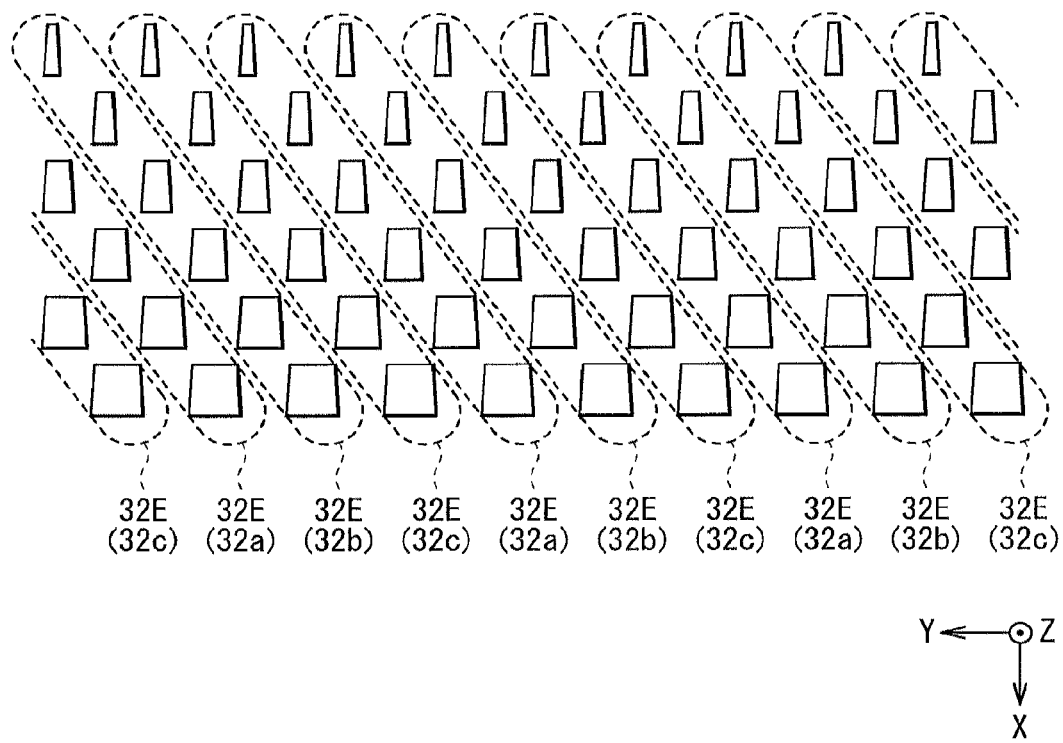
FIG. 13 is a plan view illustrating an eighth modification of the lower electrode in FIG. 5.

Moreover, for example, as illustrated in FIGS. 11, 12, and 13, the plurality of sub-electrodes 32A may each have a block shape, and may be two-dimensionally arranged. It is to be noted that, in FIGS. 11 and 12, a state where the plurality of the sub-electrodes 32A are arranged in lines is illustrated. On the other hand, FIG. 13 illustrates a state where each of the sub-electrodes 32A is displaced from other adjacent sub-electrodes 32A in a horizontal direction (a Y-axis direction) by a width of the pixel 210a.

In this case, when a combination of two or more of the plurality of sub-electrodes 32A is considered as one linear electrode 32E, for example, as illustrated in FIG. 11, an area of a portion used for one pixel 210a in the display panel 210 (an area of a gray portion in the drawing) of each linear electrode 32E varies with the distance from the light source 20. Therefore, in this case, the light emission area per unit area of each of the strip-like illumination light beams generated by the linear electrodes 32E also varies with the distance from the light source 20. It is to be noted that the linear electrode 32E corresponds to a specific example of "virtual strip-like electrode" in the application.

More specifically, the width of each linear electrode 32E varies with the distance from the light source 20, and is smaller at a shorter distance from the light source 20 and larger at a longer distance from the light source 20. For example, as illustrated in FIGS. 11, 12, and 13, the width of each linear electrode 32E is increased in proportion to the distance from the light source 20. Therefore, the width of a strip-like illumination light beam generated by the linear electrode 32E varies with the distance from the light source 20, and is smaller at a shorter distance from the light source 20 and larger at a longer distance from the light source 20. For example, although not illustrated, the width of the strip-like illumination light beam generated by the linear electrode 32E is increased in proportion to the distance from the light source 20.

It is to be noted that, in the case where the width of each of the sub-electrodes 32A varies with the distance from the light source 20, the shape of each of the sub-electrodes 32A is preferably adjusted to allow a barycenter thereof to be placed on one line. In this case, central lines in a width direction of respective linear electrodes 32E (or respective strip-like illumination light beams generated by the linear electrodes 32E) are parallel to one another. It is to be noted that the widths of the respective linear electrodes 32E may be uniform at ends thereof located farthest from or closest to the light source 20.

Figure 14:
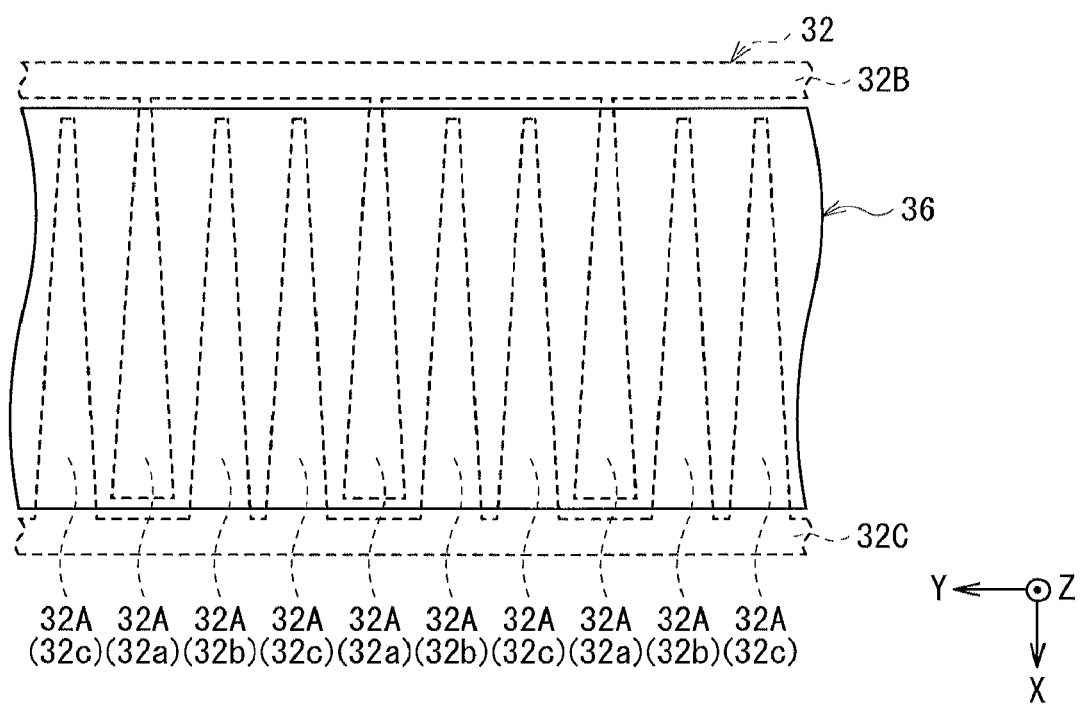
FIG. 14 is a plan view illustrating an example of an upper electrode in FIG. 4.

The upper electrode 36 is configured of one solid film (a planar electrode) formed on an entire surface. For example, as illustrated in FIG. 14, the upper electrode 36 is formed in a region facing the respective sub-electrodes 32A of the lower electrode 32. The upper electrode 36 has a leading wiring line (not illustrated) supplying a voltage to the upper electrode 36 in a region facing the wiring lines 32B and 32C of the lower electrode 32, and only the leading wiring line preferably faces a part of the wiring line 32B or the wiring line 32C, because when a region where the upper electrode 36 and the wiring lines 32B and 32C face each other is increased, unnecessary light generated by driving the region facing the wiring lines 32B and 32C of the light modulation layer 34 under application of a voltage to the wiring lines 32B and 32C is increased.

The upper electrode 36 (an electrode on a top surface of the backlight 211) or both of the lower electrode 32 and the upper electrode 36 each are configured of a transparent conductive film. The transparent conductive film preferably has, for example, a property represented by the following expression (refer to FIG. 15A). The transparent conductive film is configured of, for example, a film including ITO (hereinafter referred to as "ITO film"). It is to be noted that the lower electrode 32 and the upper electrode 36 may be made of indium zinc oxide (IZO), a metal nanowire, a carbon nanotube, graphene, or the like.

$$|A1-A2| \le 2.00$$

A1: Maximum light absorptance (%) within a range of 450 nm to 650 nm

A2: Minimum light absorptance (%) within a range of 450 nm to 650 nm

As visible light is used as illumination light beams, a difference in light absorption of the transparent conductive film is preferably small within a range of 380 to 780 nm. A difference between a maximum value and a minimum value of light absorptance within a range of 380 to 780 nm is preferably 10.00 or less, and more preferably 7.00 or less. In particular, in the case where the transparent conductive film is applied to a backlight or the like, a difference between a maximum value and a minimum value of light absorptance within a wavelength region range of a used light source is preferably 2.00 or less, and more preferably 1.00 or less. In the case where a typical LED is used as a light source, a difference between a maximum value and a minimum value of light absorptance within a range of 450 to 650 nm is preferably 2.00 or less, and more preferably 1.00 or less. It is to be noted that absorptance was measured with use of V-550 manufactured by JASCO Corporation, and reflectivity and transmittance of light incident at 5° from a direction of a normal to a substrate were measured, and a value obtained by subtracting values of the reflectivity and the transmittance from 100% was determined as absorptance.

Figure 15A:
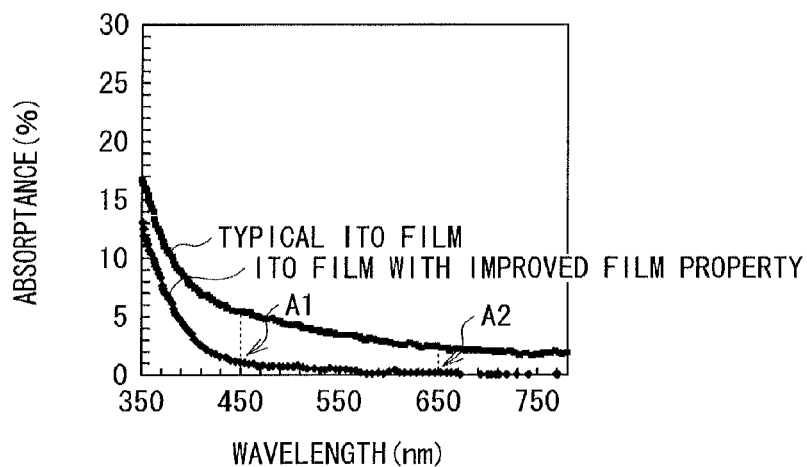
FIGS. 15A to 15C are diagrams illustrating an example of optical properties of an ITO film and positional dependence of chromaticity change in a backlight.
Figure 15B:
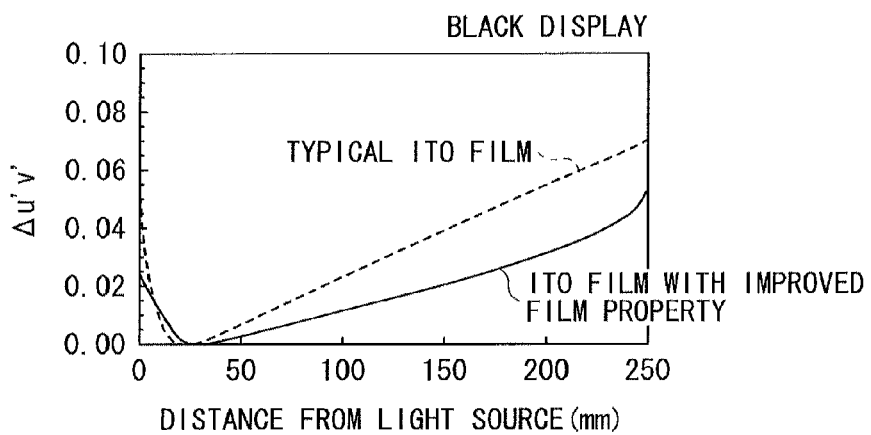
Figure 15C:
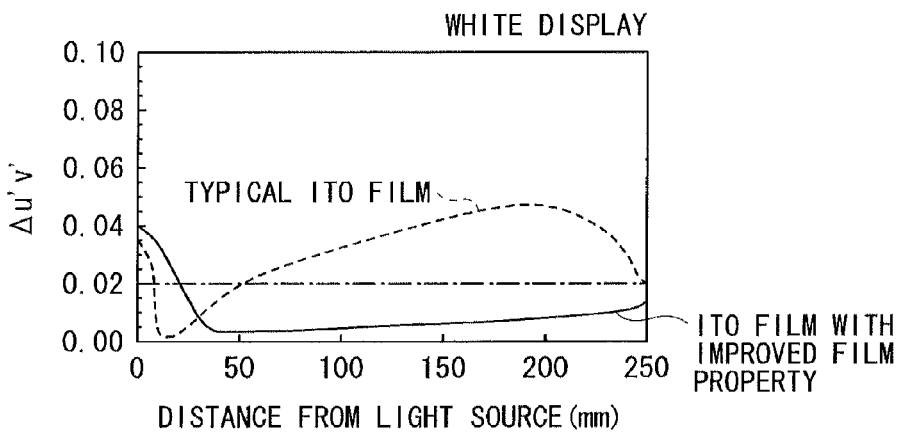
Figure 16A:
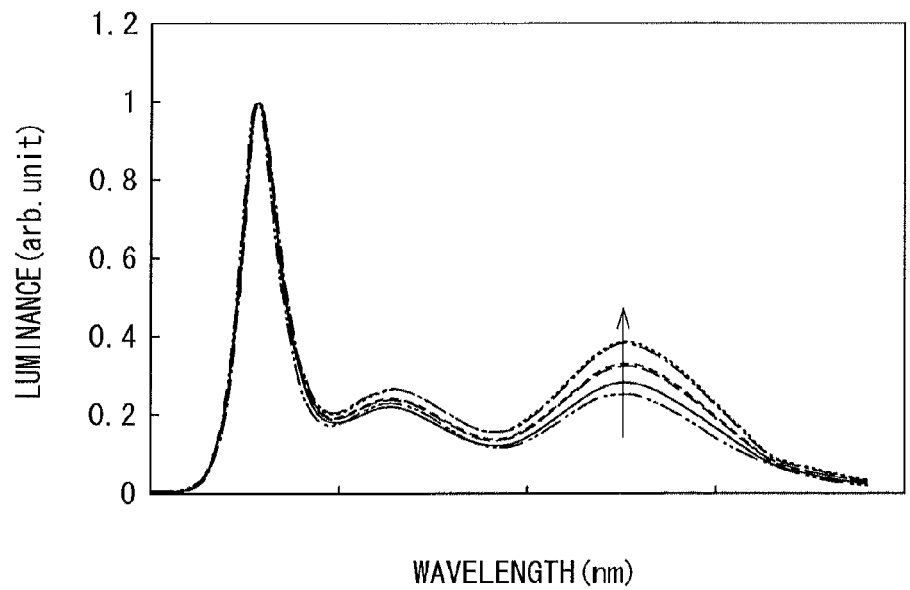
FIGS. 16A and 16B are diagrams illustrating an example of positional dependence of guided light spectrum.
Figure 16B:
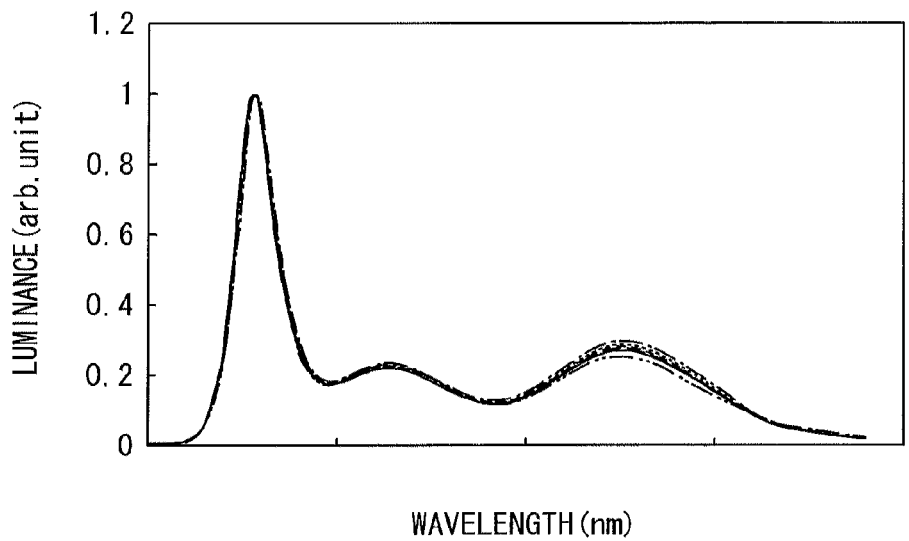

In the case where the transparent conductive film has the property represented by the above-described expression, when light emitted from the light source 20 repeatedly passes through the transparent conductive film in the light modulation device 30 in a process of propagating the light through the light guide plate 10, wavelength dependence of absorption in the transparent conductive film is suppressed. In the case where the transparent conductive film is configured of a typical ITO film, for example, as illustrated by broken lines in FIGS. 15B and 15C and an arrow in FIG. 16A, a long-wavelength-side component is increased with an increase in a distance from the light source 20. On the other hand, in the case where the transparent conductive film is configured of an ITO film, with improved film properties, which has the above-described property represented by the above-described expression, for example, as illustrated by solid lines in FIGS. 15B, 15C, and FIG. 16B, a rate of increase of the long-wavelength-side component with the distance from the light source 20 is reduced. It is to be noted that Δu'v' on a vertical axis in FIGS. 15B and 15C is a barometer indicating that the long-wavelength-side component is increased with an increase in the value of Δu'v'.

Moreover, for example, in the case where one or both of a pair of the lower electrode 32 and the upper electrode 36 included in the light modulation device 30 each are configured of an ITO film, a dye or a pigment absorbing light on a long wavelength side more than light on a short wavelength side is preferably included in some part (for example, one or both of the light guide plate 10 and the light modulation device 30) of an optical path guiding light. As the above-described dye or pigment, a known material is allowed to be used. In particular, in the case where a process of applying ultraviolet light is included in formation of the light modulation layer 34, for example, after the light modulation device 30 is formed, the light guide plate 10 including the dye or the pigment and the light modulation device 30 are preferably bonded together, or a part including the dye or the pigment is preferably protected from ultraviolet light by an ultraviolet absorption layer to prevent damage due to ultraviolet light. When light emitted from the light source 20 repeatedly passes through the light modulation device 30 in a process of propagating the light through the light guide plate 10, wavelength dependence of absorption of the light modulation device 30 including an ITO film is suppressed by adding the above-described dye or pigment to some part in the optical path guiding light in the above-described manner.

However, the lower electrode 32 (an electrode on a bottom surface of the backlight 211) may not be made of a transparent material, and may be made of, for example, metal. It is to be noted that, in the case where the lower electrode 32 is made of metal, the lower electrode 32 also has a function of reflecting light entering from a back side of the light guide plate 10 into the light modulation device 30 as in the case of the reflective plate 40. Therefore, in this case, for example, the reflective plate 40 may not be included.

Portions in positions, where the lower electrode 32 and the upper electrode 36 face each other in the case where the lower electrode 32 and the upper electrode 36 are viewed from a direction of a normal to the light modulation device 30, of the light modulation device 30 configure light modulation cells 30-1 (refer to FIG. 4). The light modulation cells 30-1 are portions in positions, where the sub-electrodes 32A and the upper electrode 36 face each other, of the light modulation device 30.

The light modulation cells 30-1 are allowed to be separately and independently driven by applying a predetermined potential difference to the lower electrode 32 (the sub-electrodes 32A) and the upper electrode 36, and exhibit transparency or a scattering property with respect to light from the light source 20, depending on magnitude of the potential difference applied to the lower electrode 32 and the upper electrode 36. However, in the case where the sub-electrodes 32A are connected to one another through the above-described wiring line 32B or the above-described wiring line 32C, a portion, corresponding to a plurality of sub-electrodes 32A connected to one another through the wiring line 32B (or the wiring line 32C), of the light modulation device 30 configures the light modulation cell 30-1. It is to be noted that transparency and the scattering property will be described in more detail when the light modulation layer 34 is described.

The alignment films 33 and 35 align, for example, a liquid crystal or a monomer used in the light modulation layer 34. Kinds of alignment films include a vertical alignment film and a horizontal alignment film, and in the embodiment, horizontal alignment films are used as the alignment films 33 and 35. Examples of the horizontal alignment films include an alignment film formed by performing a rubbing process on polyimide, polyamide imide, polyvinyl alcohol, or the like, and an alignment film provided with a groove by transfer or etching. Other examples of the horizontal alignment films include an alignment film formed by obliquely evaporating an inorganic material such as silicon oxide, a diamond-like carbon alignment film formed by ion beam irradiation, and an alignment film provided with an electrode pattern slit. In the case where plastic films are used as the transparent substrates 31 and 37, in a manufacturing process, polyamide imide capable of forming a film at a temperature of 100° C. or less is preferably used for the alignment films 33 and 35, because a firing temperature after coating surfaces of the transparent substrates 31 and 37 with the alignment films 33 and 35 is preferably as low as possible.

Moreover, it is only necessary for both of vertical and horizontal alignment films to have a function of aligning a liquid crystal and a monomer, and reliability, which is necessary for a typical liquid crystal display, with respect to repeated voltage application is not necessary, because reliability with respect to voltage application after forming a device is determined by an interface between a resultant formed by polymerizing a monomer, and a liquid crystal. Moreover, even if the alignment film is not used, for example, when an electric field or a magnetic field is applied between the lower electrode 32 and the upper electrode 36, a liquid crystal or a monomer used in the light modulation layer 34 is allowed to be aligned. In other words, while an electric field or a magnetic field is applied between the lower electrode 32 and the upper electrode 36, the alignment state of the liquid crystal or the monomer under voltage application is allowed to be fixed by ultraviolet irradiation. In the case where a voltage is used to form the alignment film, an electrode for alignment and an electrode for drive may be separately formed, or as a liquid crystal material, a dual-frequency liquid crystal allowing the sign of dielectric constant anisotropy to be inverted by a frequency may be used. Moreover, in the case where a magnetic field is used to form the alignment film, for the alignment film, a material with large magnetic susceptibility anisotropy is preferably used, and, for example, a material with a large number of benzene rings is preferably used.

The light modulation layer 34 exhibits a scattering property or transparency with respect to light from the light source 20 depending on magnitude of an electric field. For example, as illustrated in FIG. 4, the light modulation layer 34 is a composite layer including a bulk 34A and a plurality of microparticles 34B dispersed in the bulk 34A. The bulk 34A and the microparticles 34B have optical anisotropy. It is to be noted that the bulk 34A corresponds to a specific example of "second region" in the application, and the microparticle 34B corresponds to a specific example of "first region" in the application.

Figure 17A:
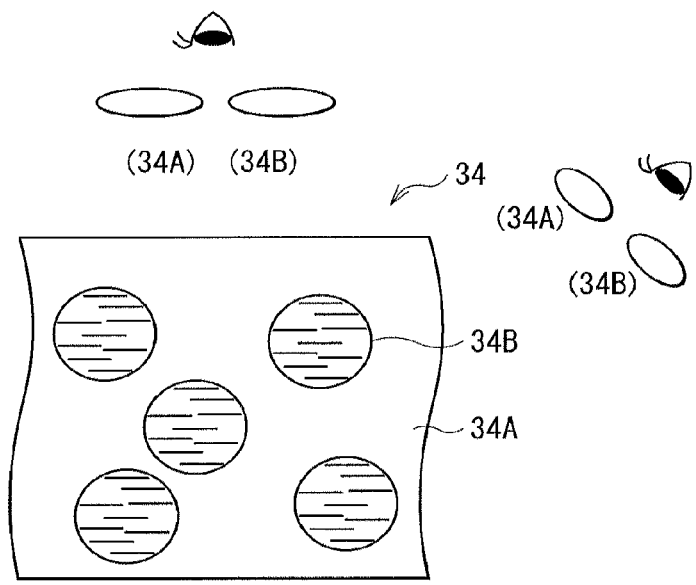
FIGS. 17A to 17C are schematic views for describing an example of a function of a light modulation layer in FIG. 4.

FIG. 17A schematically illustrates an example of an alignment state in the microparticles 34B in the case where a potential difference is not applied between the lower electrode 32 and the upper electrode 36 (hereinafter simply referred to as "under no potential difference application"). It is to be noted that, in FIG. 17A, an alignment state in the bulk 34A is not illustrated. In this description, a first potential difference is a potential difference allowing the light modulation layer 34 to exhibit the scattering property. A second potential difference is a potential difference allowing the light modulation layer 34 to exhibit transparency. In this description, "under no potential difference application" is a concept including "when the second potential difference lower than the first potential difference is applied".

Figure 17B:
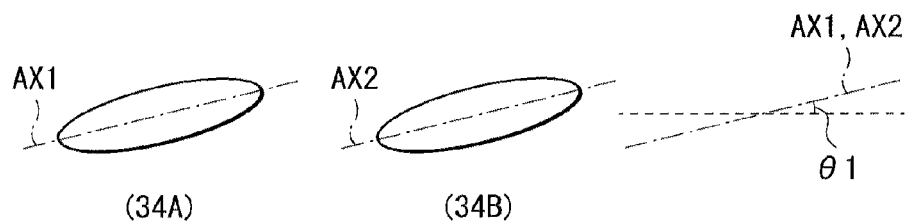
Figure 17C:
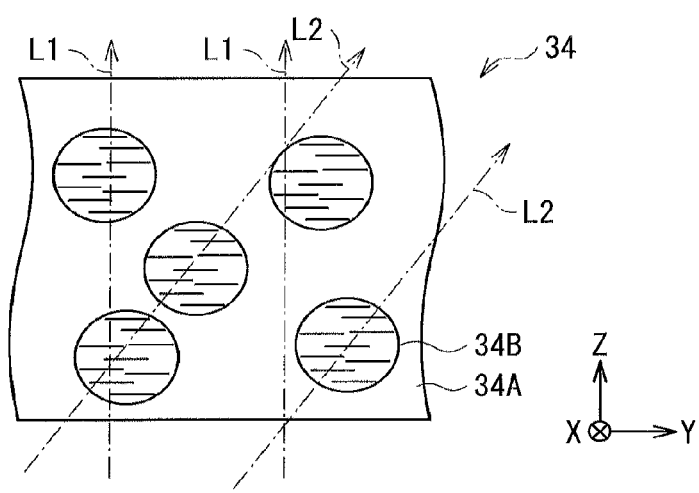

FIG. 17B illustrates an example of refractive index ellipsoids exhibiting refractive index anisotropy of the bulk 34A and the microparticle 34B under no potential difference application. The refractive index ellipsoid is a tensor ellipsoid representing a refractive index of linearly polarized light incident from various directions, and when a section of an ellipsoid from a light incident direction is observed, the refractive index is allowed to be geometrically learned. FIG. 17C schematically illustrates an example of a state where light L1 toward a front direction and light L2 toward an oblique direction pass through the light modulation layer 34 under no potential difference application.

Figure 18A:
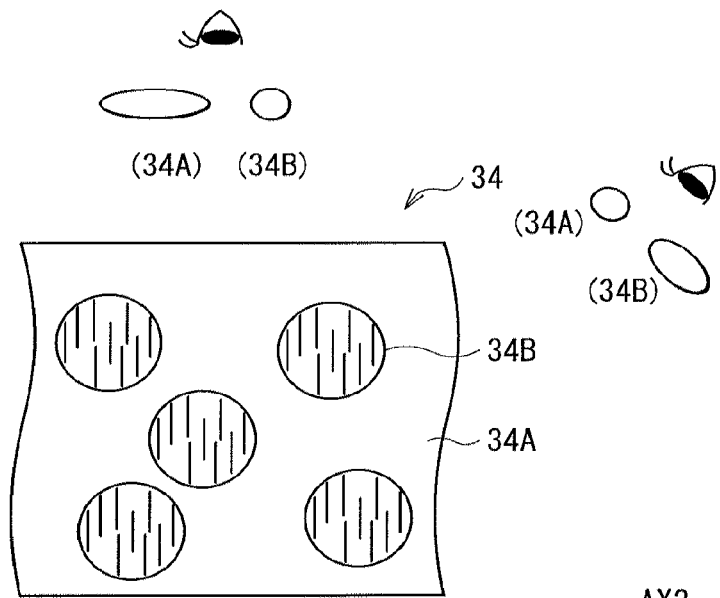
FIGS. 18A to 18C are schematic views for describing another example of the function of the light modulation layer in FIG. 4.

FIG. 18A schematically illustrates an example of an alignment state in the microparticles 34B in the case where a potential difference is applied between the lower electrode 32 and the upper electrode 36 (hereinafter simply referred to as "under potential difference application"). It is to be noted that, in FIG. 18A, an alignment state in the bulk 34A is not illustrated. In this description, "under potential difference application" means "when the first potential difference is applied".

Figure 18B:
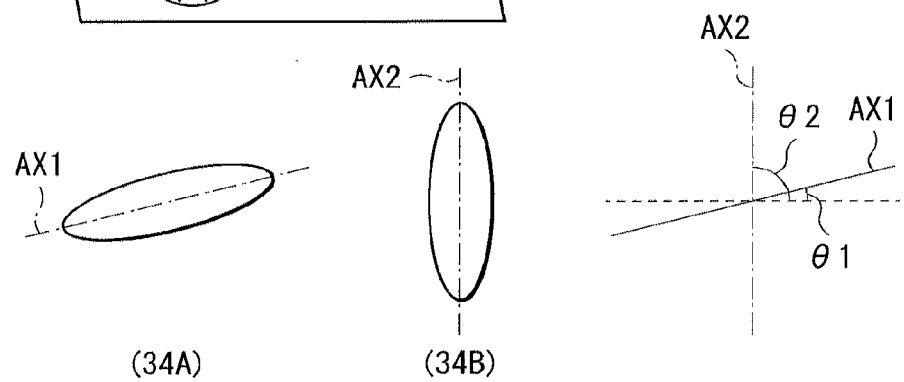
Figure 18C:
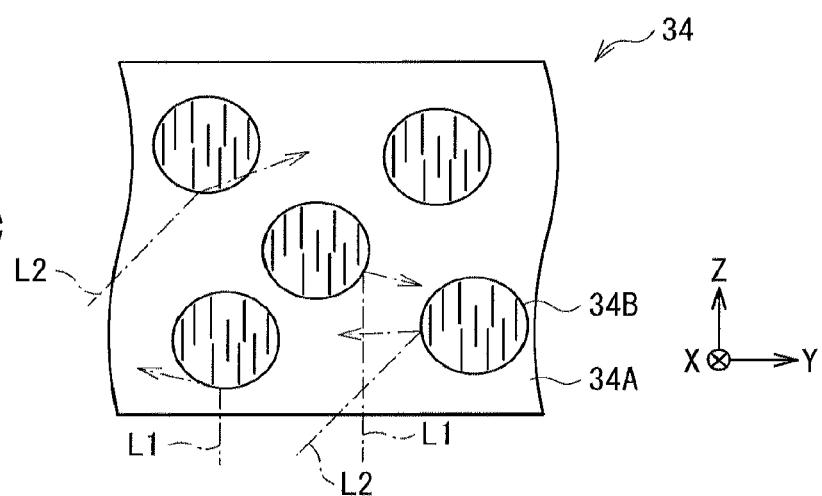

FIG. 18B illustrates an example of refractive index ellipsoids exhibiting refractive index anisotropy of the bulk 34A and the microparticle 34B under potential difference application. FIG. 18C schematically illustrates an example of a state where the light L1 toward the front direction and the light L2 toward the oblique direction are scattered by the light modulation layer 34 in the case where a potential difference is applied between the lower electrode 32 and the upper electrode 36.

For example, as illustrated in FIGS. 17A and 17B, the bulk 34A and the microparticle 34B are structured to allow the direction of an optical axis AX1 of the bulk 34A and the direction of an optical axis AX2 of the microparticle 34B to coincide with (are parallel to) each other under no potential difference application. It is to be noted that the optical axes AX1 and AX2 each indicate a line parallel to a travel direction of a light beam allowing a refractive index to have one value irrespective of polarization direction. Moreover, it is not necessary for the directions of the optical axis AX1 and the optical axis AX2 to consistently coincide with each other, and the directions of the optical axis AX1 and the optical axis AX2 may be slightly deviated from each other due to, for example, a manufacturing error.

Moreover, for example, the microparticle 34B is structured to allow the optical axis AX2 thereof to be parallel to the light incident surface 10A of the light guide plate 10 under no potential difference application. Further, for example, the microparticle 34B is further structured to allow the optical axis AX2 thereof to intersect with surfaces of the transparent substrates 31 and 37 at a slight angle θ1 (refer to FIG. 17B) under no potential difference application. It is to be noted that the angle θ1 will be described in more detail when a material forming the microparticle 34B is described.

On the other hand, for example, the bulk 34A is structured to have a fixed optical axis AX1 irrespective of whether or not a potential difference is applied between the lower electrode 32 and the upper electrode 36. More specifically, for example, as illustrated in FIGS. 17A, 17B, 18A, and 18B, the bulk 34A is structured to have the optical axis AX1 parallel to the light incident surface 10A of the light guide plate 10 as well as intersecting with the surfaces of the transparent substrates 31 and 37 at the predetermined angle θ1. In other words, under no potential difference application, the optical axis AX1 of the bulk 34A is parallel to the optical axis AX2 of the microparticle 34B.

It is to be noted that it is not necessary for the optical axis AX2 to be consistently parallel to the light incident surface 10A as well as to consistently intersect with the surfaces of the transparent substrates 31 and 37 at the angle θ1, and the optical axis AX2 may intersect with the surfaces of the transparent substrates 31 and 37 at an angle slightly different from the angle θ1 due to, for example, a manufacturing error. Moreover, it is not necessary for the optical axes AX1 and AX2 to be consistently parallel to the light incident surface 10A, and the optical axes AX1 and AX2 may intersect with the light incident surface 10A at a small angle due to, for example, a manufacturing error.

Figure 19:
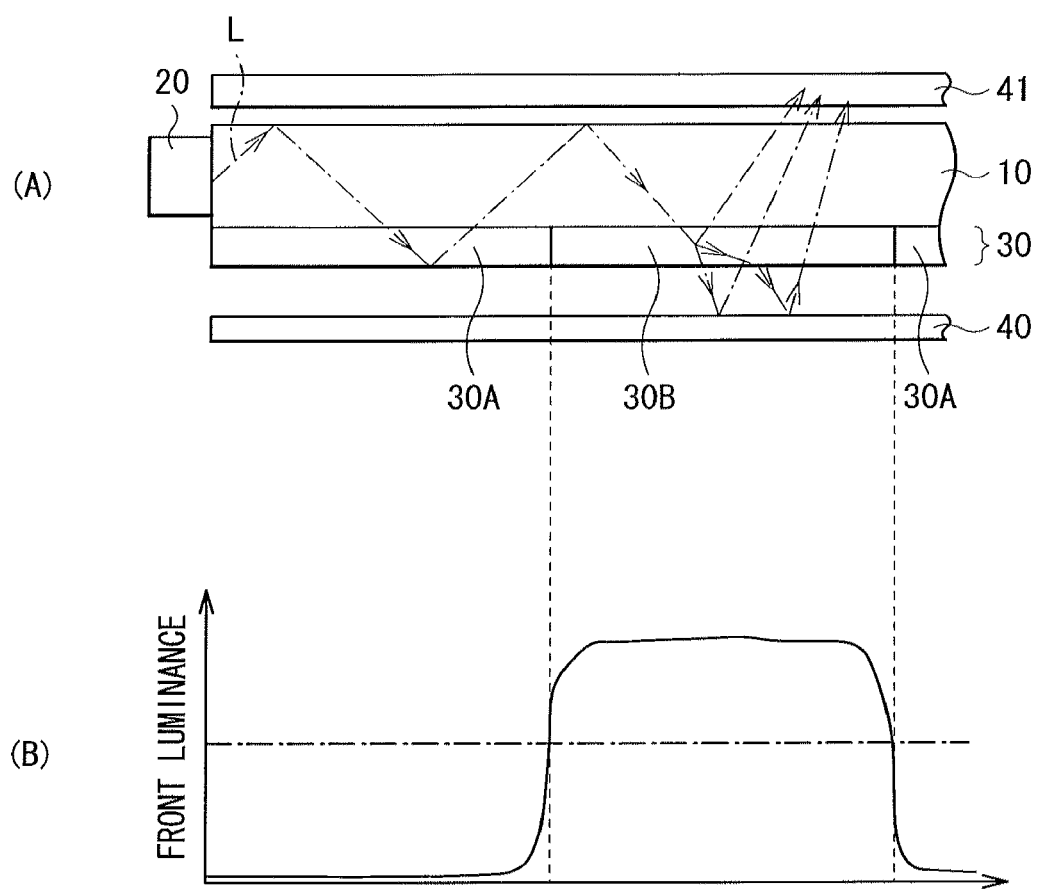
FIG. 19 is a schematic view for describing an example of a function of the backlight in FIG. 4.

In this case, ordinary refractive indices of the bulk 34A and the microparticle 34B are preferably equal to each other, and extraordinary refractive indices of the bulk 34A and the microparticle 34B are preferably equal to each other. In this case, for example, under no potential difference application, as illustrated in FIG. 17A, there is little difference in refractive index in all directions including the front direction and the oblique direction, and high transparency is obtained. Therefore, for example, as illustrated in FIG. 17C, the light L1 toward the front direction and the light L2 toward the oblique direction pass through the light modulation layer 34 without being scattered in the light modulation layer 34. As a result, for example, as illustrated in parts (A) and (B) in FIG. 19, light L from the light source 20 (light from an oblique direction) is totally reflected by interfaces (a bottom surface of the transparent substrate 31 and a top surface of the light guide plate 10) of a transparent region (a transparent region 30A) of the light modulation layer 34, and luminance (luminance in black display) in the transparent region 30A is decreased, compared to the case where light is uniformly emitted from an entire surface of the backlight 211 (indicated by an alternate long and short dash line in the part (B) in FIG. 19). It is to be noted that a profile of front luminance in the part (B) in FIG. 19 is obtained by arranging a diffusion sheet 41 on the light guide plate 10, and measuring the front luminance through the diffusion sheet 41.

It is to be noted that the top surface of the light guide plate 10 as one interface of the transparent region 30A is in contact with a gap between the display panel 210 and the light guide plate 10; however, the gap is preferably filled with a material with a lower refractive index than that of the top surface of the light guide plate 10. A layer made of such a low-refractive-index material (a low-refractive-index material layer 220 (refer to FIG. 3)) is typically air, and may be a glue or an adhesive made of a low-refractive-index material.

For example, under potential difference application, as illustrated in FIG. 18A, the bulk 34A and the microparticle 34B are structured to allow the directions of the optical axis AX1 and the optical axis AX2 to be different from (intersect with or be orthogonal (or substantially orthogonal) to) each other. Moreover, for example, under potential difference application, the microparticle 34B is structured to allow the optical axis AX2 thereof to be parallel to the light incident surface 10A of the light guide plate 10 as well as to intersect with the surfaces of the transparent substrates 31 and 37 at an angle θ2 (for example, 90°) larger than the angle θ1. It is to be noted that the angle θ2 will be described in more detail when the material forming the microparticles 34B is described.

Therefore, under potential difference application, in the light modulation layer 34, a difference in refractive index in all directions including the front direction and the oblique direction is increased to obtain a high scattering property. For example, as illustrated in FIG. 17C, the light L1 toward the front direction and the light L2 toward the oblique direction are thereby scattered in the light modulation layer 34. As a result, for example, as illustrated in the part (A) in FIG. 19, the light L from the light source 20 (light from the oblique direction) passes through an interface (an interface between the transparent substrate 31 or the light guide plate 10 and the air) of a scattering region 30B, and light having passed toward the reflective plate 40 is reflected by the reflective plate 40 to pass through the light modulation device 30. Therefore, the luminance of the scattering region 30B is extremely higher than that in the case where light is uniformly emitted from the entire surface of the backlight 211 (indicated by the alternate long and short dash line in the part (B) in FIG. 19), and luminance in white display is partially increased (partial luminance enhancement) by a reduced amount of the luminance of the transparent region 30A.

It is to be noted that the ordinary refractive indices of the bulk 34A and the microparticle 34B may be slightly different from each other due to, for example, a manufacturing error, and are preferably, for example, 0.1 or less, and more preferably 0.05 or less. Moreover, the extraordinary refractive indices of the bulk 34A and the microparticle 34B may be slightly different from each other due to, for example, a manufacturing error, and are preferably, for example, 0.1 or less, and more preferably 0.05 or less.

Moreover, a refractive index difference in the bulk 34A ($\Delta n_P$=extraordinary refractive index $ne_P$—ordinary refractive index $no_P$) and a refractive index difference in the microparticle 34B ($\Delta n_L$=extraordinary refractive index $ne_L$—ordinary refractive index $no_L$) are preferably as large as possible, and are preferably 0.05 or over, more preferably 0.1 or over, and still more preferably 0.15 or over. In the case where the refractive index differences in the bulk 34A and the microparticle 34B are large, the scattering power of the light modulation layer 34 is enhanced to allow light guide conditions to be easily disrupted, thereby allowing light from the light guide plate 10 to be easily extracted.

Figure 20A:
FIGS. 20A and 20B are diagrams illustrating an example of a streaky structure in a bulk in FIG. 4.
Figure 20B:
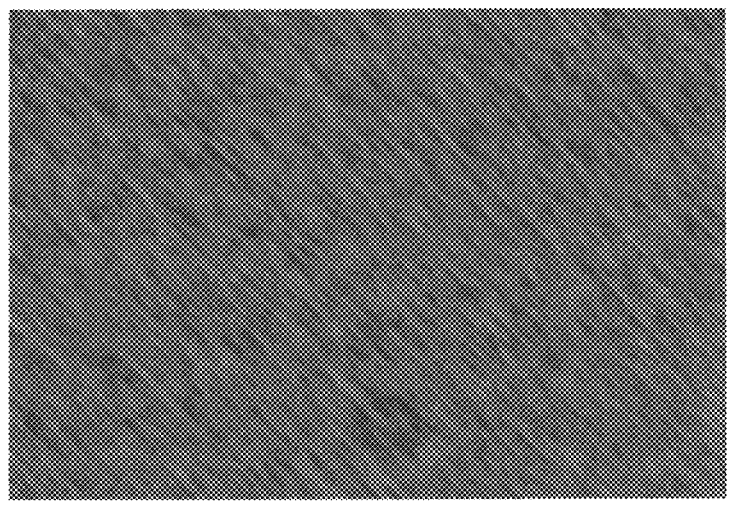

Further, the bulk 34A and the microparticle 34B have different response speeds with respect to an electric field. The bulk 34A has, for example, a streaky structure (refer to FIGS. 20A and 20B), a porous structure, or a rod-like structure having a response speed slower than that of the microparticle 34B. It is to be noted that FIGS. 20A and 20B are polarizing micrographs in the case where an electric field is applied to the light modulation device 30, and bright streaky parts in FIGS. 20A and 20B correspond to the above-described streaky structure. FIG. 20A illustrates a state of the streaky structure of the bulk 34A in the case where the weight ratio of a liquid crystal to a monomer is 95:5, and FIG. 20B illustrates a state of the streaky structure of the bulk 34A in the case where the weight ratio of the liquid crystal to the monomer is 90:10. The bulk 34A is formed of, for example, a polymer material obtained by polymerizing a low-molecular monomer. The bulk 34A is formed, for example, by polymerizing, by one or both of heat and light, a material (for example, a monomer) with orientation and polymerization which is aligned along the alignment direction of the microparticles 34B or the alignment directions of the alignment films 33 and 35.

For example, the streaky structure, the porous structure or the rod-like structure of the bulk 34A has a long axis in a direction parallel to the light incident surface 10A of the light guide plate 10 as well as intersecting with the surfaces of the transparent substrates 31 and 37 at the slight angle θ1. In the case where the bulk 34A has the streaky structure, an average streaky texture size in a short-axis direction is preferably within a range of 0.1 μm to 10 μm both inclusive to enhance a scattering property of guided light, and more preferably within a range of 0.2 μm to 2.0 μm both inclusive. In the case where the average streaky texture size in the short-axis direction is within a range of 0.1 μm to 10 μm both inclusive, scattering power in the light modulation device 30 is substantially equal in a visible region of 380 to 780 nm. Therefore, in a plane, only light of a specific wavelength component is not increased or decreased; therefore, a balance in a visible region is achievable in the plane. In the case where the average streaky texture size in the short-axis direction is smaller than 0.1 μm or exceeds 10 μm, the scattering power of the light modulation device 30 is low irrespective of wavelength, and it is difficult for the light modulation device 30 to function as a light modulation device.

Moreover, to reduce wavelength dependence of scattering, the average streaky texture size in the short-axis direction is preferably within a range of 0.5 μm to 5 μm both inclusive, and more preferably within a range of 1 μm to 3 μm. In such a case, in a process of propagating light emitted from the light source 20 through the light guide plate 10, when the light repeatedly passes through the bulk 34A in the light modulation device 30, wavelength dependence of scattering in the bulk 34A is suppressed. The streaky texture size is allowed to be observed by a polarizing microscope, a confocal microscope, an electron microscope, or the like.

On the other hand, the microparticles 34B mainly include, for example, a liquid crystal material, and have a response speed sufficiently higher than that of the bulk 34A. Examples of the liquid crystal material (liquid crystal molecules) included in the microparticles 34B include rod-like molecules. As liquid crystal molecules included in the microparticles 34B, liquid crystal molecules having positive dielectric constant anisotropy (a so-called positive type liquid crystal) are preferably used.

In this case, under no potential difference application, the long-axis directions of the liquid crystal molecules in the microparticles 34B are parallel to the optical axis AX1. At this time, the long axes of the liquid crystal molecules in the microparticles 34B are parallel to the light incident surface 10A of the light guide plate 10, as well as intersect with the surfaces of the transparent substrates 31 and 37 at the slight angle θ1. In other words, under no potential difference application, the liquid crystal molecules in the microparticles 34B are aligned to be tilted at the angle θ1 in a plane parallel to the light incident surface 10A of the light guide plate 10. The angle θ1 is called a pretilt angle, and is, for example, preferably within a range of 0.1° to 30° both inclusive. The angle θ1 is more preferably within a range of 0.5° to 10° both inclusive, and still more preferably within a range of 0.7° to 2° both inclusive. When the angle θ1 is increased, scattering efficiency tends to be reduced due to the following reason. Moreover, when the angle θ1 is too small, the angle of a direction where the liquid crystal rises under potential difference application varies. For example, the liquid crystal may rise in a 180°-different direction (reverse tilt). Therefore, refractive index differences in the microparticles 34B and the bulk 34A are not allowed to be effectively used; therefore, scattering efficiency tends to be reduced, and luminance tends to be reduced.

Further, under potential difference application, in the microparticles 34B, the long-axis directions of the liquid crystal molecules intersect with or are orthogonal (or substantially orthogonal) to the optical axis AX1. At this time, the long axes of the liquid crystal molecules in the microparticles 34B are parallel to the light incident surface 10A of the light guide plate 10, as well as intersect with the surfaces of the transparent substrates 31 and 37 at the angle θ2 (for example, 90°) which is larger than the angle θ1. In other words, under potential difference application, the liquid crystal molecules in the microparticles 34B are aligned to be tilted at the angle θ2 in a plane parallel to the light incident surface 10A of the light guide plate 10 or to rise upright at the angle θ2(=90°).

The above-described monomer having orientation and polymerization may be a material having optical anisotropy and forming a composite material with a liquid crystal; however, a low-molecular monomer which is cured with ultraviolet light is preferable in this embodiment. It is preferable that, in a state where no voltage is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where a liquid crystal is used as the microparticles 34B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfuncitonal group may be added. In the case where the bulk 34A has the above-described streaky structure, as the material of the bulk 34A, a bifunctional liquid crystal monomer is preferably used. Moreover, a monofunctional monomer may be added to the material of the bulk 34A to adjust a temperature at which liquid crystal properties are exhibited, or a tri- or more-functional monomer may be added to the material of the bulk 34A to improve crosslink density.

For example, the drive circuit 50 controls the magnitude of a potential difference applied to a pair of electrodes (the lower electrode 32 and the upper electrode 36) of each of the light modulation cells 30-1 to allow the optical axes AX2 of the microparticles 34B in one light modulation cell 30-1 to be parallel or substantially parallel to the optical axis AX1 of the bulk 34A, as well as to allow the optical axes AX2 of the microparticles 34B in another light modulation cell 30-1 to intersect with or be orthogonal (or substantially orthogonal) to the optical axis AX1 of the bulk 34A. In other words, the drive circuit 50 allows, by electric field control, the direction of the optical axis AX1 of the bulk 34A and the directions of the optical axes AX2 of the microparticles 34B to coincide with (or substantially coincide with) each other or to be different from (or orthogonal to) each other.

When the drive circuit 50 receives the signal specifying three-dimensional display as the control signal 204A (in a three-dimensional display mode), the drive circuit 50 allows the backlight 211 to emit a plurality of strip-like illumination light beams. More specifically, the drive circuit 50 applies, to each light modulation cell 30-1 including the sub-electrode 32a, a potential difference allowing the light modulation layer 34 to exhibit the scattering property, and applies, to each light modulation cell 30-1 including the sub-electrode 32b or the sub-electrode 32c, a potential difference allowing the light modulation layer 34 to exhibit transparency. In other words, the drive circuit 50 controls the magnitude of a potential difference applied to a pair of electrodes (the sub-electrode 32A and the upper electrode 36A) of each of the light modulation cells 30-1 to allow the optical axes AX2 of the microparticles 34B in each light modulation cell 30-1 including the sub-electrode 32a to intersect with or be orthogonal (or substantially orthogonal) to the optical axis AX1 of the bulk 34A, as well as to allow the optical axes AX2 of the microparticles 34B in each light modulation cell 30-1 including the sub-electrode 32b or the sub-electrode 32c to be parallel to the optical axis AX1 of the bulk 34A. Therefore, an electric field for the three-dimensional display mode is generated in the light modulation layer 34. It is to be noted that the electric field for the three-dimensional display mode means an electric field having an in-plane distribution corresponding to the position, shape, and size of each light modulation cell 30-1 including the sub-electrode 32a.

Moreover, when the drive circuit 50 receives the signal specifying two-dimensional display as the control signal 204A (in a two-dimensional display mode), the drive circuit 50 allows the backlight 211 to emit planar illumination light. More specifically, the drive circuit 50 applies, to each of the light modulation cells 30-1, a potential difference allowing the light modulation layer 34 to exhibit the scattering property. In other words, the drive circuit 50 controls the magnitude of a potential difference applied to a pair of electrodes (the sub-electrode 32A and the upper electrode 36) of each of the light modulation cells 30-1 to allow the optical axes AX2 of the microparticles 34B in all light modulation cells 30-1 included in the backlight 211 to intersect with or be orthogonal (or substantially orthogonal) to the optical axis AX1 of the bulk 34A. Therefore, an electric field for the two-dimensional display mode is generated in the light modulation layer 34. It is to be noted that the electric field for the two-dimensional display mode means an electric field having a distribution in an entire plane.

It is to be noted that when the drive circuit 50 receives the signal specifying two-dimensional display as the control signal 204A as well as a signal associated with image data (in a dual-view mode), the drive circuit 50 may allow the backlight 211 to emit planar illumination light having a luminance distribution based on the image data (for example, planar illumination light having a dark part in a plane). However, in such a case, the lower electrode 32 preferably has a layout corresponding to pixels of the display panel 210. In the case where the lower electrode 32 has a layout corresponding to the pixels of the display panel 210, based on the image data, the drive circuit 50 applies a potential difference allowing the light modulation layer 34 to exhibit the scattering property to some of the light modulation cells 30-1, and applies a potential difference allowing the light modulation layer 34 to exhibit transparency to other light modulation cells 30-1. Therefore, an electric field for the dual-view mode is generated in the light modulation layer 34. It is to be noted that the electric field for the dual-view mode means an electric field having an in-plane distribution corresponding to the position, shape, and size of each of the light modulation cells 30-1 to which the potential difference allowing the light modulation layer 34 to exhibit the scattering property is applied.

Next, a method of manufacturing the backlight 211 according to the embodiment will be described below referring to FIGS. 21A to 21C to FIGS. 23A to 23C.

Figure 21A:
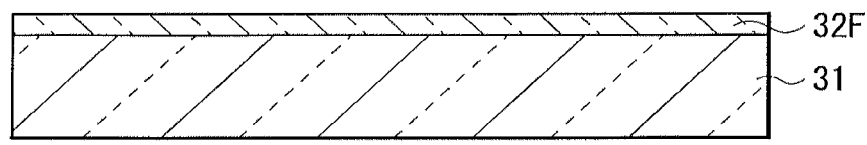
FIGS. 21A to 21C are sectional views for describing steps of manufacturing the light modulation device in FIG. 4.
Figure 21B:
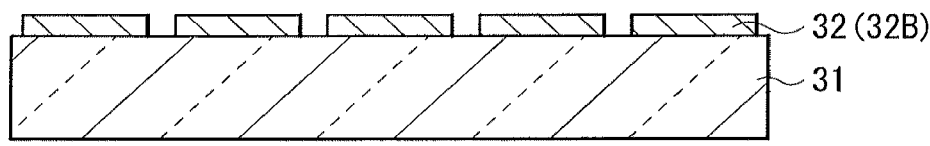

First, a transparent conductive film 32F made of ITO or the like is formed on the transparent substrate 31 configured of a glass substrate or a plastic film substrate (refer to FIG. 21A). Next, a resist layer is formed on an entire surface of the transparent conductive film 32F, and then an electrode pattern is formed on the resist layer by patterning. Then, the lower electrode 32 is formed by exposure and development, and the resist layer is removed (refer to FIG. 21B).

As a patterning method, for example, a photolithography method, a laser processing method, a pattern printing method, a screen printing method, or the like may be used. Moreover, for example, patterning may be performed by performing predetermined heating after performing screen printing with use of a "HyperEtch" material of Merck Ltd., and then rinsing the material with water. The electrode pattern is determined by a driving method and the number of divisions of partial drive. The electrode pattern is processed with a pixel pitch of a used display or a pitch close thereto. The processing width of an electrode depends on a processing method; however, in terms of light extraction efficiency, the width is preferably as small as possible. The processing width of the electrode is, for example, 50 μm or less, preferably 20 μm, and more preferably 5 μm or less. Moreover, the electrode pattern may be formed by performing pattern printing on ITO nanoparticles, and then firing the ITO nanoparticles.

Figure 21C:
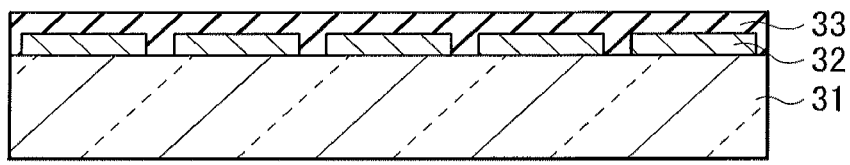

Next, after an entire surface of the transparent substrate 31 is coated with the alignment film 33, the alignment film 33 is dried and fired (refer to FIG. 21C). In the case where a polyimide-based material is used as the alignment film 33, NMP (N-methyl-2-pyrrolidone) is often used as a solvent; however, at this time, a temperature of approximately 200° C. is necessary under an atmosphere. It is to be noted that, in this case, when a plastic substrate is used as the transparent substrate 31, the alignment film 33 may be vacuum-dried and fired at 100° C. After that, a rubbing process is performed on the alignment film 33. Therefore, the alignment film 33 functions as an alignment film for horizontal alignment, and a pretilt is allowed to be formed in a rubbing direction of the alignment film 33.

Likewise, a transparent conductive film made of ITO or the like is formed on the transparent substrate 37 configured of a glass substrate or a plastic film substrate. Next, a resist layer is formed on an entire surface of the transparent conductive film, and then an electrode pattern is formed on the resist layer by patterning. Then, the upper electrode 36 is formed by exposure and development, and the resist layer is removed. Next, after an entire surface of the upper electrode 36 is coated with the alignment film 35, the alignment film 35 is dried and fired. After that, a rubbing process is performed on the alignment film 35. Therefore, the alignment film 35 functions as an alignment film for horizontal alignment, and a pretilt is allowed to be formed in a rubbing direction of the alignment film 35.

Figure 22A:
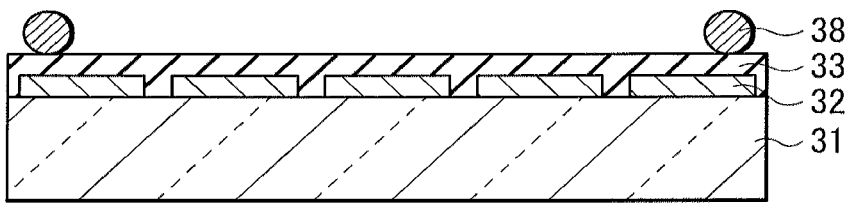
FIGS. 22A to 22C are sectional views for describing manufacturing steps following FIGS. 21A to 21C.
Figure 22B:
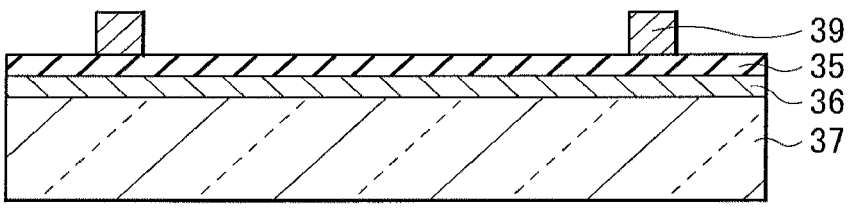

Next, spacers 38 allowing a cell gap to be formed are sprayed on the alignment film 33 by a dry method or a wet method (refer to FIG. 22A). It is to be noted that, in the case where the light modulation cells 30-1 are formed by a vacuum bonding method, the spacers 38 may be mixed in a mixture which is to be dropped. Alternatively, columnar spacers may be formed by a photolithography method, instead of the spacers 38. Then, the alignment film 35 is coated with a sealant pattern 39 for bonding and preventing leakage of the liquid crystal in, for example, a frame shape (refer to FIG. 22B). The sealant pattern 39 is allowed to be formed by a dispenser method or a screen printing method.

The vacuum bonding method (a one-drop-fill (ODF) method) will be described below; however, the light modulation cells 30-1 may also be formed by a vacuum injection method, a roll bonding method, or the like.

Figure 22C:
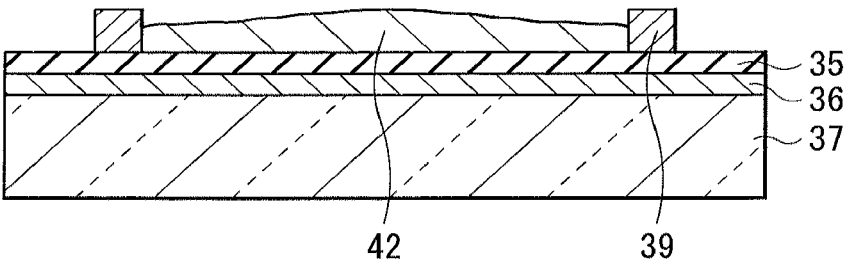

First, a mixture 42 of a liquid crystal and a monomer, corresponding to a volume determined by a cell gap, a cell area, or the like, is dropped uniformly on a plane (refer to FIG. 22C). The mixture 42 is preferably dropped with use of a linear guide precise dispenser; however, a die coater or the like may be used with use of the sealant pattern 39 as a bank.

The above-described materials may be used as the liquid crystal and the monomer, and a weight ratio of the liquid crystal to the monomer is within a range of 98:2 to 50:50, preferably within a range of 95:5 to 75:25, and more preferably within a range of 92:8 to 85:15. A drive voltage is allowed to be decreased by increasing the ratio of the liquid crystal; however, when the liquid crystal is increased too much, the liquid crystal tends to have difficulty in returning to a transparent state, such as a decline in whiteness under voltage application or a decrease in the response speed after turning the voltage off.

In addition to the liquid crystal and the monomer, a polymerization initiator may be added to the mixture 42. A monomer ratio of the added polymerization initiator may be adjusted within a range of 0.1 to 10 wt %, depending on a used ultraviolet wavelength. A polymerization inhibitor, a plasticizer, a viscosity modifier, or the like may be further added to the mixture 42, as necessary. When the monomer is a solid or gel at room temperature, a cap, a syringe, and a substrate are preferably warmed.

After the transparent substrates 31 and 37 are put in a vacuum bonding system (not illustrated), evacuation is performed to bond the transparent substrates 31 and 37 (refer to FIG. 23A). After that, a resultant is released to the atmosphere to uniformize the cell gap by uniform pressurization under atmospheric pressure. The cell gap may be appropriately selected based on a relationship between white luminance (whiteness) and the drive voltage; however, the cell gap is within a range of 5 to 40 μm, preferably within a range of 6 to 20 μm, and more preferably within a range of 7 to 10 μm.

After bonding, an alignment process is preferably performed as necessary (not illustrated). In the case where light leakage occurs by an insertion of a bonded cell between crossed-Nicols polarization plates, the cell may be heated for a predetermined time or be left at room temperature to be aligned. After that, the monomer is irradiated with ultraviolet light L3 to be polymerized (refer to FIG. 23B). Thus, the light modulation device 30 is manufactured.

It is preferable to prevent the temperature of the cell from being changed under ultraviolet irradiation. An infrared cut filter is preferably used, or an UV-LED or the like is preferably used as a light source. Ultraviolet irradiance exerts an influence on an organization structure of a composite material; therefore, the ultraviolet irradiance is preferably adjusted appropriately based on a used liquid crystal material or a used monomer material, and a composition thereof, and the ultraviolet irradiance is preferably within a range of 0.1 to 500 mW/cm$^2$, and more preferably within a range of 0.5 to 30 mW/cm$^2$. There is a tendency that the lower the ultraviolet irradiance is, the lower the drive voltage becomes, and preferable ultraviolet irradiance is allowed to be selected in terms of both of productivity and properties.

Then, the light modulation device 30 is bonded to the light guide plate 10 (refer to FIG. 23C). Bonding may be carried out by sticking or adhesion; however, it is preferable that the light modulation device 30 be adhered or stuck with a material having a refractive index which is as close to a refractive index of the light guide plate 10 and a refractive index of a substrate material of the light modulation device 30 as possible. Finally, leading lines (not illustrated) are attached to the lower electrode 32 and the upper electrode 36. Thus, the backlight 211 according to the embodiment is manufactured.

Although the process of forming the light modulation device 30, and finally bonding the light modulation device 30 to the light guide plate 10 is described, the transparent substrate 37 on which the alignment film 35 is formed may be bonded in advance to the surface of the light guide plate 10 to form the backlight 211. Moreover, the backlight 211 may be formed by one of a sheet-feeding method and a roll-to-roll method.

Next, functions and effects of the backlight 211 according to the embodiment will be described below.

Figure 24:
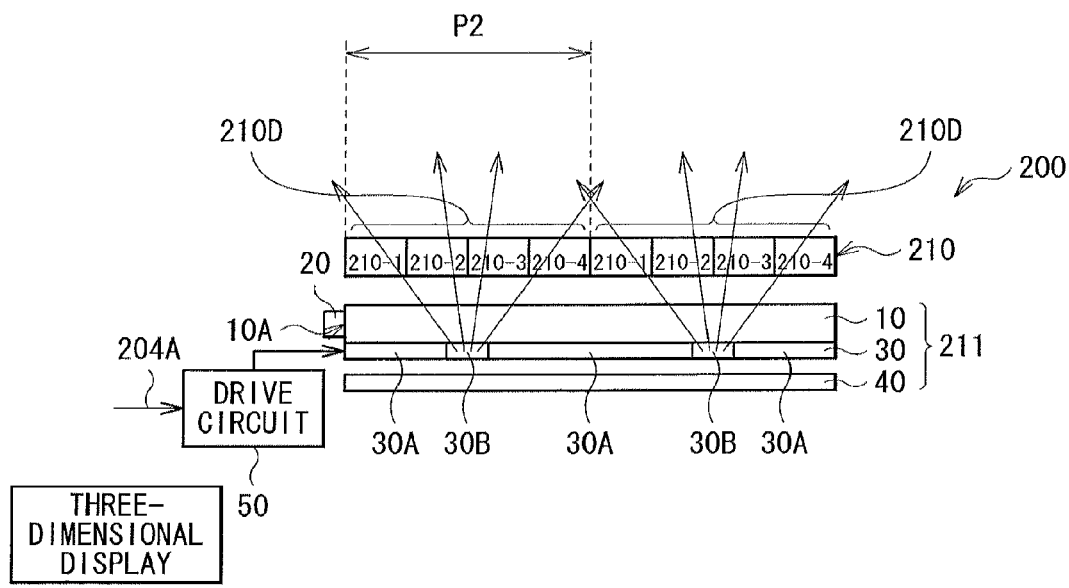
FIG. 24 is a schematic view for describing an example of three-dimensional display on the display section in FIG. 3.
Figure 25:
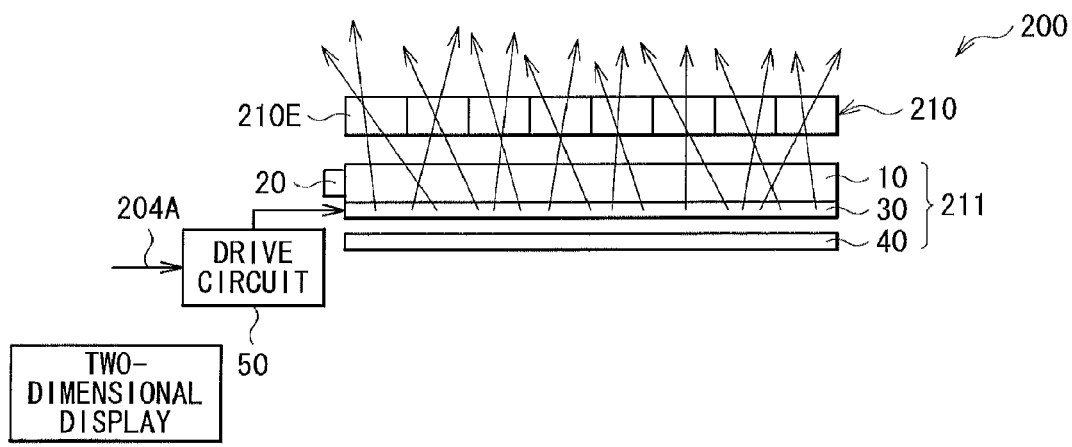
FIG. 25 is a schematic view for describing an example of two-dimensional display on the display section in FIG. 3.

In the backlight 211 according to the embodiment, in three-dimensional display, a potential difference is applied to a pair of electrodes (the sub-electrode 32A and the upper electrode 36A) of each of the light modulation cells 30-1 to allow the optical axes AX2 of the microparticles 34B in each light modulation cell 30-1 including the sub-electrode 32a to intersect with or be orthogonal (substantially orthogonal) to the optical axis AX1 of the bulk 34A, and to allow the optical axes AX2 of the microparticles 34B in each light modulation cell 30-1 including the sub-electrode 32b or the sub-electrode 32c to be parallel or substantially parallel to the optical axis AX1 of the bulk 34A. Therefore, in the light modulation device 30, each light modulation cell 30-1 including the sub-electrode 32a serves as a scattering region 30B, and each light modulation cell 30-1 including the sub-electrode 32b or the sub-electrode 32c serves as a transparent region 30A. As a result, light emitted from the light source 20 and entering into the light guide plate 10 passes through the transparent region 30A of the light modulation device 30, and is scattered in the scattering region 30B of the light modulation device 30 (refer to FIG. 24). The light modulation device 30 (the light modulation layer 34) uses light from the light source 20 in such a manner to generate a plurality of strip-like illumination light beams extending in a direction intersecting with or orthogonal (or substantially orthogonal) to the light incident surface 10A. Light beams having passed through a bottom surface of the scattering region 30B in the strip-like illumination light beams (scattered light beams) are reflected by the reflective plate 40 to be returned to the light guide plate 10 again, and then the light beams are emitted from a top surface of the backlight 211. Moreover, light beams toward a top surface of the scattering region 30B in the strip-like illumination light beams (the scattered light beams) pass through the light guide plate 10, and then are emitted from the top surface of the backlight 211. Thus, in three-dimensional display, light beams are hardly emitted from the top surface of the transparent region 30A, and light beams are emitted from the top surface of the scattering region 30B. Thus, for example, as illustrated in FIG. 24, a plurality of strip-like illumination light beams are emitted to a front direction.

Therefore, as each strip-like illumination light beam emitted toward the front direction enters into a back surface of the display panel 210, for example, in the case where two-dimensional image data for three-dimensional display is generated in the image signal processing circuit 207 to allow respective pixel rows in a pixel arrangement corresponding to respective strip-like illumination light beams to serve as three-dimensional pixels 210D, the respective strip-like illumination light beams enter, at a substantially equal angle, into pixels (for example, 210-1, 210-2, 210-3, or 210-4 in FIG. 24) in the same position in respective three-dimensional pixels 210D. As a result, image light modulated by the pixels in the same position in respective three-dimensional pixels 210D is emitted from the pixels at a predetermined angle. At this time, a viewer views different images having a parallax therebetween with his right and left eyes; therefore, the viewer perceives that a three-dimensional image (a stereoscopic image) is displayed on the display panel 210.

Moreover, in the backlight 211 according to the embodiment, in two-dimensional display, for example, a potential difference is applied to a pair of electrodes (the sub-electrode 32A and the upper electrode 36) of each of the light modulation cells 30-1 to allow the optical axes AX2 of the microparticles 34B in each of the light modulation cells 30-1 to intersect with or be orthogonal (or substantially orthogonal) to the optical axis AX1 of the bulk 34A. Therefore, light beams emitted from the light source 20 and entering into the light guide plate 10 are scattered in the scattering region 30B formed in the entire light modulation device 30 (refer to FIG. 25). Light beams having passed through the bottom surface of the scattering region 30B in the scattered light beams are reflected by the reflective plate 40 to be returned to the light guide plate 10 again, and then the light beams are emitted from the top surface of the backlight 211. Moreover, light beams toward the top surface of the scattering region 30B in the scattered light beams pass through the light guide plate 10 to be emitted from the top surface of the backlight 211. Thus, in two-dimensional display, for example, light beams are emitted from the entire top surface of the light modulation device 30 to emit planar illumination light toward a front direction.

Therefore, as the planar illumination light emitted toward the front direction enters into the back surface of the display panel 210, for example, when two-dimensional image data for two-dimensional display associated with respective pixels 210E is generated in the image signal processing circuit 207, planar illumination light enters into the respective pixels 210E at all angles, and image light modulated by the respective pixels 210E is emitted from the respective pixels 210E. At this time, as the viewer views the same image with both eyes, the viewer perceives that a two-dimensional image (a planar image) is displayed on the display panel 210.

Moreover, in the embodiment, the light modulation layer 34 exhibiting the scattering property or transparency with respect to light from the light source, depending on magnitude of an electric field is included in the backlight 211. Therefore, light emitted from the light source 20 and propagating through the transparent substrate 31 and the like passes through a region exhibiting transparency by electric field control of the light modulation layer 34 to be totally reflected by the top surface of the backlight 211 or to be reflected by the top surface of the backlight 211 with high reflectivity. As a result, luminance in a region corresponding to a region exhibiting transparency in a light emission region (hereinafter simply referred to as "transparent region in the light emission region") of the backlight 211 is reduced, compared to the case where light is uniformly emitted from the entire surface of the backlight 211. On the other hand, light propagating through the transparent substrate and the like is scattered by a region exhibiting the scattering property by the electric field control of the light modulation layer 34 to pass through the top surface of the backlight 211. As a result, luminance in a region corresponding to a region exhibiting the scattering property in the light emission region (hereinafter simply referred to "scattering region in the light emission region") of the backlight 211 is increased, compared to the case where light is uniformly emitted from the entire surface of the backlight 211. Moreover, luminance in white display is partially increased (partial luminance enhancement) by a reduced amount of the luminance of the transparent region in the light emission region. Further, in the embodiment, the area per unit area of each sub-electrode 32A or each linear electrode 32E varies with the distance from the light source 20. Therefore, a density distribution of the transparent region and the scattering region in the light emission region is allowed to be adjusted to become a desired distribution. As a result, compared to the case where a light emission area per unit area of each of the strip-like illumination light beams does not vary with the distance from the light source 20, luminance on a side closer to the light source 20 of the light emission region is allowed to become lower, and luminance on a side farther from the light source 20 of the light emission region is allowed to become higher. Accordingly, in three-dimensional display, a modulation ratio is allowed to be increased, while in-plane luminance is uniformized.

Figures 26A, 26B:
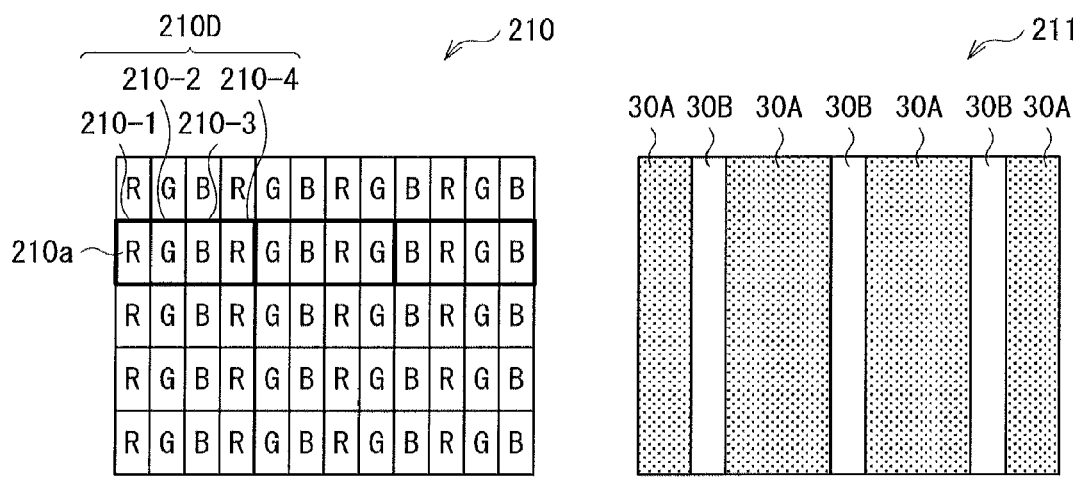
FIGS. 26A to 26D are schematic views for describing a first modification of three-dimensional display on the display section in FIG. 3.
Figures 26C, 26D:
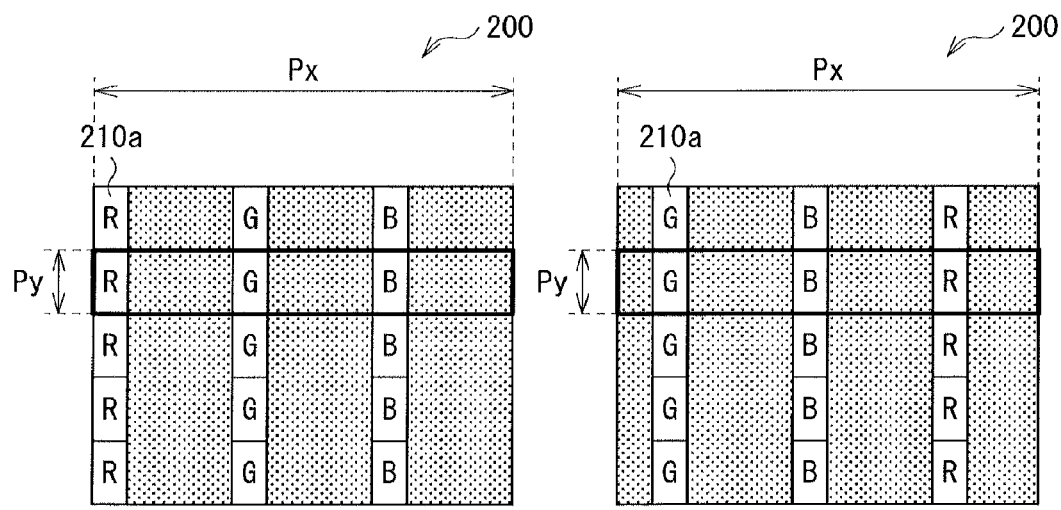

In the embodiment, for example, as illustrated by a thick-frame in FIG. 26A, in three-dimensional display, a combination of four pixels 210-1 to 210-4 of the display panel 210 is driven as one three-dimensional pixel 210D. At this time, for example, as illustrated in FIG. 26B, the backlight 211 forms one scattering region 30B per three-dimensional pixel 210D to allow backlight light to enter the pixels 210-1 to 210-4 at different incident angles. Therefore, strip-like illumination light beams enter into pixels (for example, in FIG. 24, pixels 210-1, 210-2, 210-3, or 210-4) in the same position in respective three-dimensional pixels 210D at a substantially same angle. As a result, the pixels in the same position in respective three-dimensional pixels 210D outputs image light modulated by the pixels at a predetermined angle. At this time, the viewer concurrently views, for example, image light from the pixel 210a illustrated in FIG. 26C with his right eye and image light from the pixel 210a illustrated in FIG. 26D with his left eye. In other words, the viewer views different images having a parallax therebetween with his right and left eyes. As a result, the viewer perceives that a three-dimensional image (a stereoscopic image) is displayed on the display panel 210.

When a pixel pitch Px in a horizontal direction and a pixel pitch Py in a vertical direction are compared to each other, the pixel pitch Px in the horizontal direction is several times as large as the pixel pitch Py in the vertical direction. Therefore, the viewer views an image with pixel pitches in the vertical direction and the horizontal direction which are greatly different from each other. At this time, the viewer may perceive that image quality is degraded.

Figure 27A:
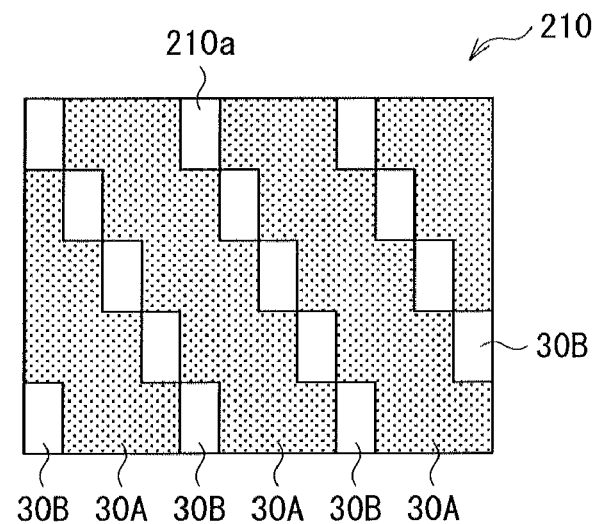
FIGS. 27A and 27B are schematic views for describing a second modification of three-dimensional display on the display section in FIG. 3.
Figure 27B:
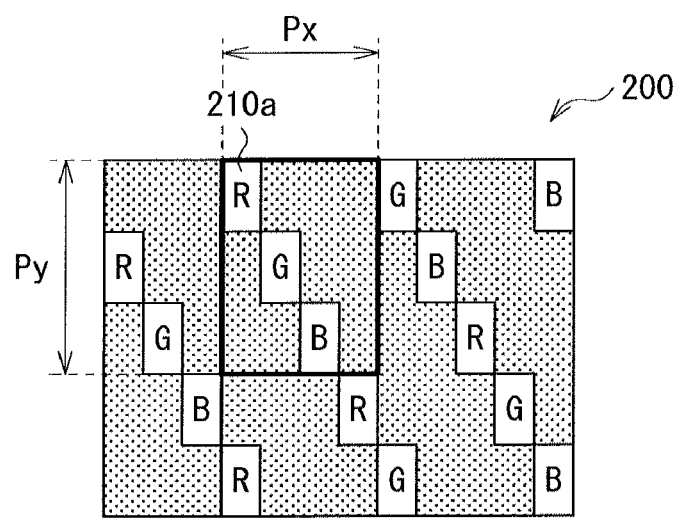

Therefore, for example, as illustrated in FIG. 27A, respective scattering regions 30B are displaced, in relation to other adjacent scattering regions 30B, by the width of the pixel 210a in the horizontal direction (the Y-axis direction). In such a case, as illustrated in FIG. 27B, the pixel pitch Px in the horizontal direction and the pixel pitch Py in the vertical direction are allowed to be closer to each other, compared to the case in FIGS. 26C and 26D. As a result, degradation in image quality is allowed to be suppressed.

Figure 28A:
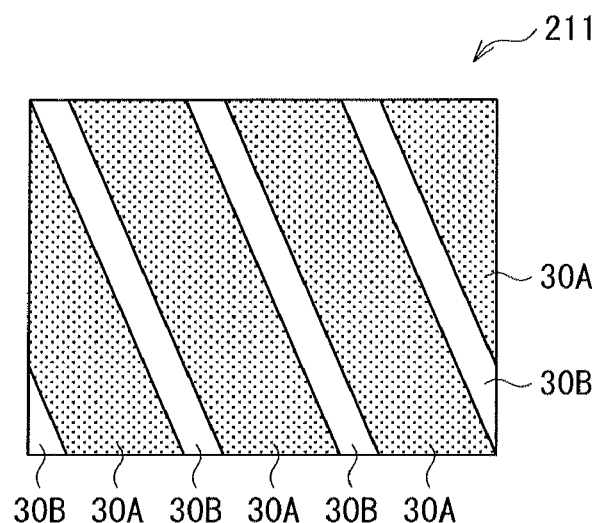
FIGS. 28A and 28B are schematic views for describing a third modification of three-dimensional display on the display section in FIG. 3.
Figure 28B:
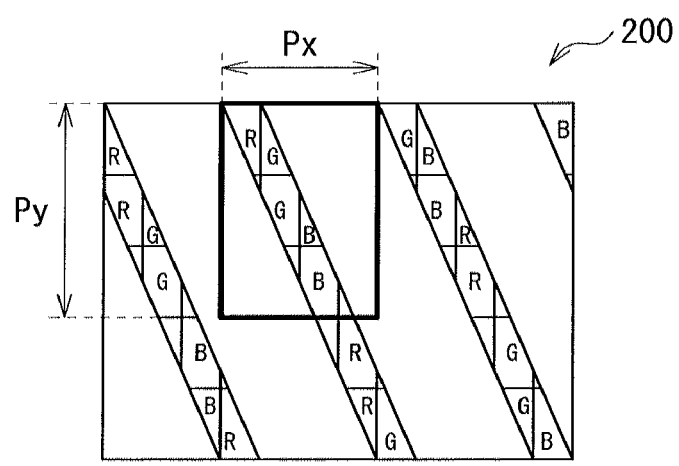

It is to be noted that, as illustrated in FIG. 28A, respective scattering regions 30B may be arranged in oblique stripes. In such a case, as illustrated in FIG. 28B, the pixel pitch Px in the horizontal direction and the pixel pitch Py in the vertical direction are allowed to be closer to each other, compared to the case in FIGS. 26C and 26D. As a result, degradation in image quality is allowed to be suppressed. It is to be noted that, in the case of a display panel having a panel size of 3.5 inches and 800 (vertical)×480 (horizontal)×3 (RGB) pixels, a tilt angle of each scattering region 30B is 71.57 degrees in 4 parallaxes.

Figure 29:
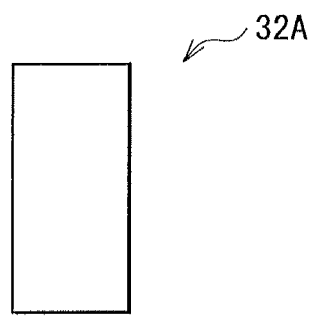
FIG. 29 is a plan view illustrating a ninth modification of the lower electrode in FIG. 5.
Figure 30:
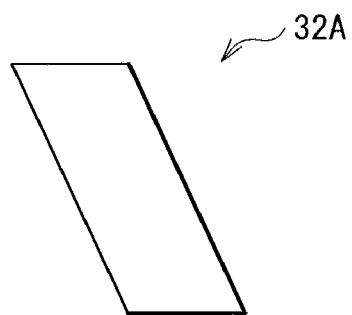
FIG. 30 is a plan view illustrating a tenth modification of the lower electrode in FIG. 5.
Figure 31A:
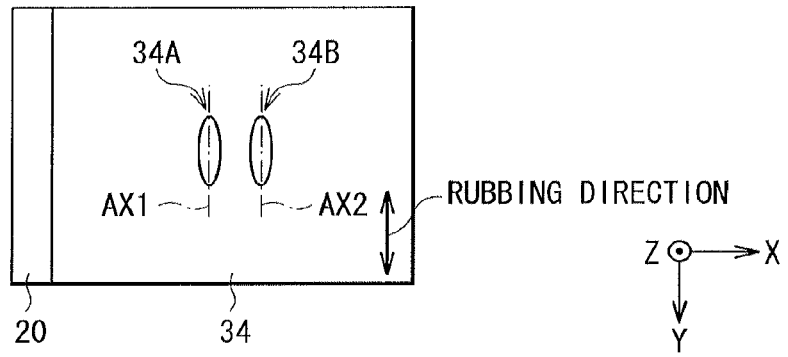
FIGS. 31A and 31B are schematic views for describing an example of a function of the light modulation layer in FIG. 4.
Figure 31B:
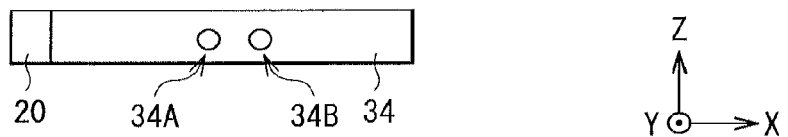

It is to be noted that, only to suppress the above-described degradation in image quality, an area of a portion used for one pixel 210a in the display panel 210 of each sub-electrode 32A may be uniform irrespective of the distance from the light source 20. For example, as illustrated in FIGS. 29 and 30, the width of each sub-electrode 32A may be uniform.

Next, other effects of the receiver-side unit 200 according the embodiment will be described below.

Typically, the PDLC is a composite layer which is formed by mixing the liquid crystal material and an isotropic low-molecular material, and causing phase separation by ultraviolet irradiation, drying of a solvent, or the like, and has microparticles of the liquid crystal material dispersed in a polymer material. The liquid crystal material in the composite layer is aligned in random directions under no potential difference application, and thus exhibits the scattering property, but on the other hand, under potential difference application, the liquid crystal material is aligned in an electric field direction; therefore, in the case where the ordinary refractive index of the liquid crystal material and the refractive index of the polymer material are equal to each other, the liquid crystal material exhibits high transparency in the front direction (in a direction of a normal to the PDLC). However, in this liquid crystal material, a difference between the extraordinary refractive index of the liquid crystal material and the refractive index of the polymer material becomes pronounced in an oblique direction; therefore, even if the liquid crystal material has transparency in the front direction, the liquid crystal material exhibits the scattering property in the oblique direction.

A typical light modulation device utilizing the PDLC often has a configuration in which the PDLC is sandwiched between two glass plates on which transparent conductive films are formed. When light obliquely enters from air into the light modulation device with the above-described configuration, the light incident from the oblique direction is refracted by a refractive index difference between the air and the glass plate to enter into the PDLC at a smaller angle. Therefore, large scattering does not occur in such a light modulation device. For example, when light enters from air at an angle of 80°, the incident angle of the light to the PDLC is reduced to approximately 40° by refraction at a glass interface.

However, in an edge-light system with use of a light guide plate, as light enters through the light guide plate, the light crosses the PDLC at a large angle of approximately 80°. Accordingly, a difference between the extraordinary refractive index of the liquid crystal material and the refractive index of the polymer material is large, and light crosses the PDCL at a larger angle, thereby causing a longer optical path subjected to scattering. For example, in the case where microparticles of a liquid crystal material having an ordinary refractive index of 1.5 and an extraordinary refractive index of 1.65 are dispersed in a polymer material having a refractive index of 1.5, there is no refractive index difference in the front direction (the direction of the normal to the PDLC), but the refractive index difference is large in the oblique direction. Therefore, the scattering property in the oblique direction is not allowed to be reduced, thereby causing low view angle characteristics. Further, in the case where an optical film such as a diffusion film is disposed on the light guide plate, oblique leak light is diffused also in the front direction by the diffusion film or the like, thereby causing an increase in light leakage in the front direction and a decrease in a modulation ratio in the front direction.

On the other hand, in the embodiment, as the bulk 34A and the microparticles 34B each include mainly an optical anisotropic material, the scattering property in an oblique direction is reduced, thereby enabling to improve transparency. For example, the bulk 34A and the microparticles 34B include mainly the optical anisotropic materials with ordinary refractive indices which are equal to each other and extraordinary refractive indices which are also equal to each other, and in addition thereto, the directions of the optical axes of the bulk 34A and the microparticles 34B coincide with or substantially coincide with each other in a region where a potential difference is not applied between the lower electrode 32 and the upper electrode 36. Therefore, the refractive index difference is reduced or eliminated in all directions including the front direction (a direction of the normal to the light modulation device 30) and the oblique direction, thereby obtaining high transparency. As a result, the leakage of light in a range having a large view angle is allowed to be reduced or substantially eliminated, and view angle characteristics are allowed to be improved.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices coincide with each other in all directions, thereby enabling to achieve a state where transparency is high, and to further improve the view angle characteristics.

Moreover, in the embodiment, for example, as illustrated in parts (A) and (B) FIG. 19, luminance in the transparent region 30A (luminance in black display) is lower, compared to the case where light is uniformly emitted from the entire surface of the backlight 211 (indicated by the alternate long and short dash line in the part (B) in FIG. 19). On the other hand, luminance in the scattering region 30B is significantly increased, compared to the case where light is uniformly emitted from the entire surface of the backlight 211 (indicated by the alternate long and short dash line in the part (B) in FIG. 19), and luminance in white display is partially increased (partial luminance enhancement) by a reduced amount of the luminance of the transparent region 30A.

The partial luminance enhancement is a technique of enhancing luminance when white display is partially performed, compared to the case where white display is performed on an entire screen. The partial luminance enhancement is generally used in a CRT, a PDP, or the like. However, in a liquid crystal display, as a backlight uniformly emits light in an entire surface thereof irrespective of an image, the luminance is not allowed to be partially enhanced. When an LED backlight in which a plurality of LEDs are two-dimensionally arranged is used as the backlight, some of the LEDs are allowed to be turned off. However, in such a case, diffusion light from dark regions in which the LEDs are turned off disappears; therefore, the luminance becomes lower, compared to the case where all of the LEDs are turned on. Also, the luminance may be increased by increasing a current applied to some LEDs which are turned on; however, in such a case, a large current flows for an extremely short time, thereby causing an issue in terms of load and reliability of a circuit.

On the other hand, in the embodiment, as the bulk 34A and the microparticles 34B each include mainly the optical anisotropic material, the scattering property in the oblique direction is suppressed to reduce leak light from the light guide plate in a dark state. Therefore, as light is guided from a part in a partially-dark state to a part in a partially-bright state, partial luminance enhancement is achievable without increasing electric power supplied to the backlight 211.

Moreover, in the embodiment, in a region where a potential difference is not applied between the lower electrode 32 and the upper electrode 36, the optical axes AX2 of the microparticles 34B are parallel to the light incident surface 10A of the light guide plate 10 and intersect with the surfaces of the transparent substrates 31 and 37 at the slight angle θ1. In other words, the liquid crystal molecules included in the microparticles 34B are aligned to be tilted at the angle θ1 in a plane parallel to the light incident surface 10A (i.e., to have a pretilt angle). Therefore, when a potential difference is applied between the lower electrode 32 and the upper electrode 36, the liquid crystal material included in the microparticles 34B does not rise in random directions, but rises in the plane parallel to the light incident surface 10A. At this time, the optical axis AX1 of the bulk 34A and the optical axes AX2 of the microparticles 34B intersect with or are orthogonal (substantially orthogonal) to each other in the plane parallel to the light incident surface 10A.

In this case, light vibrating perpendicularly with respect to the transparent substrate 31 in light incident from the light incident surface 10A of the light guide plate 10 exhibits a difference between the extraordinary refractive index of the microparticle 34B and the ordinary refractive index of the bulk 34A. At this time, as the difference between the extraordinary refractive index of the microparticle 34B and the ordinary refractive index of the bulk 34A is large, scattering efficiency of light vibrating perpendicularly with respect to the transparent substrate 31 is increased. On the other hand, light vibrating in parallel with the transparent substrate 31 exhibits a difference between the ordinary refractive index of the microparticle 34B and the extraordinary refractive index of the bulk 34A. At this time, as the difference between the ordinary refractive index of the microparticle 34B and the extraordinary refractive index of the bulk 34A is also large, scattering efficiency of light vibrating in parallel with the transparent substrate 31 is increased. Therefore, light propagating through a region where a potential difference is applied between the lower electrode 32 and the upper electrode 36 includes a large amount of a component in an oblique direction. For example, in the case where an acrylic light guide plate is used as the light guide plate 10, light in a region where a potential difference is applied between the lower electrode 32 and the upper electrode 36 propagates at an angle of 41.8° or over. As a result, a refractive index difference in all directions including the oblique direction is increased to obtain a high scattering property, thereby enabling to improve display luminance. Moreover, the display luminance is allowed to be further improved by the above-described partial luminance enhancement effect.

[Anisotropic Scattering]

Figure 33A:
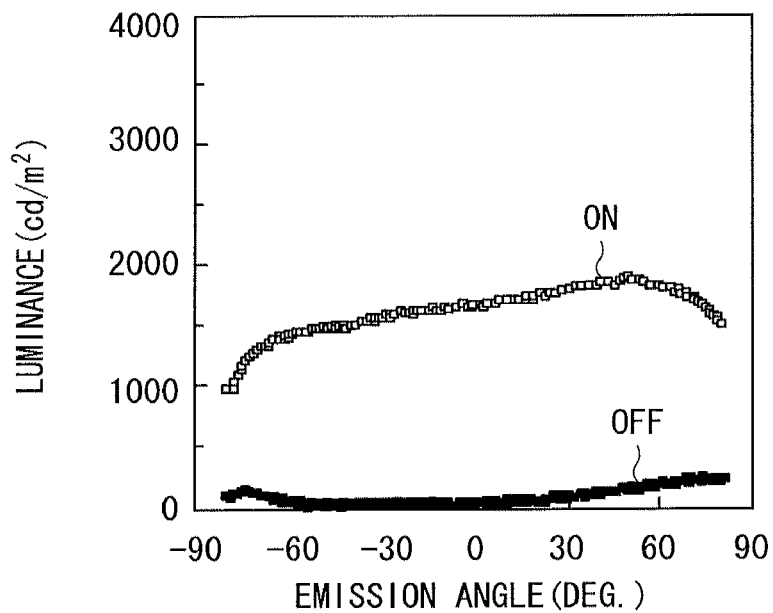
FIGS. 33A and 33B are diagrams for describing effects of the light modulation layer in FIG. 4 and a comparative example.
Figure 33B:
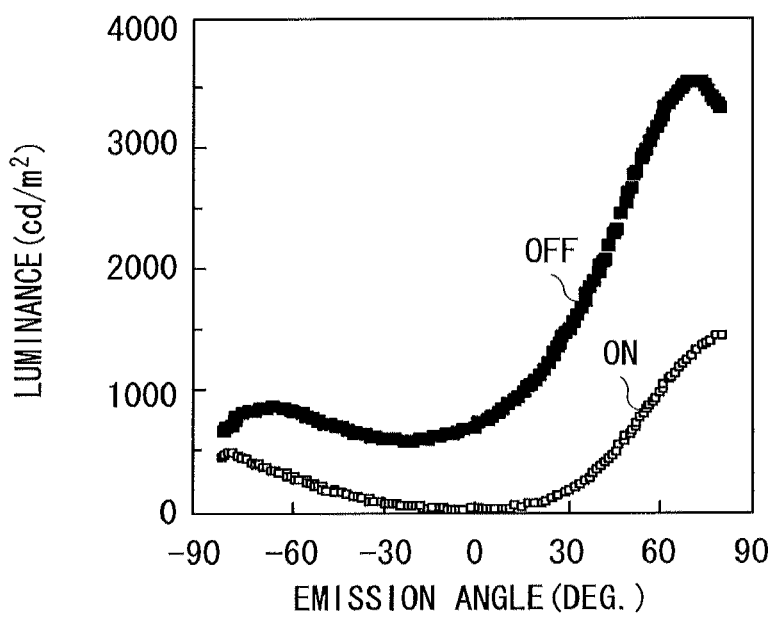
Figure 34A:
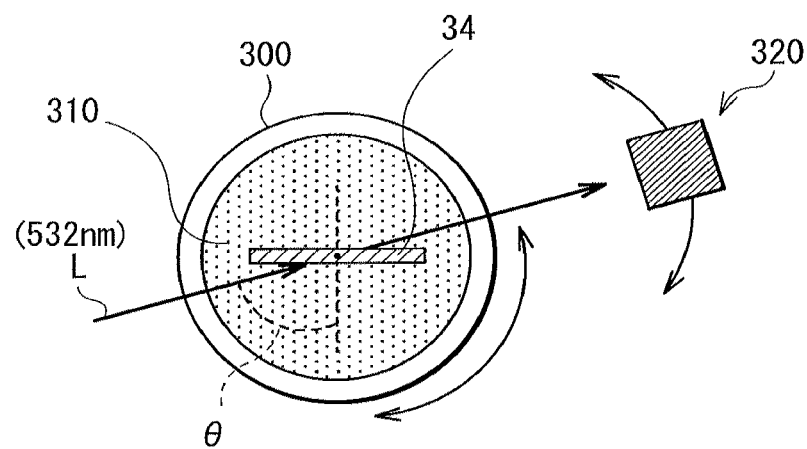
FIGS. 34A and 34B are diagrams illustrating an example of a device measuring optical characteristics of the light modulation layer.
Figure 34B:
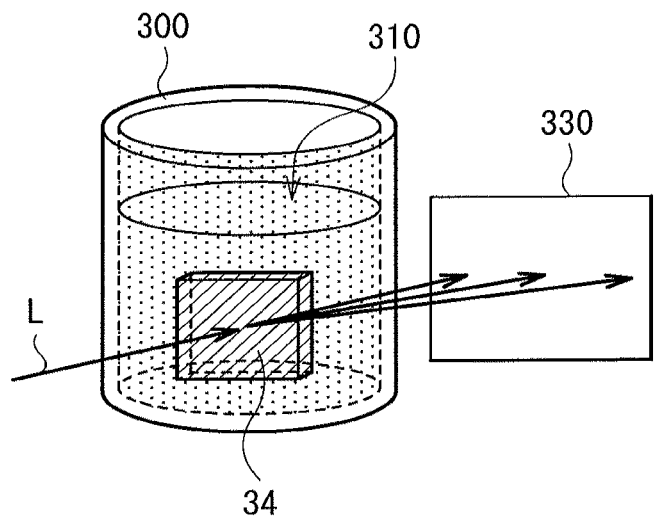

Next, anisotropic scattering in the embodiment will be described below. FIGS. 31A, 31B, 32A, and 32B illustrate examples of refractive index ellipsoids of the bulk 34A and the microparticle 34B in the light modulation layer 34 in the above-described embodiment. FIGS. 33A and 33B illustrate an example of refractive index ellipsoids of the bulk 34A and the microparticle 34B under no potential difference application, and FIGS. 34A and 34B illustrate an example of refractive index ellipsoids of the bulk 34A and the microparticle 34B under potential difference application.

As described above, as illustrated in FIGS. 31A and 31B, under no potential difference application, the optical axis of the bulk 34A and the optical axis of the microparticle 34B are aligned in a direction parallel to the light incident surface 10A of the light guide plate 10 as well as in a direction intersecting with the surfaces of the transparent substrates 31 and 37 at the angle θ1. Moreover, as described above, as illustrated in FIGS. 32A and 32B, under potential difference application, the optical axis of the bulk 34A is aligned in the same direction as that under no potential difference application. Further, the optical axis of the microparticle 34B is aligned in a direction parallel to the light incident surface 10A of the light guide plate 10 as well as in a direction intersecting with the surfaces of the transparent substrates 31 and 37 at the angle θ2 (for example, 90°) larger than the angle θ1.

Thus, the above-described change is caused in liquid crystal molecules in the microparticles 34B in response to potential difference application and no potential difference application; however, in the course of the change, the bulk 34A does not respond to a potential difference change, or the response speed of the bulk 34A is slow; therefore, the long-axis direction of the streaky structure of the bulk 34A is aligned in a rubbing direction (a direction parallel to the light incident surface 10A (a Y-axis direction in FIGS. 31A, 31B, 32A, and 32B)). Thus, under potential difference application, light which is emitted from the light source 20 and propagates through the light modulation layer 34 propagates while exhibiting a difference between the extraordinary refractive index of the microparticle 34B and the ordinary refractive index of the bulk 34A, or a difference between the ordinary refractive index of the microparticle 34B and the extraordinary refractive index of the bulk 34A in cycles of average streaky texture size in a short-axis direction of the streaky structure of the bulk 34A. As a result, the light propagating through the light modulation layer 34 is largely scattered in a thickness direction of the light modulation layer 34, but is not scattered much in a direction parallel to the light incident surface 10A. In other words, the light modulation layer 34 exhibits anisotropy in the scattering property in the Y-axis direction and a Z-axis direction in a plane (a YZ plane) parallel to the light incident surface 10A. Thus, the light modulation layer 34 exhibits anisotropic scattering with respect to light emitted from the light source 20 and propagating through the light modulation layer 34.

Figure 32A:
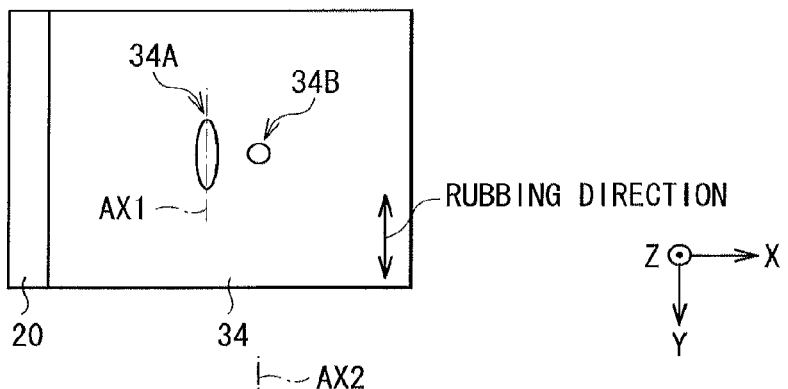
FIGS. 32A and 32B are schematic views for describing another example of the function of the light modulation layer in FIG. 4.
Figure 32B:
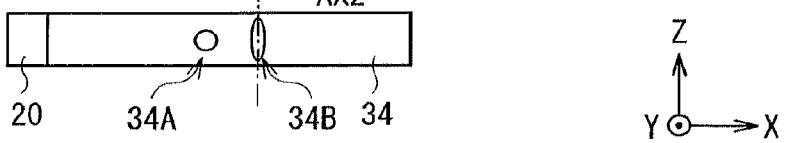

In the light modulation layer 34, in consideration of the refractive index ellipsoids of the bulk 34A and the microparticles 34B, a Y-axis-direction (rubbing direction)-polarized component in light propagating in the Z-axis direction in FIGS. 32A and 32B has higher scattering power, compared to an X-axis-direction-polarized component. In other words, the light modulation layer 34 also exhibits an anisotropic scattering property in a polarization direction with respect to light propagating in the thickness direction of the light modulation layer 34. Light polarized in the X-axis direction is scattered by a difference between the ordinary refractive index of the bulk 34A and the ordinary refractive index of the microparticle 34B, but the values thereof are substantially equal to each other; therefore, the scattering property is low. On the other hand, light polarized in the Y-axis direction is scattered by a difference between the extraordinary refractive index of the bulk 34A and the ordinary refractive index of the microparticle 34B, and the values thereof are largely different from each other; therefore, the scattering property is high.

The degree of anisotropic scattering actually exhibited by the light modulation layer 34 will be examined below.

FIGS. 33A and 33B illustrate results of measuring emission angle characteristics of light from the light guide plate. FIG. 33A illustrates a result in the case where the modulation layer 34 was used, and FIG. 33B illustrates a result in the case where a light modulation layer exhibiting optical isotropy in a plane was used. Typically, a white reflective plate is used on a bottom surface of the light modulation layer; however, to accurately examine emission characteristics from the light modulation layer and the light guide plate, a black absorption layer was disposed on the bottom surface of the light modulation layer instead of the white reflective plate.

In the case where the light modulation layer exhibiting optical isotropy in a plane was used, light extracted from the light guide plate included a large amount of a component close to the light guide plate and a smaller amount of a component in the front direction. On the other hand, in the case where the light modulation layer 34 exhibiting optical anisotropy in a plane was used, the amount of light in the front direction was relatively large when light was extracted from the light guide plate, and such a profile is suitable for an illumination unit. Moreover, in a black state, the amount of light diagonally leaked in an optically isotropic modulation layer was larger than that in an anisotropic light modulation layer; therefore, the anisotropic light modulation layer has an advantage in terms of light modulation ratio performance. Further, in the case where an optical sheet is used on the light guide plate with an air interface in between, it is considered that the amount of light lost by reflection by the optical sheet and the air interface is large; therefore, emission characteristics from the light guide plate in which the amount of the component in the front direction is larger is suitable. As different monomer materials and different liquid crystal materials were used for the two light modulation layers used for examination, it is difficult to compare light extraction intensity between the two light modulation layers; however, in the case where a material having the same optical property is used as the light modulation layer, when light modulation layer 34 having optical anisotropy in a plane is used, light use efficiency is allowed to be increased.

Figure 35A:
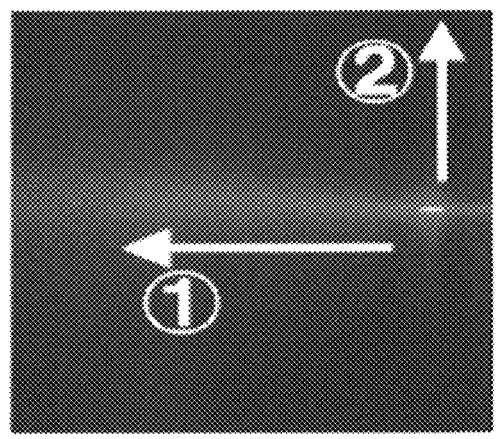
FIGS. 35A to 35C are diagrams illustrating an example of results determined by measurement with the device in FIGS. 34A and 34B.
Figure 35B:
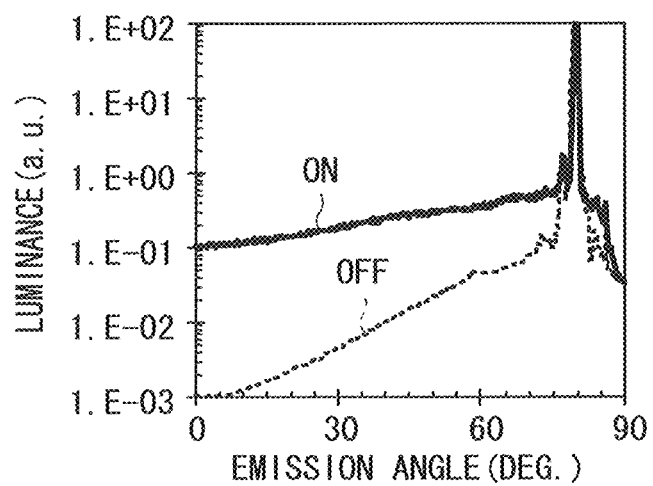
Figure 35C:
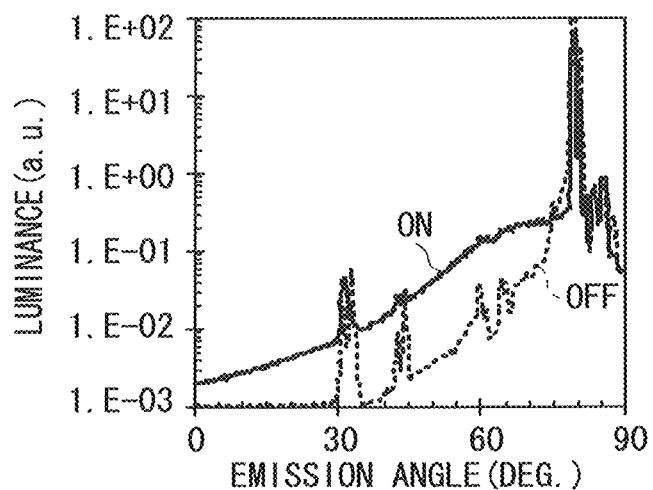

As it was found from the above-described results that, in the case where the two light modulation layers were used, the respective emission angle characteristics were different from each other, scattering characteristics of the light modulation layer 34 were next measured. In a state that the light guide plate is used, total reflection by the light guide plate occurs, and scattering angle characteristics are not allowed to be measured; therefore, the scattering angle characteristics were measured by a unit illustrated in FIGS. 34A and 34B. More specifically, a matching oil 310 and the light modulation layer 34 were put into a columnar glass container 300, and the light modulation layer 34 was irradiated with laser light L at a large incident angle θ (for example, 80°) allowing light to be guided through a light guide plate to evaluate the scattering angle characteristics. FIG. 35A illustrates a state of a luminance distribution shown on a measured surface 330 when the laser light L entered into the light modulation layer 34 at the large incident angle θ (for example, 80°). FIG. 35B illustrates a light intensity distribution obtained by scanning of a detector 320 around, as a central axis, an axis parallel to the optical axis AX1 (not illustrated) of the bulk 34A in the light modulation layer 34 in a plane perpendicular to the rubbing direction (corresponding to a ZX plane in FIGS. 31A, 31B, 32A, and 32B). The light intensity distribution at this time corresponds to a distribution in a direction indicated by (1) in FIG. 35A. Further, FIG. 35C illustrates a luminance distribution obtained by scanning of the detector 320 around, as the central axis, an axis perpendicular to the optical axis AX1 (not illustrated) of the bulk 34A in the light modulation layer 34 in a plane parallel to the rubbing direction as well as parallel to the light incident surface of the light modulation layer 34 (corresponding to a ZY plane of FIGS. 31A, 31B, 32A, and 32B). The light intensity distribution at this time corresponds to a distribution in a direction indicated by (2) in FIG. 35A.

From FIGS. 35A to 35C, scattering characteristics in the plane perpendicular to the rubbing direction (corresponding to the ZX plane in FIGS. 31A, 31B, 32A, and 32B) were higher than those in the plane parallel to the rubbing direction (corresponding to the ZY plane in FIGS. 31A, 31B, 32A, and 32B), and in the front direction (at an emission angle of 0°), intensity was different by approximately 50 times (under potential difference application). In other words, it was found that, for example, as illustrated in FIGS. 35A to 35C, the light modulation layer 34 had anisotropic scattering characteristics in which scattering in the thickness direction (Z-axis direction) of the light modulation layer 34 was larger than scattering in the rubbing direction (direction parallel to the light incident face 10A (a Y-axis direction)). Accordingly, it was found that when the liquid crystal molecules in the microparticles 34B were aligned in the thickness direction of the light modulation layer 34 in a state where the long-axis direction of the streaky structure of the bulk 34A was aligned in the rubbing direction (the direction parallel to the light incident face 10A (the Y-axis direction in FIGS. 31A, 31B, 32A, and 32B)), the light modulation layer 34 exhibited the above-described anisotropic scattering with respect to light emitted from the light source 20.

FIG. 36A illustrates scattering characteristics of the light modulation layer 34. FIG. 36B illustrates scattering characteristics of a light modulation layer in which a direction where a liquid crystal is tilted by a potential difference is not determined (a pretilt of 90°). FIG. 36C illustrates scattering characteristics of a normal light modulation layer which is made of an isotropic polymer and does not exhibit optical anisotropy in a plane. It was found from FIGS. 36A to 36C that, in the light modulation layer 34, incident light was largely scattered even in the front direction, compared to the other light modulation layer, and only the light modulation layer 34 exhibited anisotropic scattering.

Figure 37A:
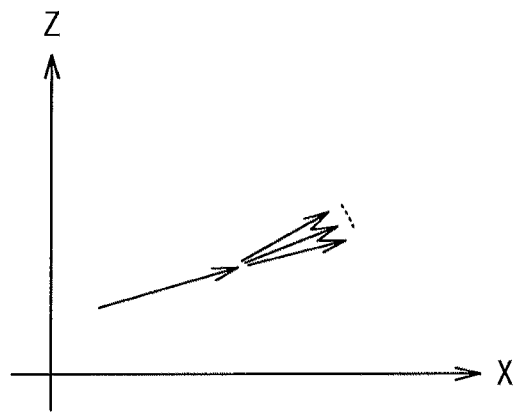
FIGS. 37A to 37C are conceptual diagrams for describing isotropic scattering.
Figure 37B:
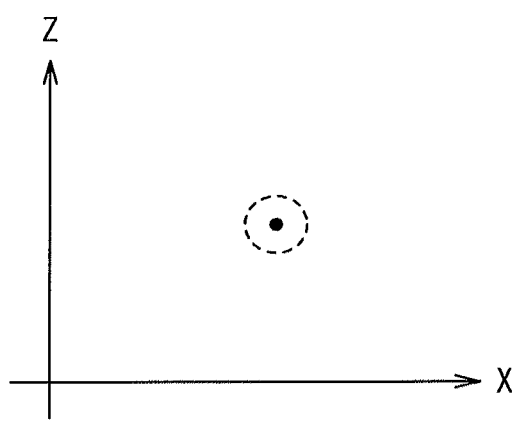
Figure 37C:
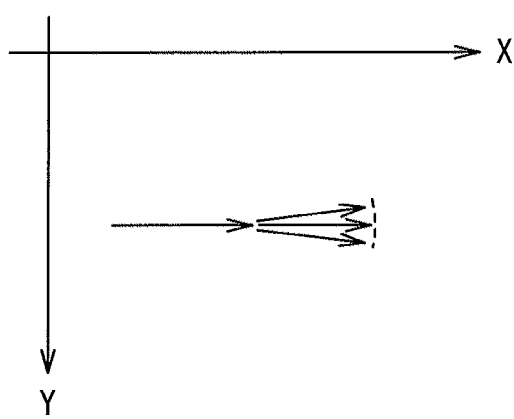
Figure 38A:
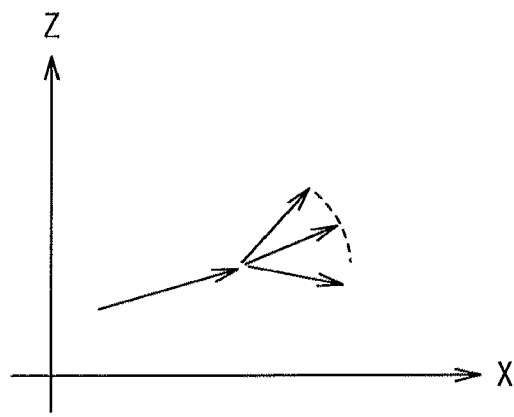
FIGS. 38A to 38C are conceptual diagrams for describing anisotropic scattering.
Figure 38B:
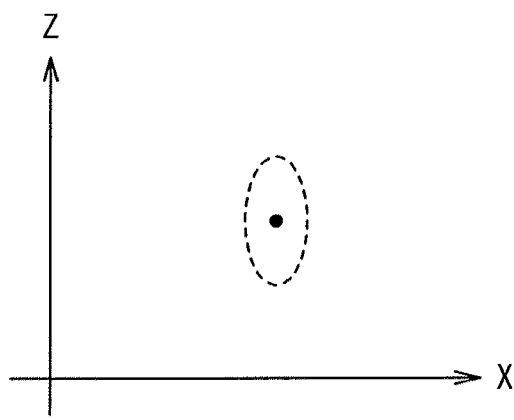
Figure 38C:
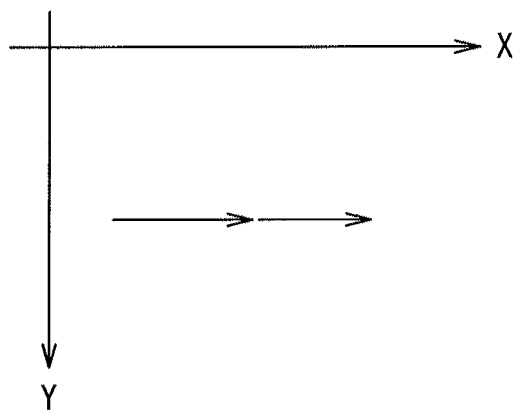

Next, description will be given of a reason why light extraction from the light guide plate is superior in the case where such anisotropic scattering is exhibited. In the case where a light modulation layer, a light guide plate, and a light source are arranged, a light guide plate printed with a white pattern and the above-described normal light modulation layer exhibit isotropic scattering characteristics, for example, as illustrated in FIGS. 37A to 37C; therefore, the amount of light scattered in a direction parallel to an plane of the light guide plate is large, and a probability of changing an angle until light guide conditions are disrupted is low. On the other hand, in the case where anisotropic scattering is exhibited as in the case of the light modulation layer 34, for example, as illustrated in FIGS. 38A to 38C, incident light is largely scattered in a direction perpendicular to an in-plane direction of the light guide plate, and thus scattering occurs preferentially in a direction where light guide conditions are disrupted. Accordingly, it is considered that light extraction efficiency from the light guide plate is improved by exhibiting anisotropic scattering.

In terms of improving a scattering property of guided light, an average streaky texture size in the short-axis direction of the bulk 34A is preferably within a range of 0.1 µm to 10 µm both inclusive, and more preferably within a range of 0.2 µm to 2.0 µm both inclusive.

[Modification]

In the above-described embodiment, the optical axes AX1 and AX2 are directed in a direction parallel or substantially parallel to the light incident surface 10A and the transparent substrate 31 under no potential difference application, and the optical axis AX2 is displaced to a direction intersecting with or orthogonal (or substantially orthogonal) to the transparent substrate 31 under potential difference application. However, the optical axes AX1 and AX2 may be directed in a direction intersecting with or orthogonal (or substantially orthogonal) to the light incident surface 10A as well as in a direction parallel or substantially parallel to the transparent substrate 31 under no potential difference application, and the optical axis AX2 may be displaced to a direction intersecting with or orthogonal (or substantially orthogonal) to the transparent substrate 31 under potential difference application.

(2. Second Embodiment)

Figure 39:
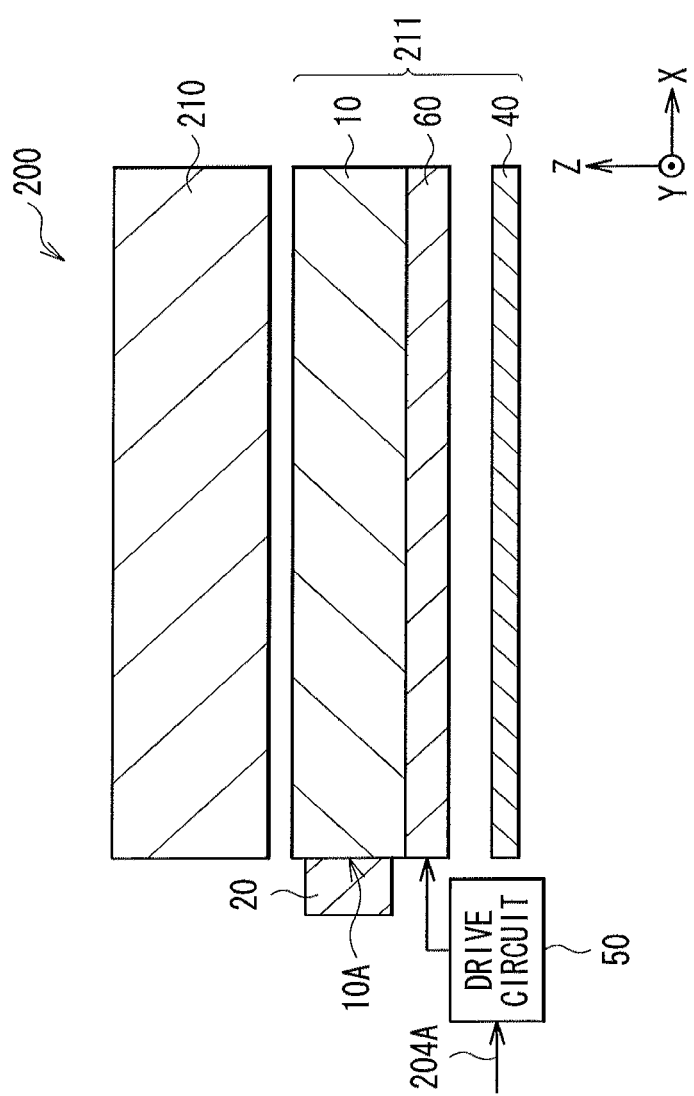
FIG. 39 is a sectional view illustrating an example of a configuration of a display section in a receiver-side unit according to a second embodiment of the application.

Next, the receiver-side unit 200 according to a second embodiment of the application will be described below. As illustrated in FIG. 39, the receiver-side unit 200 according to the embodiment is distinguished from the receiver-side unit 200 according to the above-described embodiment by the fact that a light modulation device 60 is used instead of the light modulation device 30. Description will be given of, mainly, points different from the configuration of the above-described embodiment, and points common to the configuration of the above-described embodiment will not be further described.

Figure 40:
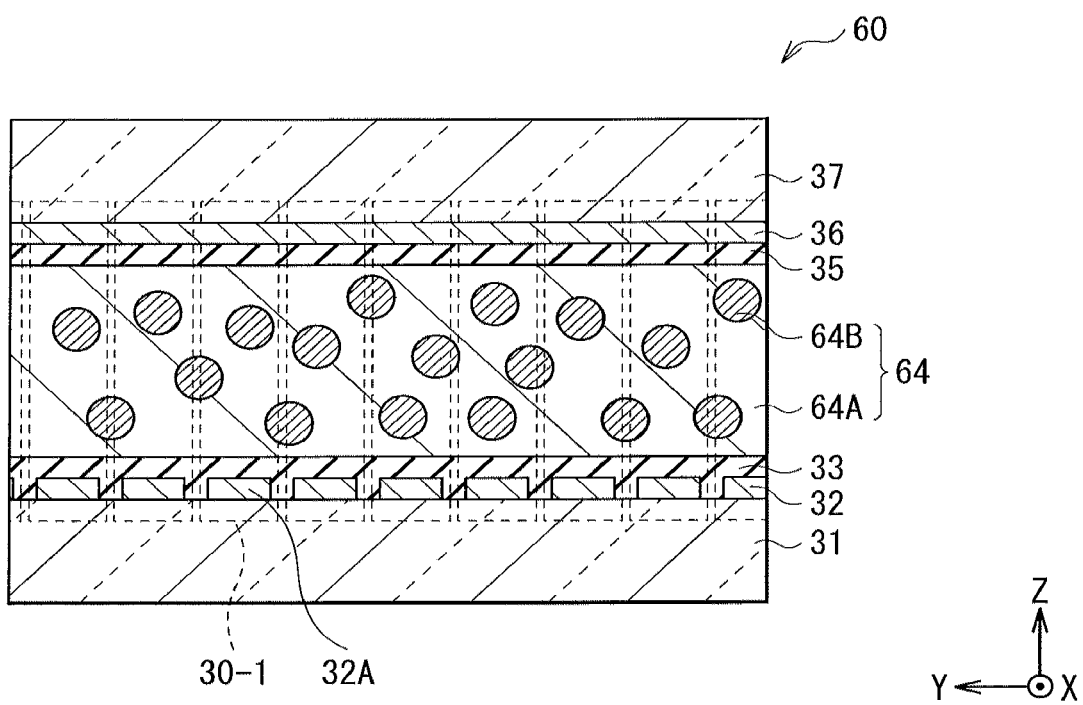
FIG. 40 is a sectional view illustrating an example of a configuration of a light modulation device in FIG. 39.

In the light modulation device 60, vertical alignment films are used as the alignment films 33 and 35, and as illustrated in FIG. 40, a light modulation layer 64 is included instead of the light modulation layer 34.

In the case where the vertical alignment films are used as the alignment films 33 and 35, in a bulk 64A and microparticles 64B which will be described later, a pretilt aligned to be tilted from the transparent substrate 31 is formed by the vertical alignment films. The vertical alignment films may be made of a silane coupling material, polyvinyl alcohol (PVA), a polyimide-based material, a surface-active agent, or the like. For example, a rubbing process is performed after coating with these materials and drying the materials, to form a pretilt in a rubbing direction. Moreover, when plastic films are used as the transparent substrates 31 and 37, it is preferable that in a manufacturing process, a firing temperature after coating the surfaces of the transparent substrates 31 and 37 with the alignment films 33 and 35 be as low as possible; therefore, a silane coupling material allowing to use an alcohol-based solvent is preferably used as the alignment films 33 and 35. It is to be noted that a pretilt may be formed without performing a rubbing process on the alignment films 33 and 35. Examples of a method of achieving this include a method of irradiating cells formed in the alignment films 33 and 35 with ultraviolet light while applying, to the cells, a magnetic field or an oblique electric field caused by a slit electrode.

However, in the case where the vertical alignment films are used as the alignment films 33 and 35, as liquid crystal molecules included in the microparticles 64B, liquid crystal molecules having negative dielectric constant anisotropy (a so-called negative type liquid crystal) are preferably used.

Next, the light modulation layer 64 in the embodiment will be described below. The light modulation layer 64 is a composite layer including the bulk 64A and a plurality of microparticles 64B dispersed in the bulk 64A. The bulk 64A and the microparticles 64B have optical anisotropy.

Figure 41A:
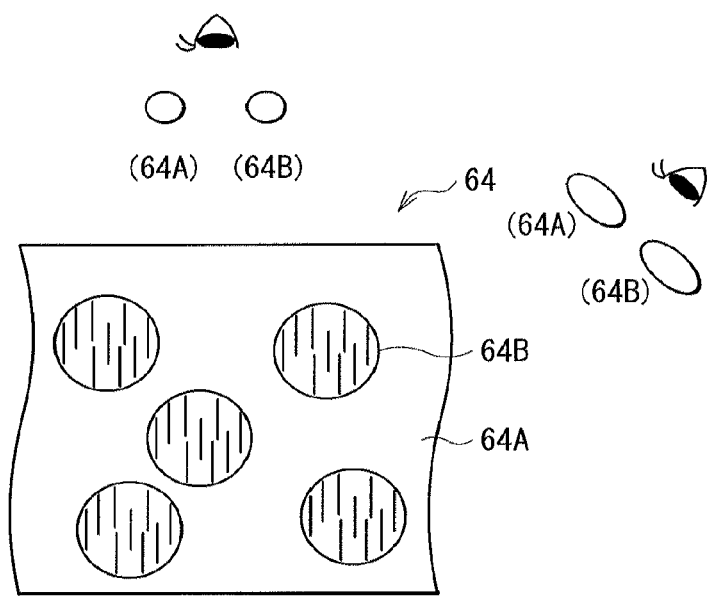
FIGS. 41A to 41C are schematic views for describing an example of a function of a light modulation layer in FIG. 40.
Figure 41B:
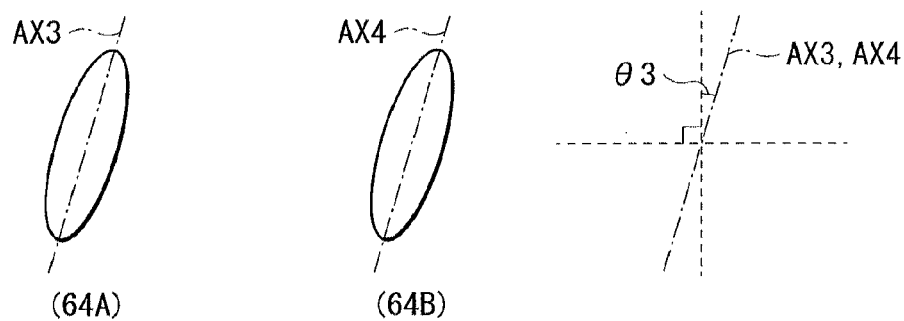
Figure 41C:
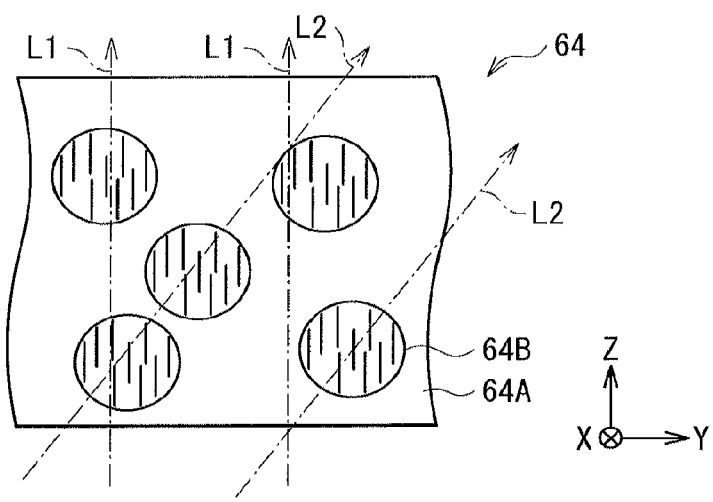

FIG. 41A schematically illustrates an example of an alignment state in the microparticles 64B under no potential difference application. It is to be noted that, in FIG. 41A, an alignment state in the bulk 64A is not illustrated. FIG. 41B illustrates an example of refractive index ellipsoids exhibiting refractive index anisotropy of the bulk 64A and the microparticle 64B under no potential difference application. FIG. 41C schematically illustrates an example of a state where light L1 toward a front direction and light L2 toward an oblique direction pass through the light modulation layer 64 under no potential difference application.

Figure 42A:
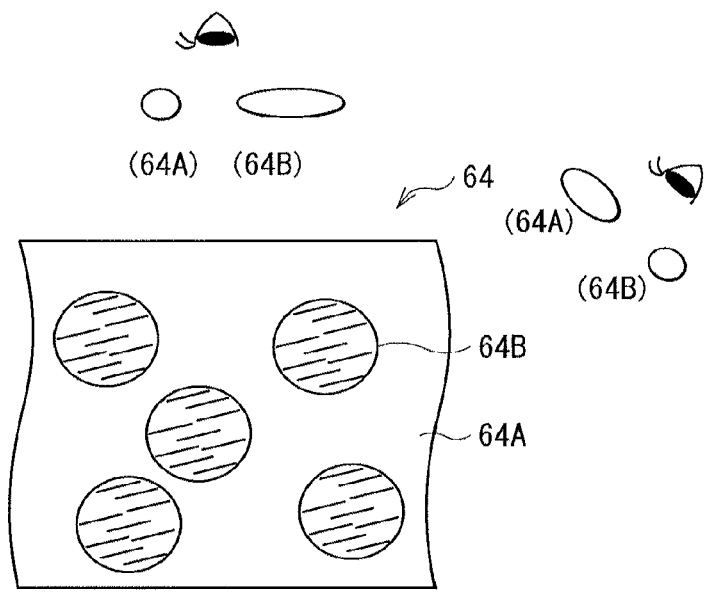
FIGS. 42A to 42C are schematic views for describing another example of the function of the light modulation layer in FIG. 40.
Figure 42B:
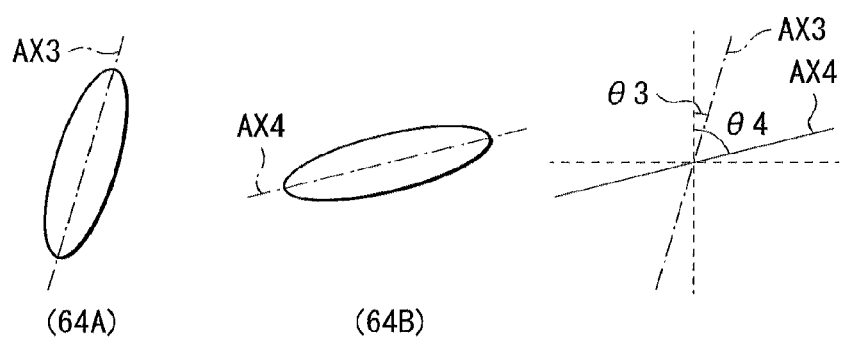
Figure 42C:
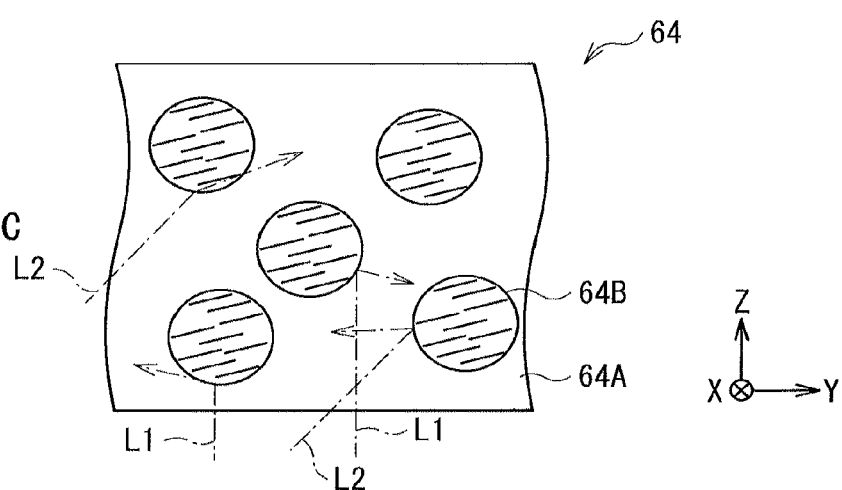

FIG. 42A schematically illustrates an example of an alignment state in the microparticles 64B under potential difference application. It is to be noted that, in FIG. 42A, an alignment state in the bulk 64A is not illustrated. FIG. 42B illustrates an example of refractive index ellipsoids exhibiting refractive index anisotropy of the bulk 64A and the microparticle 64B under potential difference application. FIG. 42C schematically illustrates an example of a state where the light L1 toward the front direction and the light L2 toward the oblique direction are scattered by the light modulation layer 64 under potential difference application.

For example, as illustrated in FIGS. 41A and 41B, under no potential difference application, the bulk 64A and the microparticle 64B are structured to allow the direction of an optical axis AX3 of the bulk 64A and the direction of an optical axis AX4 of the microparticle 64B to coincide with (are parallel to) each other. It is to be noted that the optical axes AX3 and AX4 each indicate a line parallel to a travel direction of a light beam allowing a refractive index to have one value irrespective of polarization direction. Moreover, it is not necessary for the directions of the optical axis AX3 and the optical axis AX4 to consistently coincide with each other, and the direction of the optical axis AX3 and the direction of the optical axis AX4 may be slightly deviated from each other due to, for example, a manufacturing error.

Moreover, for example, the microparticle 64B is structured to allow the optical axis AX4 thereof to be parallel to the light incident surface 10A of the light guide plate 10 under no potential difference application. Further, for example, the microparticle 64B is further structured to allow the optical axis AX4 thereof to intersect with normals to the transparent substrates 31 and 37 at a slight angle θ3 (refer to FIG. 41B) under no potential difference application. It is to be noted that the angle θ3 will be described in more detail when a material forming the microparticle 64B is described.

On the other hand, for example, the bulk 64A is structured to have a fixed optical axis AX4 irrespective of whether or not a potential difference is applied between the lower electrode 32 and the upper electrode 36. More specifically, for example, as illustrated in FIGS. 41A, 41B, 42A, and 42B, the bulk 64A is structured to have the optical axis AX3 parallel to the light incident surface 10A of the light guide plate 10 as well as intersecting with the normals to the transparent substrates 31 and 37 at the slight angle θ3. In other words, under no potential difference application, the optical axis AX3 of the bulk 64A is parallel to the optical axis AX4 of the microparticle 64B.

It is to be noted that it is not necessary for the optical axis AX4 to be consistently parallel to the light incident surface 10A of the light guide plate 10 as well as to consistently intersect with the normals to the transparent substrates 31 and 37 at the angle θ3, and the optical axis AX4 may intersect with the normals to the transparent substrates 31 and 37 at an angle slightly different form the angle θ3 due to, for example, a manufacturing error. Moreover, it is not necessary for the optical axes AX3 and AX4 to be consistently parallel to the light incident surface 10A of the light guide plate 10, and the optical axes AX3 and AX4 may intersect with the light incident surface 10A of the light guide plate 10 at a small angle due to, for example, a manufacturing error.

In this case, ordinary refractive indices of the bulk 64A and the microparticle 64B are preferably equal to each other, and extraordinary refractive indices of the bulk 64A and the microparticle 64B are preferably equal to each other. In this case, for example, under no potential difference application, as illustrated in FIG. 41A, there is little difference in refractive index in all directions including the front direction and the oblique direction, and high transparency is obtained. Therefore, for example, as illustrated in FIG. 42C, the light L1 toward the front direction and the light L2 toward the oblique direction pass through the light modulation layer 64 without being scattered in the light modulation layer 64. As a result, as in the case of the above-described embodiment, for example, as illustrated in the parts (A) and (B) in FIG. 19, the light L from the light source 20 (light from the oblique direction) is totally reflected by an interface (an interface between the transparent substrate 31 or the light guide plate 10 and the air) of the transparent region 30A, and luminance (luminance in black display) of the transparent region 30A is decreased, compared to the case where light is uniformly emitted from the entire surface of the backlight 211 (indicated by the alternate long and short dash line in the part (B) in FIG. 19).

Moreover, for example, under potential difference application, as illustrated in FIG. 42A, the bulk 64A and the microparticle 64B are structured to allow the directions of the optical axis AX3 and the optical axis AX4 to be different from (intersect with) each other. Further, for example, under potential difference application, the microparticle 64B is structured to allow the optical axis AX4 thereof to be parallel to the light incident surface 10A of the light guide plate 10 as well as to intersect with the normals to the transparent substrates 31 and 37 at an angle θ4 larger than the angle θ3, or to be parallel to the surfaces of the transparent substrates 31 and 37. It is to be noted that the angle θ4 will be described in more detail when the material forming the microparticle 64B is described.

Therefore, light propagating through a region where a potential difference is applied between the lower electrode 32 and the upper electrode 36 includes a large amount of a component in an oblique direction. For example, in the case where an acrylic light guide plate is used as the light guide plate 10, light in a region where a potential difference is applied between the lower electrode 32 and the upper electrode 36 propagates at an angle of 41.8° or over. As a result, in the light propagating through the region where the potential difference is applied between the lower electrode 32 and the upper electrode 36, a refractive index difference is increased to obtain a high scattering property. Therefore, for example, as illustrated in FIG. 42C, the light L1 toward the front direction and the light L2 toward the oblique direction are scattered in the light modulation layer 64. As a result, as in the case of the above-described embodiment, for example, the light L from the light source 20 (the light from the oblique direction) passes through the interface (the interface between the transparent substrate 31 or the light guide plate 10 and the air) of the scattering region 30B, and light having passed toward the reflective plate 40 is reflected by the reflective plate 40 to pass through the light modulation device 60. Therefore, the luminance of the scattering region 30B is extremely higher than that in the case where light is uniformly emitted from the entire surface of the backlight 211, and luminance in white display is partially increased (partial luminance enhancement) by a reduced amount of the luminance of the transparent region 30A.

It is to be noted that the ordinary refractive indices of the bulk 64A and the microparticle 64B may be slightly different from each other due to, for example, a manufacturing error, and are preferably, for example, 0.1 or less, and more preferably 0.05 or less. Moreover, the extraordinary refractive indices of the bulk 64A and the microparticle 64B may be slightly different from each other due to, for example, a manufacturing error, and are preferably, for example, 0.1 or less, and more preferably 0.05 or less.

Moreover, a refractive index difference in the bulk 64A ($\Delta n_P$=extraordinary refractive index $ne_P$—ordinary refractive index $no_P$) or a refractive index difference in the microparticle 64B ($\Delta n_L$=extraordinary refractive index $ne_L$—ordinary refractive index $no_L$) are preferably as large as possible, and are preferably 0.05 or over, more preferably 0.1 or over, and still more preferably 0.15 or over. In the case where the refractive index differences in the bulk 64A and the microparticle 64B are large, the scattering power of the light modulation layer 64 is enhanced to allow light guide conditions to be easily disrupted, thereby allowing light from the light guide plate 10 to be easily extracted.

Further, the bulk 64A and the microparticle 64B have different response speeds with respect to an electric field. The bulk 64A has, for example, a streaky structure or a porous structure not responding to the electric field or a rod-like structure having response speed slower than that of the microparticle 64B. The bulk 64A is formed of, for example, a polymer material obtained by polymerizing a low-molecular monomer. The bulk 64A is formed, for example, by polymerizing, by one or both of heat and light, a material (for example, a monomer) with orientation and polymerization which is aligned along the alignment direction of the microparticles 64B or the alignment direction of the alignment films 33 and 35.

On the other hand, the microparticles 64B mainly include, for example, a liquid crystal material, and have a response speed sufficiently higher than that of the bulk 64A. Examples of the liquid crystal material (liquid crystal molecules) included in the microparticles 64B include rod-like molecules. As liquid crystal molecules included in the microparticles 64B, liquid crystal molecules having negative dielectric constant anisotropy (a so-called negative type liquid crystal) are used.

In this case, under no potential difference application, the long-axis directions of the liquid crystal molecules in the microparticles 64B are parallel to the optical axis AX3. At this time, the long axes of the liquid crystal molecules in the microparticles 64B are parallel to the light incident surface 10A of the light guide plate 10, and intersect with the normals to the transparent substrates 31 and 37 at the slight angle θ3. In other words, under no potential difference application, the liquid crystal molecules in the microparticles 64B are aligned to be tilted at the angle θ3 in a plane parallel to the light incident surface 10A of the light guide plate 10. The angle θ3 is called a pretilt angle, and is, for example, preferably within a range of 0.1° to 30° both inclusive. The angle θ3 is more preferably within a range of 0.5° to 10° both inclusive, and still more preferably within a range of 0.7° to 2° both inclusive. When the angle θ3 is decreased, scattering efficiency tends to be reduced due to the following reason. Moreover, when the angle θ3 is too large (for example, approximately 90°), the angle of a direction where the liquid crystal falls under potential difference application varies. For example, the liquid crystal may fall in a 180°-different direction (reverse tilt). Therefore, refractive index differences between the microparticles 64B and the bulk 64A are not allowed to be effectively used; therefore, scattering efficiency tends to be reduced, and luminance tends to be reduced.

Further, under potential difference application, in the microparticles 64B, the long-axis directions of the liquid crystal molecules intersect with or are orthogonal (or substantially orthogonal) to the optical axis AX3. At this time, the long axes of the liquid crystal molecules in the microparticles 64B are parallel to the light incident surface 10A of the light guide plate 10, as well as intersect with the normals to the transparent substrates 31 and 37 at an angle θ4 larger than the angle θ3. In other words, under potential difference application, the liquid crystal molecules in the microparticles 64B are aligned to be tilted at the angle θ4 in a plane parallel to the light incident surface 10A of the light guide plate 10 or to fall at the angle θ4 (=90°).

The above-described monomer having orientation and polymerization may be a material having optical anisotropy and forming a composite material with a liquid crystal; however, a low-molecular monomer which is cured with ultraviolet light is preferable in this embodiment. It is preferable that, in a state where no potential difference is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer are preferably aligned in the same direction. In the case where the liquid crystal is used as the microparticles 64B, when the liquid crystal includes rod-like molecules, the used monomer material preferably has a rod-like shape. As described above, a material having both of polymerization and liquid crystal properties is preferably used as the monomer material, and, for example, the monomer material preferably includes one or more functional groups selected from the group consisting of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfuncitonal group may be added. In the case where the bulk 64A has the above-described streaky structure, as the material of the bulk 64A, a bifunctional liquid crystal monomer is preferably used. Moreover, a monofunctional monomer may be added to the material of the bulk 64A to adjust a temperature at which liquid crystal properties are exhibited, or a tri- or more-functional monomer may be added to the material of the bulk 64A to improve crosslink density.

When the drive circuit 50 receives the signal specifying three-dimensional display as the control signal 204A (in a three-dimensional display mode), the drive circuit 50 allows the backlight 211 to emit a plurality of strip-like illumination light beams. More specifically, the drive circuit 50 applies, to each light modulation cell 30-1 including the sub-electrode 32a, a potential difference allowing the light modulation layer 64 to exhibit the scattering property, and applies, to each light modulation cell 30-1 including the sub-electrode 32b or the sub-electrode 32c, a potential difference allowing the light modulation layer 64 to exhibit transparency. In other words, the drive circuit 50 controls the magnitude of a potential difference applied to a pair of electrodes (the sub-electrode 32A and the upper electrode 36) of each of the light modulation cells 30-1 to allow the optical axes AX4 of the microparticles 64B in each light modulation cell 30-1 including the sub-electrode 32a to intersect with or be orthogonal (or substantially orthogonal) to the optical axis AX3 of the bulk 64A, as well as to allow the optical axes AX4 of the microparticles 64B in each light modulation cell 30-1 including the sub-electrode 32b or the sub-electrode 32c to be parallel to the optical axis AX3 of the bulk 64A. Therefore, an electric field for the three-dimensional display mode is generated in the light modulation layer 64.

Moreover, when the drive circuit 50 receives the signal specifying two-dimensional display as the control signal 204A (in a two-dimensional display mode), the drive circuit 50 allows the backlight 211 to emit planar illumination light. More specifically, the drive circuit 50 applies, to each of the light modulation cells 30-1, a potential difference allowing the light modulation layer 64 to exhibit the scattering property. In other words, the drive circuit 50 controls the magnitude of a potential difference applied to a pair of electrodes (the sub-electrode 32A and the upper electrode 36) of each of the light modulation cells 30-1 to allow the optical axes AX4 of the microparticles 64B in all light modulation cells 30-1 included in the backlight 211 to intersect with or be orthogonal (or substantially orthogonal) to the optical axis AX3 of the bulk 64A. Therefore, an electric field for the two-dimensional display mode is generated in the light modulation layer 64.

It is to be noted that when the drive circuit 50 receives the signal specifying two-dimensional display as the control signal 204A as well as a signal associated with image data (in a dual-view mode), the drive circuit 50 may allow the backlight 211 to emit planar illumination light having a luminance distribution based on the image data (for example, planar illumination light having a dark part in a plane). However, in such a case, the lower electrode 32 preferably has a layout corresponding to pixels of the display panel 210. In the case where the lower electrode 32 has a layout corresponding to the pixels of the display panel 210, based on the image data, the drive circuit 50 applies a potential difference allowing the light modulation layer 64 to exhibit the scattering property to some of the light modulation cells 30-1, and applies a potential difference allowing the light modulation layer 64 to exhibit transparency to one or more of the sub-electrodes 32A to which a potential difference allowing the light modulation layer 64 to exhibit the scattering property is not applied of the plurality of sub-electrode 32A. Therefore, an electric field for the dual-view mode is generated in the light modulation layer 64.

Next, functions and effects of the backlight 211 according to the embodiment will be described below.

In the backlight 211 according to the embodiment, in three-dimensional display, a potential difference is applied to a pair of electrodes (the sub-electrode 32A and the upper electrode 36) of each of the light modulation cells 30-1 to allow the optical axes AX4 of the microparticles 64B in each light modulation cell 30-1 including the sub-electrode 32a to intersect with or be orthogonal to the optical axis AX3 of the bulk 64A, and to allow the optical axes AX4 of the microparticles 64B in each light modulation cell 30-1 including the sub-electrode 32b or the sub-electrode 32c to be parallel or substantially parallel to the optical axis AX3 of the bulk 64A. Therefore, in the light modulation device 60, each light modulation cell 30-1 including the sub-electrode 32a serves as the scattering region 30B, and each light modulation cell 30-1 including the sub-electrode 32b or the sub-electrode 32c serves as the transparent region 30A. As a result, light emitted from the light source 20 and entering into the light guide plate 10 passes through the transparent region 30A of the light modulation device 60, and is scattered in the scattering region 30B of the light modulation device 60 (refer to FIG. 24). Light beams having passed through the bottom surface of the scattering region 30B in the scattered light beams are reflected by the reflective plate 40 to be returned to the light guide plate 10 again, and then the light beams are emitted from the top surface of the backlight 211. Moreover, light beams toward the top surface of the scattering region 30B in the scattered light beams pass through the light guide plate 10, and then are emitted from the top surface of the backlight 211. Thus, in three-dimensional display, light beams are hardly emitted from the top surface of the transparent region 30A, and light beams are emitted from the top surface of the scattering region 30B. Thus, for example, as illustrated in FIG. 24, a plurality of strip-like illumination light beams are emitted to a front direction.

Therefore, as each linear illumination light beam emitted toward the front direction enters into the back surface of the display panel 210, for example, in the case where two-dimensional image data for three-dimensional display is generated in the image signal processing circuit 207 to allow respective pixel rows in a pixel arrangement corresponding to respective strip-like illumination light beams to serve as three-dimensional pixels 210D, the respective strip-like illumination light beams enter, at a substantially equal angle, into pixels (for example, 210-1, 210-2, 210-3, or 210-4 in FIG. 24) in the same position in respective three-dimensional pixels 210D. As a result, image light modulated by the pixels in the same position in respective three-dimensional pixels 210D is emitted from the pixels at a predetermined angle. At this time, a viewer views different images having a parallax therebetween with his right and left eyes; therefore, the viewer perceives that a three-dimensional image (a stereoscopic image) is displayed on the display panel 210.

Moreover, in the backlight 211 according to the embodiment, in two-dimensional display, for example, a potential difference is applied to a pair of electrodes (the sub-electrode 32A and the upper electrode 36) of each of the light modulation cells 30-1 to allow the optical axes AX4 of the microparticles 64B in each of the light modulation cells 30-1 to intersect with or be orthogonal (or substantially orthogonal) to the optical axis AX3 of the bulk 64A. Therefore, light beams emitted from the light source 20 and entering into the light guide plate 10 are scattered in the scattering region 30B formed in the entire light modulation device 60 (refer to FIG. 25). Light beams having passed through the bottom surface of the scattering region 30B in the scattered light beams are reflected by the reflective plate 40 to be returned to the light guide plate 10 again, and then the light beams are emitted from the top surface of the backlight 211. Moreover, light beams toward the top surface of the scattering region 30B in the scattered light beams pass through the light guide plate 10 to be emitted from the top surface of the backlight 211. Thus, in two-dimensional display, for example, light beams are emitted from the entire top surface of the light modulation device 60 to emit planar illumination light toward a front direction.

Therefore, as the planar illumination light emitted toward the front direction enters into the back surface of the display panel 210, for example, when two-dimensional image data for two-dimensional display associated with respective pixels 210E is generated in the image signal processing circuit 207, planar illumination light enters into the respective pixels 210E at all angles, and image light modulated by the respective pixels 210E is emitted from the respective pixels 210E. At this time, as the viewer views the same image with both eyes, the viewer perceives that a two-dimensional image (a planar image) is displayed on the display panel 210.

Moreover, in the embodiment, the light modulation layer 64 exhibiting the scattering property or transparency with respect to light from the light source, depending on magnitude of an electric field is included in the backlight 211. Therefore, light emitted from the light source 20 and propagating through the transparent substrate 31 and the like passes through a region exhibiting transparency by electric field control of the light modulation layer 64 to be totally reflected by the top surface of the backlight 211 or to be reflected by the top surface of the backlight 211 with high reflectivity. As a result, luminance in the transparent region in the light emission region of the backlight 211 is reduced, compared to the case where light is uniformly emitted from the entire surface of the backlight 211. On the other hand, light propagating through the transparent substrate and the like is scattered by a region exhibiting the scattering property by the electric field control of the light modulation layer 64 to pass through the top surface of the backlight 211. As a result, luminance in the scattering region in the light emission region of the backlight 211 is increased, compared to the case where light is uniformly emitted from the entire surface of the backlight 211. Moreover, luminance in white display is partially increased (partial luminance enhancement) by a reduced amount of the luminance of the transparent region in the light emission region. Further, in the embodiment, the area per unit area of each sub-electrode 32A or each linear electrode 32E varies with the distance from the light source 20. Therefore, a density distribution of the transparent region and the scattering region in the light emission region is allowed to be adjusted to become a desired distribution. As a result, compared to the case where a light emission area per unit area of each of the strip-like illumination light beams does not vary with the distance from the light source 20, luminance on a side closer to the light source 20 of the light emission region is allowed to become lower, and luminance on a side farther from the light source of the light emission region is allowed to become higher. Accordingly, in three-dimensional display, while in-plane luminance is uniformized, a modulation ratio is allowed to be increased.

Moreover, in the embodiment, as in the case of the above-described embodiment, the layout of the scattering regions 30B is adjusted to allow the pixel pitch Px in the horizontal direction and the pixel pitch Py in the vertical direction to become closer to each other. As a result, degradation in image quality is allowed to be suppressed.

In the embodiment, as the bulk 64A and the microparticles 64B each include mainly an optical anisotropic material, the scattering property in an oblique direction is reduced, thereby enabling to improve transparency. For example, the bulk 64A and the microparticles 64B include mainly the optical anisotropic materials with ordinary refractive indices which are equal to each other and extraordinary refractive indices which are also equal to each other, and in addition thereto, the directions of the optical axes of the bulk 64A and the microparticles 64B coincide with or substantially coincide with each other in a region where a potential difference is not applied between the lower electrode 32 and the upper electrode 36. Therefore, the refractive index difference is reduced or eliminated in all directions including the front direction (a direction of the normal to the light modulation device 60) and the oblique direction, thereby obtaining high transparency. As a result, the leakage of light in a range having a large view angle is allowed to be reduced or substantially eliminated, and view angle characteristics are allowed to be improved.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices coincide with each other in all directions, thereby enabling to achieve a state where transparency is high, and to further improve the view angle characteristics.

Moreover, in the embodiment, for example, as illustrated in the parts (A) and (B) in FIG. 19, luminance in the transparent region 30A (luminance in black display) is lower, compared to the case where light is uniformly emitted from the entire surface of the backlight 211 (indicated by the alternate long and short dash line in the part (B) in FIG. 19). On the other hand, luminance in the scattering region 30B is significantly increased, compared to the case where light is uniformly emitted from the entire surface of the backlight 211 (indicated by the alternate long and short dash line in the part (B) in FIG. 19), and luminance in white display is partially increased (partial luminance enhancement) by a reduced amount of the luminance of the transparent region 30A, because, as the bulk 64A and the microparticle 64B each include mainly the optical anisotropic material, the scattering property in the oblique direction is suppressed to reduce leak light from the light guide plate in a dark state. Therefore, as light is guided from a part in a partially-dark state to a part in a partially-bright state, partial luminance enhancement is achievable without increasing electric power supplied to the backlight 211.

Moreover, in the embodiment, in a region where a potential difference is not applied between the lower electrode 32 and the upper electrode 36, the optical axes AX4 of the microparticles 64B are parallel to the light incident surface 10A of the light guide plate 10, and intersect with the normals to the transparent substrates 31 and 37 at the slight angle θ3. In other words, the liquid crystal molecules included in the microparticles 64B are aligned to be tilted at the angle θ3 in a plane parallel to the light incident surface 10A (i.e., to have a pretilt angle). Therefore, when a potential difference is applied between the lower electrode 32 and the upper electrode 36, the liquid crystal material included in the microparticles 64B does not fall in random directions, but falls in the plane parallel to the light incident surface 10A. At this time, the optical axis AX3 of the bulk 64A and the optical axes AX4 of the microparticles 64B intersect with or are orthogonal to each other in the plane parallel to the light incident surface 10A. In this case, light vibrating perpendicularly with respect to the transparent substrate 31 in light incident from the light incident surface 10A of the light guide plate 10 exhibits a difference between the ordinary refractive index of the microparticle 64B and the extraordinary refractive index of the bulk 64A. At this time, as the difference between the ordinary refractive index of the microparticle 64B and the extraordinary refractive index of the bulk 64A is large, scattering efficiency of light vibrating perpendicularly with respect to the transparent substrate 31 is increased. On the other hand, light vibrating in parallel with the transparent substrate 31 exhibits a difference between the extraordinary refractive index of the microparticle 64B and the ordinary refractive index of the bulk 64A. At this time, as the difference between the extraordinary refractive index of the microparticle 64B and the ordinary refractive index of the bulk 64A is also large, scattering efficiency of light vibrating in parallel with the transparent substrate 31 is increased. Therefore, light propagating through a region where a potential difference is applied between the lower electrode 32 and the upper electrode 36 includes a large amount of a component in an oblique direction. For example, in the case where an acrylic light guide plate is used as the light guide plate 10, light in a region where a potential difference is applied between the lower electrode 32 and the upper electrode 36 propagates at an angle of 41.8° or over. As a result, a refractive index difference is increased to obtain a high scattering property, thereby enabling to improve display luminance. Moreover, the display luminance is allowed to be further improved by the above-described partial luminance enhancement effect.

For example, in the case where the optical axis AX3 of the bulk 64A and the optical axes AX4 of the microparticles 64B are disposed perpendicular to the light incident surface 10A of the light guide plate 10 under no potential difference application, and when a potential difference is applied between the lower electrode 32 and the upper electrode 36, the liquid crystal material included in the microparticles 64B falls in a plane perpendicular to the light incident surface 10A, as in the above-described case, light vibrating perpendicularly with respect to the transparent substrate 31 exhibits a difference between the ordinary refractive index of the microparticle 64B and the extraordinary refractive index of the bulk 64A, but light vibrating in a direction parallel to the transparent substrate 31 exhibits a difference between the ordinary refractive index of the microparticle 64B and the ordinary refractive index of the bulk 64A. In this case, there is little or no difference between the ordinary refractive index of the microparticle 64B and the ordinary refractive index of the bulk 64A. Therefore, in light incident from the light incident surface 10A, while light vibrating perpendicularly with respect to the transparent substrate 31 exhibits a large refractive index difference as in the above-described case, light vibrating in a direction parallel to the transparent substrate 31 exhibits little or no refractive index difference. As a result, while scattering efficiency of light vibrating perpendicularly with respect to the transparent substrate 31 is high, scattering efficiency of light vibrating in parallel with the transparent substrate 31 is low or zero. Therefore, in the case where the optical axes AX3 and AX4 are disposed perpendicular to the light incident surface 10A, compared to the case where the optical axes AX3 and AX4 are disposed in parallel with the light incident surface 10A, scattering efficiency is lower, and accordingly, luminance extracted from the light guide plate 10 is lower than that in the light modulation device 30 in the embodiment.

Moreover, in the case where the pretilt is not formed, or in the case where the pretilt angle is substantially approximately 90°, the liquid crystal falls in random directions; therefore, the refractive index difference is equal to an average of a refractive index difference in the case where the optical axis AX3 of the bulk 64A and the optical axes AX4 of the microparticles 64B are parallel to the light incident surface 10A of the light guide plate 10, and a refractive index difference in the case where the optical axis AX3 of the bulk 64A and the optical axes AX4 of the microparticles 64B are perpendicular to the light incident surface 10A of the light guide plate 10. Therefore, also in these cases, compared to the case where the optical axis AX3 of the bulk 64A and the optical axes AX4 of the microparticles 64B are parallel to the light incident surface 10A of the light guide plate 10, extracted luminance is lower.

Consequently, in the embodiment, while the leakage of light in a range having a large view angle is reduced or substantially eliminated, display luminance is allowed to be improved. As a result, a modulation ratio in the front direction is allowed to be increased.

[Modification]

In the second embodiment, the optical axes AX3 and AX4 are oriented in a direction intersecting with or orthogonal (or substantially orthogonal) to transparent substrate 31 under no potential difference application, and the optical axis AX4 is displaced to a direction parallel or substantially parallel to the light incident surface 10A and the transparent substrate 31 under potential difference application. However, the optical axes AX3 and AX4 may be directed in a direction intersecting with or orthogonal (or substantially orthogonal) to the transparent substrate 31 under no potential difference application, and the optical axis AX4 may be displaced to a direction parallel or substantially parallel to the transparent substrate 31 as well as in a direction intersecting with or orthogonal (or substantially orthogonal) to the light incident surface 10A.

(3. Modifications)

[First Modification]

Figure 43:
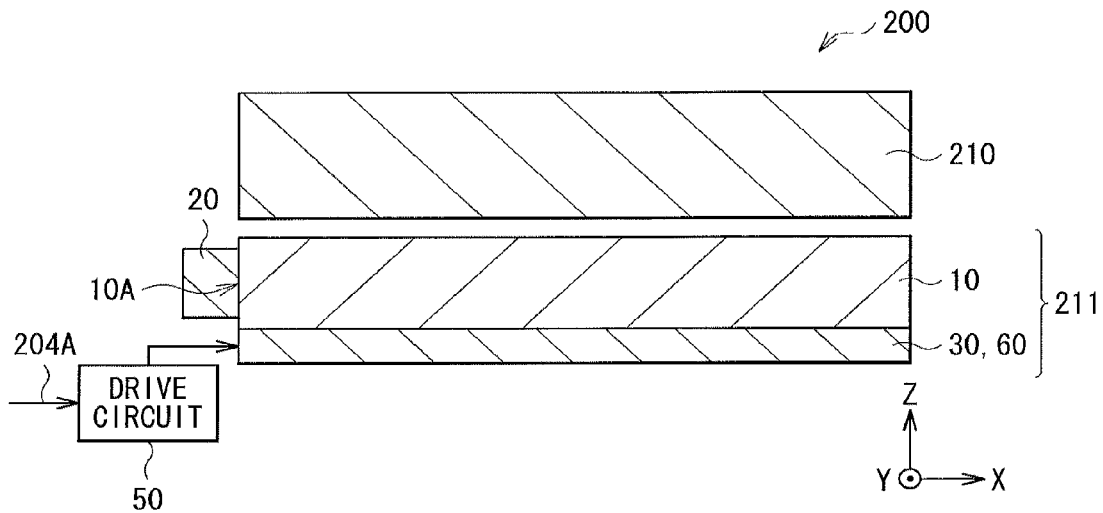
FIG. 43 is a sectional view illustrating a first modification of the configuration of the display section in the receiver-side unit in each of the embodiments.

In the above-described embodiments, the reflective plate 40 is included; however, for example, as illustrated in FIG. 43, the reflective plate 40 may not be included. In this case, the lower electrode 32 is preferably made of a material having a light reflection function such as metal.

[Second Modification]

Figure 44:
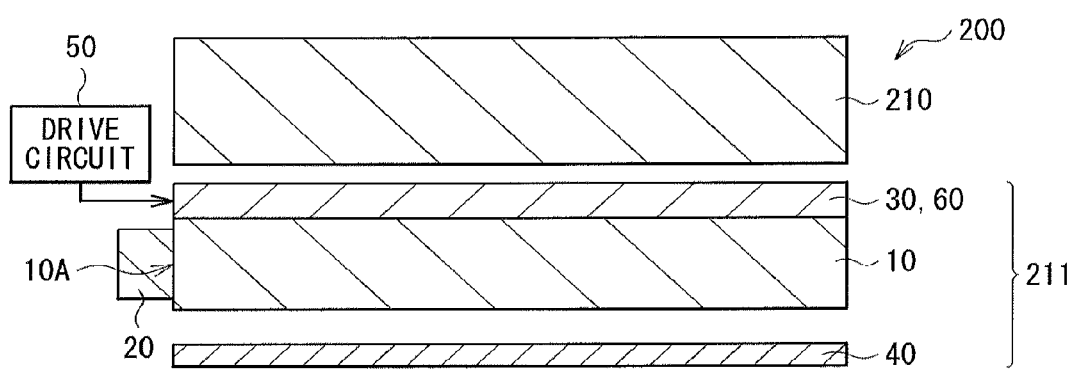
FIG. 44 is a sectional view illustrating a second modification of the configuration of the display section in the receiver-side unit in each of the embodiments.
Figure 45:
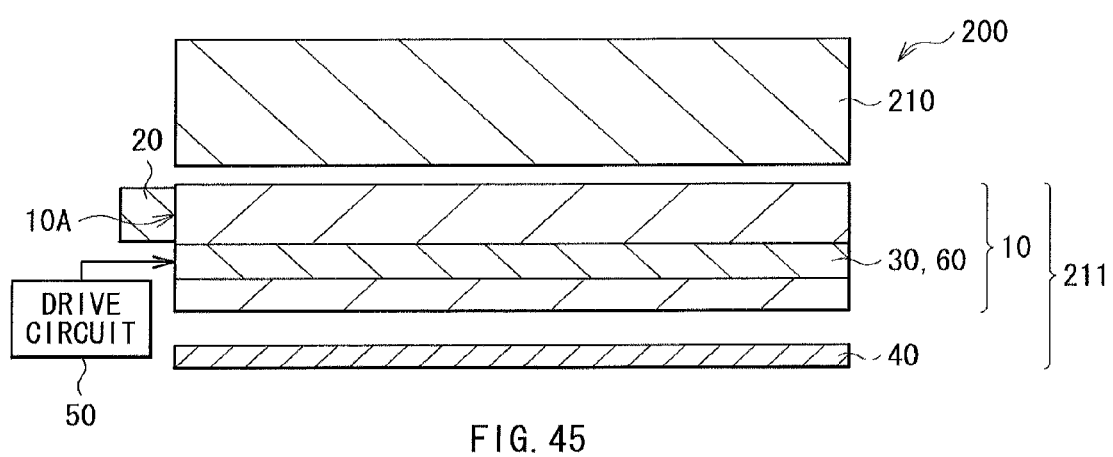
FIG. 45 is a sectional view illustrating a third modification of the configuration of the display section in the receiver-side unit in each of the embodiments.

In the above-described embodiments, the light modulation devices 30 and 60 each are in close contact with and are bonded to the back side (the bottom surface) of the light guide plate 10 without an air layer in between; however, for example, as illustrated in FIG. 44, the light modulation devices 30 and 60 may be in close contact with and bonded to the top surface of the light guide plate 10 without an air layer in between. Moreover, for example, as illustrated in FIG. 45, the light modulation devices 30 and 60 may be disposed in the light guide plate 10. However, also in this case, it is necessary for the light modulation devices 30 and 60 to be in close contact with and bonded to the light guide plate 10 without an air layer in between.

[Third Modification]

Figure 46:
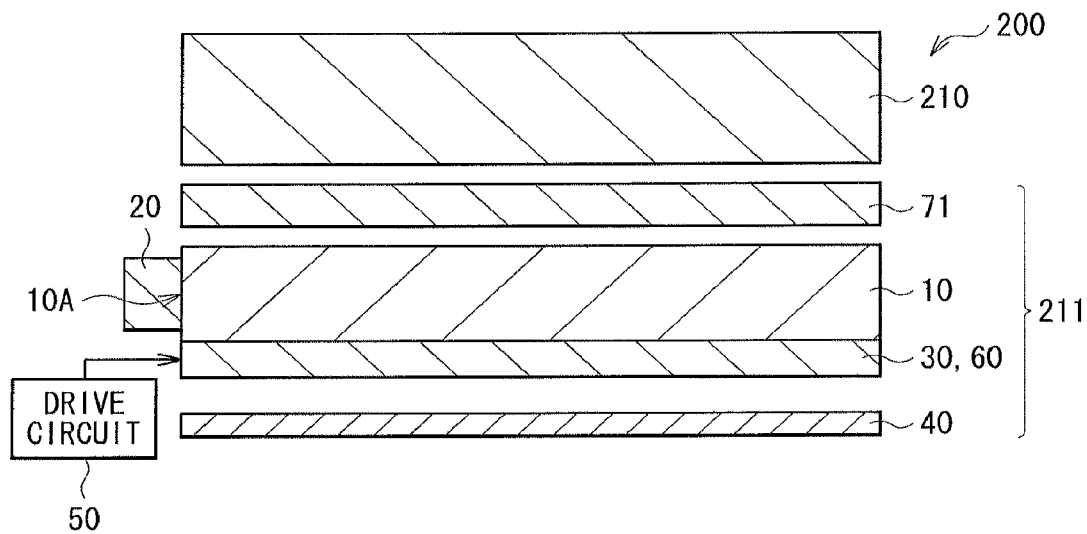
FIG. 46 is a sectional view illustrating a fourth modification of the configuration of the display section in the receiver-side unit in each of the embodiments.

Moreover, in the above-described respective embodiments and modifications thereof, no component is specifically disposed on the light guide plate 10; however, for example, as illustrated in FIG. 46, an optical sheet 71 (for example, a diffusion plate, a diffusion sheet, a lens film, a polarization splitter sheet, or the like) may be provided. In such a case, some of light emitted from the light guide plate 10 in an oblique direction rises in the front direction; therefore, a modulation ratio is allowed to be effectively improved.

[Fourth Modification]

Figure 47:
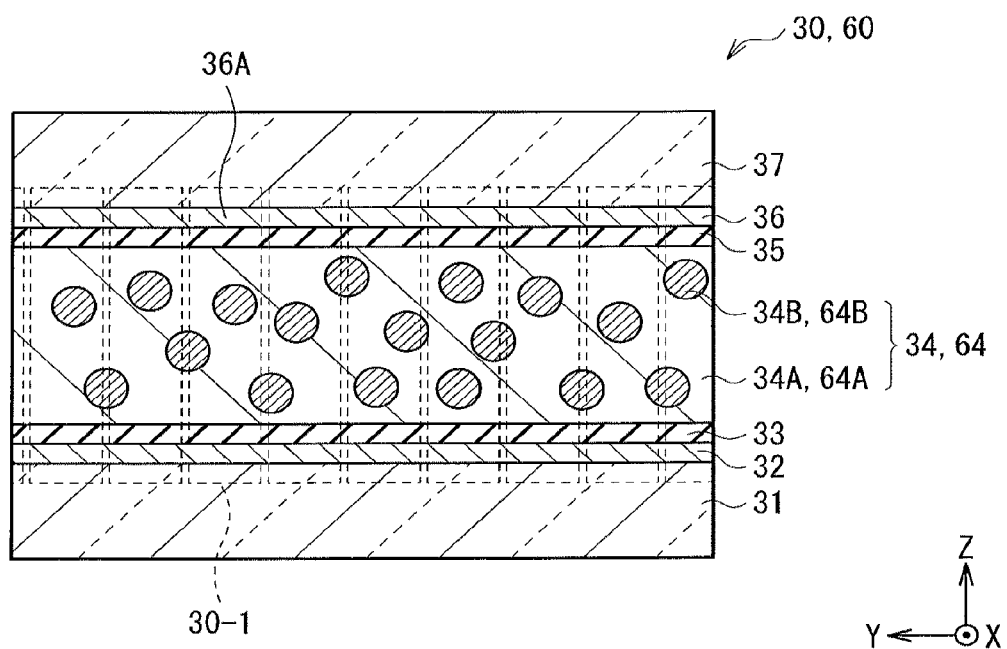
FIG. 47 is a sectional view illustrating a fifth modification of the configuration of the display section in the receiver-side unit in each of the embodiments.

Further, in the above-described respective embodiments and modifications thereof, the upper electrode 36 is configured of a solid film formed on an entire surface, and the lower electrode 32 is configured of a plurality of strip-shaped sub-electrodes 32A; however, for example, as illustrated in FIG. 47, the upper electrode 36 may be configured of a plurality of strip-shaped sub-electrodes 32A, and the lower electrode 32 may be configured of a solid film formed on an entire surface.

[Fifth Modification]

In the above-described respective embodiments and the first to third modifications, the upper electrode 36 is configured of a solid film formed on an entire surface; however, for example, as illustrated in FIGS. 48 to 53, the upper electrode 36 may be configured of the upper electrode 36 in the fourth modification rotated by 90° in a plane. In such a case, the drive circuit 50 allows strip-like illumination light beams to be emitted based on posture information of the display panel 211 supplied from a gyro sensor (not illustrated) with use of a plurality of sub-electrodes 32a included in the lower electrode 32 or a plurality of sub-electrodes 32a included in the upper electrode 36. Therefore, when a user of the receiver-side unit 200 rotates the display panel 210 by 90°, the gyro sensor or the like detects such rotation, and the sub-electrodes 32a used for 3D display are selected with use of a detection result, thereby enabling to obtain a three-dimensional image irrespective of the direction of the display panel 210.

[Sixth Modification]

Figure 48:
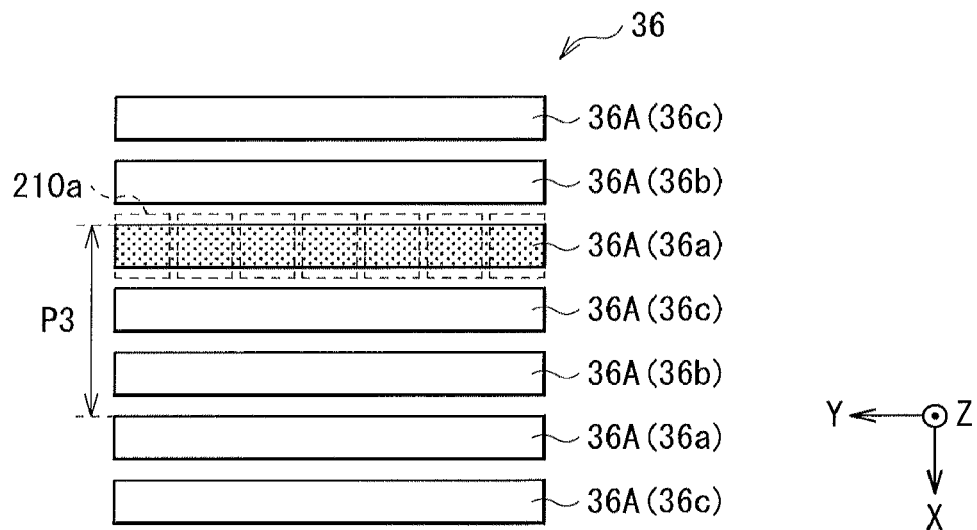
FIG. 48 is a plan view illustrating an example of an upper electrode in FIG. 47.

In the above-described respective embodiments and the first to third modifications, the upper electrode 36 is configured of a solid film formed on an entire surface; however, for example, as illustrated in FIG. 48, the upper electrode 36 may be configured of a plurality of sub-electrodes 36A. At this time, when three-dimensional display is performed in the receiver-side unit 200, two or more specific sub-electrodes 36A (hereinafter referred to as "sub-electrodes 36a") selected from the plurality of sub-electrodes 36A are used to generate strip-like illumination light beams. The two or more sub-electrodes 36a are arranged with a pitch P3 corresponding to (equal to or close to) the pixel pitch P2 (refer to FIG. 24) when three-dimensional display is performed in the receiver-side unit 200. Other sub-electrodes 36A (hereinafter referred to as "sub-electrodes 36b and 36c") except for the sub-electrodes 36a are used with the sub-electrodes 36a to generate planar illumination light when two-dimensional display is performed in the receiver-side unit 200. In other words, when two-dimensional display is performed in the receiver-side unit 200, all sub-electrodes 36A are used to generate planar illumination light. The sub-electrodes 36a, 36b, and 36c are arranged in this order in an arrangement direction (a direction orthogonal to the light incident surface 10A), and a plurality of combinations of the sub-electrodes 36a, 36b, and 36c are arranged in the arrangement direction.

The sub-electrodes 36A each have a strip-like shape extending in one direction in a plane as well as in a direction intersecting with or orthogonal (or substantially orthogonal)

to the normal to the light incident surface 10A. In each of the sub-electrodes 36A, an area of a portion used for one pixel 210a in the display panel 210 (an area of a gray portion in the drawing) is uniform irrespective of the distance from the light source 20. For example, as illustrated in FIG. 48, the width of each sub-electrode 36A is uniform. It is to be noted that, in some cases, the width of each sub-electrode 36A may be nonuniform.

Figure 49:
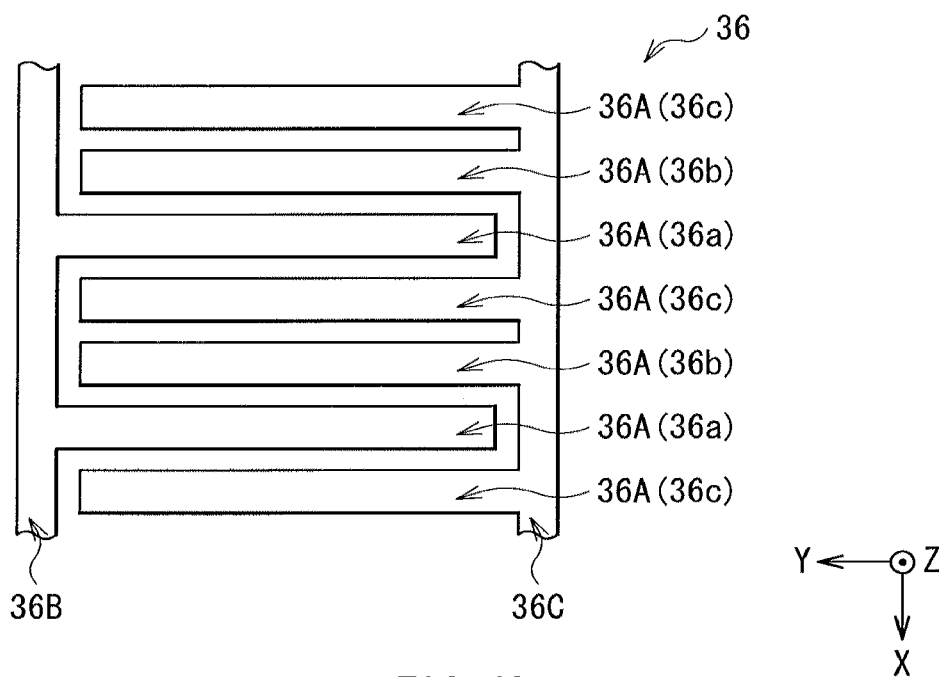
FIG. 49 is a plan view illustrating a first modification of an electrode configuration in FIG. 48.
Figure 50:
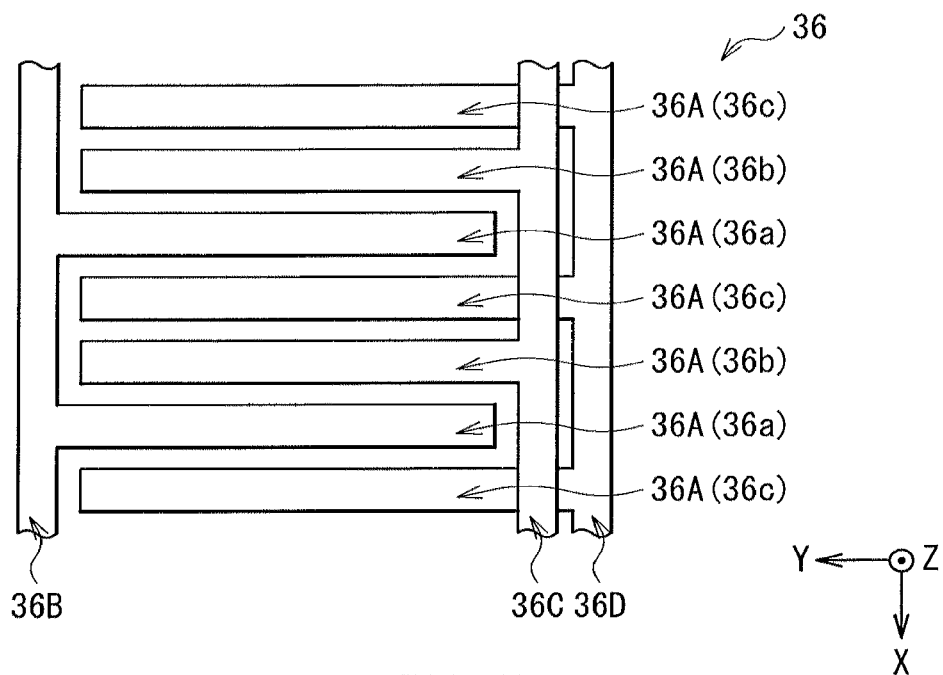
FIG. 50 is a plan view illustrating a second modification of the electrode configuration in FIG. 48.
Figure 51:
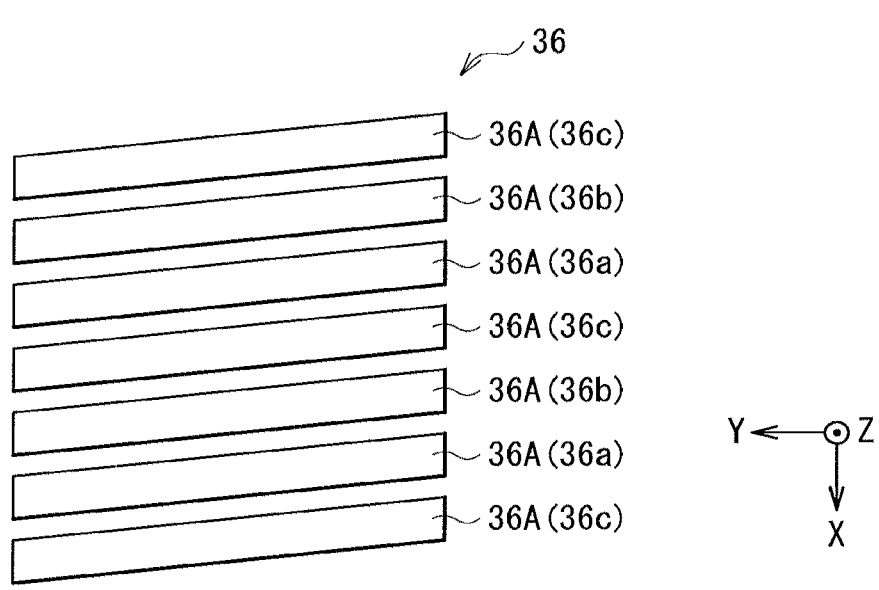
FIG. 51 is a plan view illustrating a third modification of the electrode configuration in FIG. 48.
Figure 52:
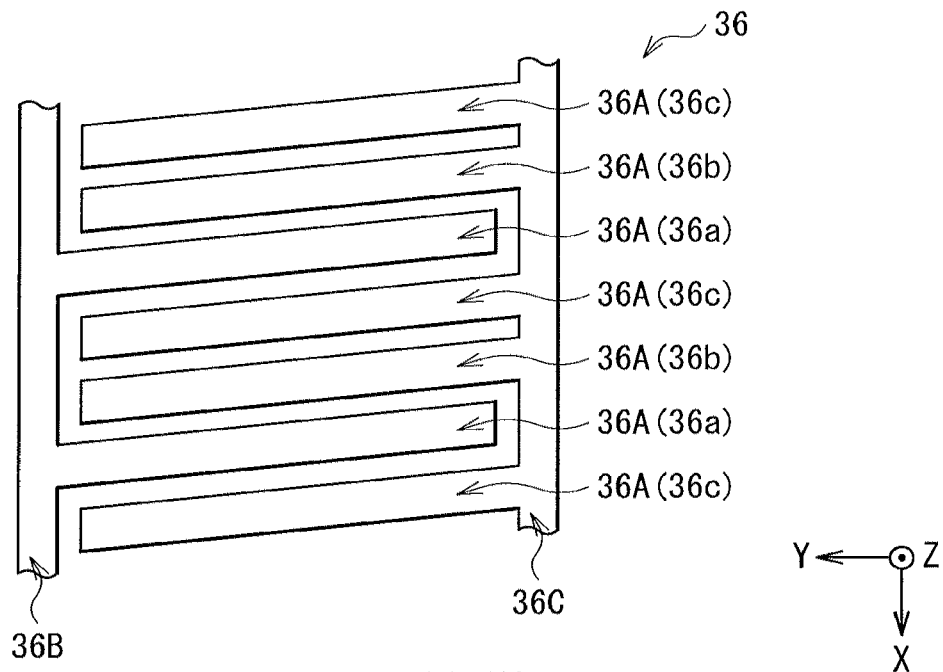
FIG. 52 is a plan view illustrating a fourth modification of the electrode configuration in FIG. 48.
Figure 53:
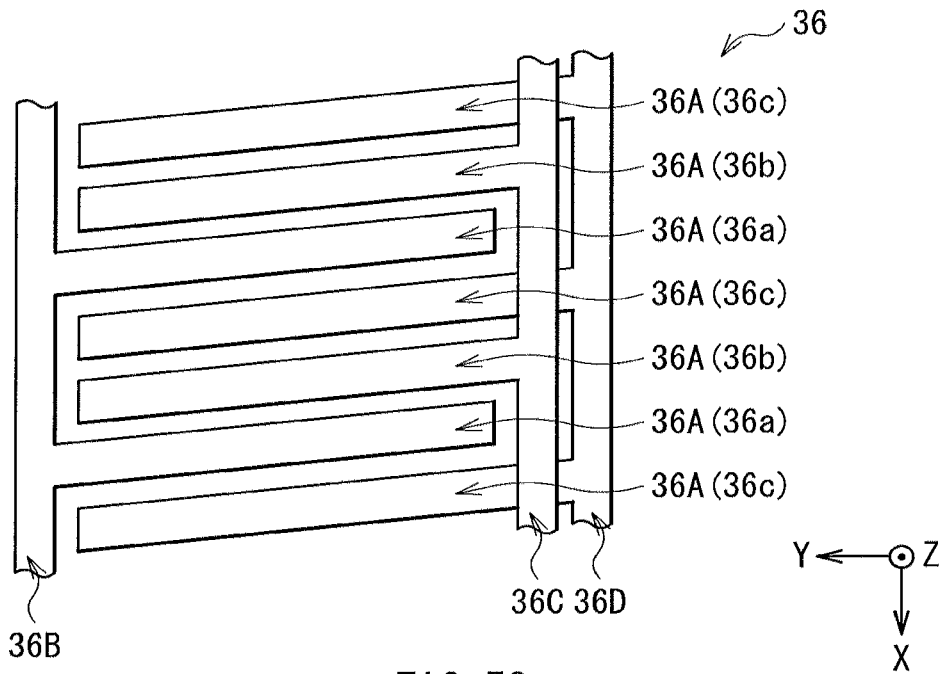
FIG. 53 is a plan view illustrating a fifth modification of the electrode configuration in FIG. 48.

For example, as illustrated in FIG. 48, the sub-electrodes 36A may be formed separately from one another and may be allowed to be driven independently of one another; however, all of the sub-electrodes 36a may be electrically connected to one another. For example, as illustrated in FIG. 49, all of the sub-electrodes 36a may be electrically connected to one another through a wiring line 36B extending in the arrangement direction. Moreover, for example, all of the sub-electrodes 36b and 36c may be electrically connected to one another. For example, as illustrated in FIG. 49, all of the sub-electrodes 36b and 36c may be electrically connected to one another through a wiring line 36C extending in the arrangement direction. It is to be noted that, in the case where multi-perspective display is performed in two-dimensional display, the sub-electrodes 36b and the sub-electrodes 36c are preferably electrically separated from each other. In this case, for example, as illustrated in FIG. 50, all of the sub-electrodes 36b may be electrically connected to one another through the wiring line 36C extending in the arrangement direction, and all of the sub-electrodes 36c may be electrically connected to one another through a wiring line 36D extending in the arrangement direction.

For example, as illustrated in FIGS. 47, 51, 52, and 53, the sub-electrodes 36A may extend in a direction diagonally intersecting with the light incident surface 10A. In such a case, the extending direction of the sub-electrodes 36A is displaced from a direction parallel to the light incident surface 10A; therefore, a difference between resolution in a direction parallel to the normal to the light incident surface 10A and resolution in a direction parallel to the light incident surface 10A is allowed to be reduced.

Figure 54:
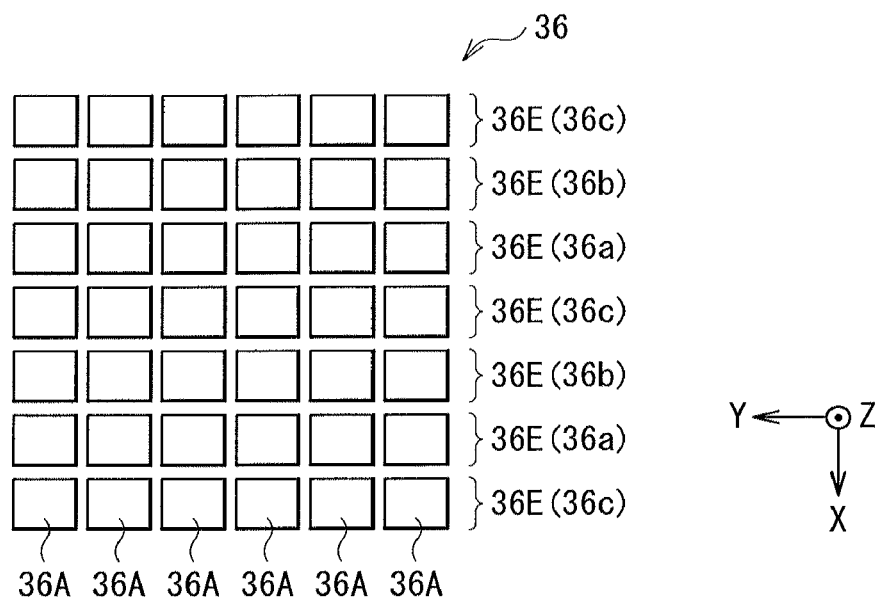
FIG. 54 is a plan view illustrating a sixth modification of the electrode configuration in FIG. 48.
Figure 55:
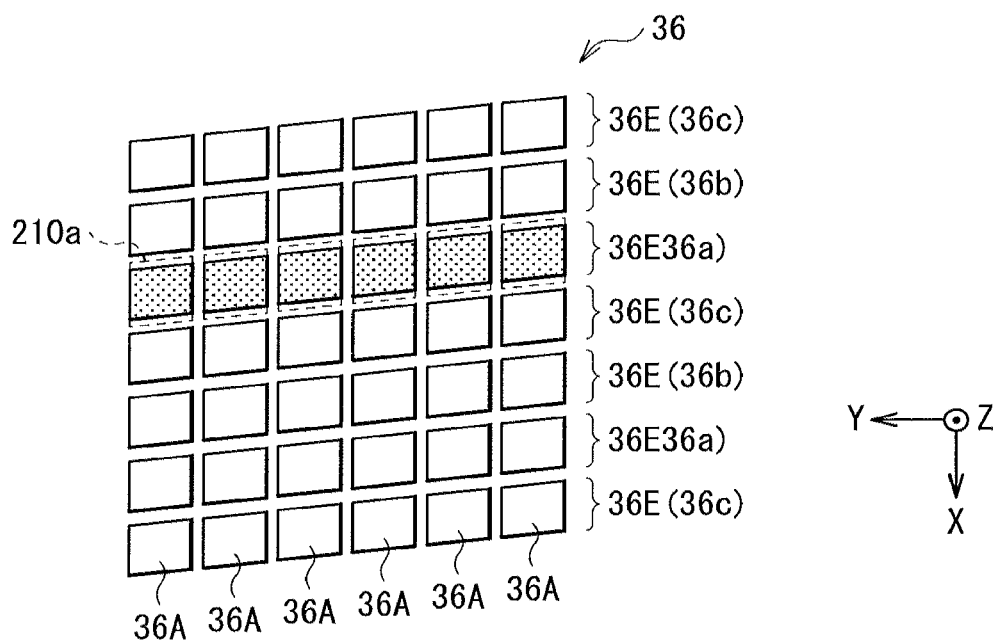
FIG. 55 is a plan view illustrating a seventh modification of the electrode configuration in FIG. 48.

For example, as illustrated in FIGS. 54 and 55, the plurality of the sub-electrodes 36A may each have a block shape, and may be two-dimensionally arranged. In this case, when a combination of two or more of the plurality of the sub-electrodes 36A are considered as one linear electrode 36E, for example, an area of a portion used for one pixel 210a in the display panel 210 (an area of a gray portion in the drawing) of each linear electrode 36E is uniform irrespective of the distance from the light source 20. For example, the width of each linear electrode 36E is uniform. It is to be noted that the width of each linear electrode 36E may be nonuniform.

[Seventh Modification]

Figure 56:
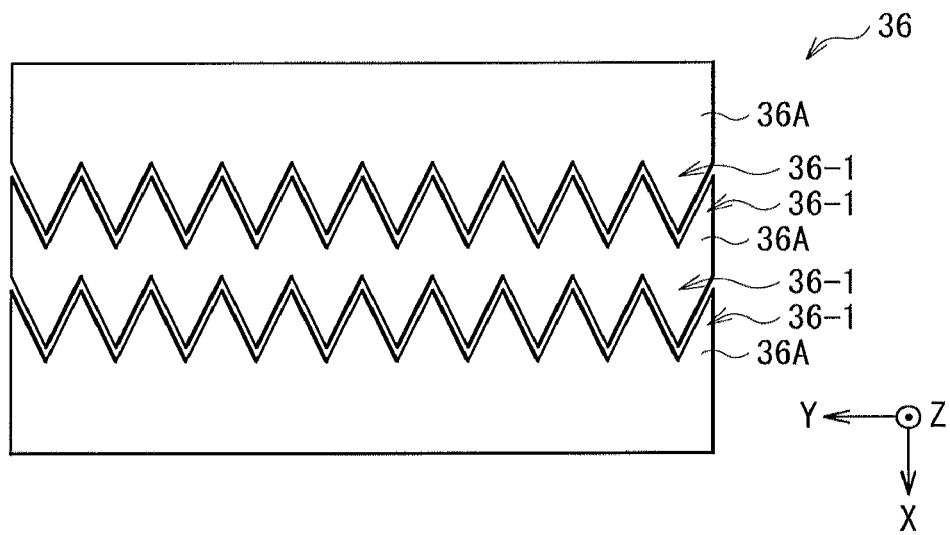
FIG. 56 is a plan view illustrating an eighth modification of the electrode configuration in FIG. 48.
Figure 57:
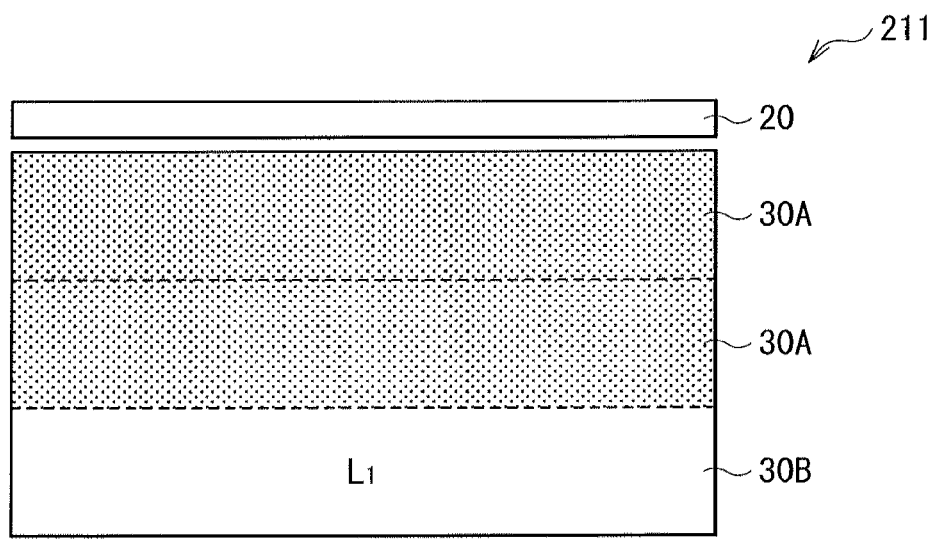
FIG. 57 is a schematic view for describing an example of a function of a light modulation device having the electrode configuration in FIG. 56.
Figure 58:
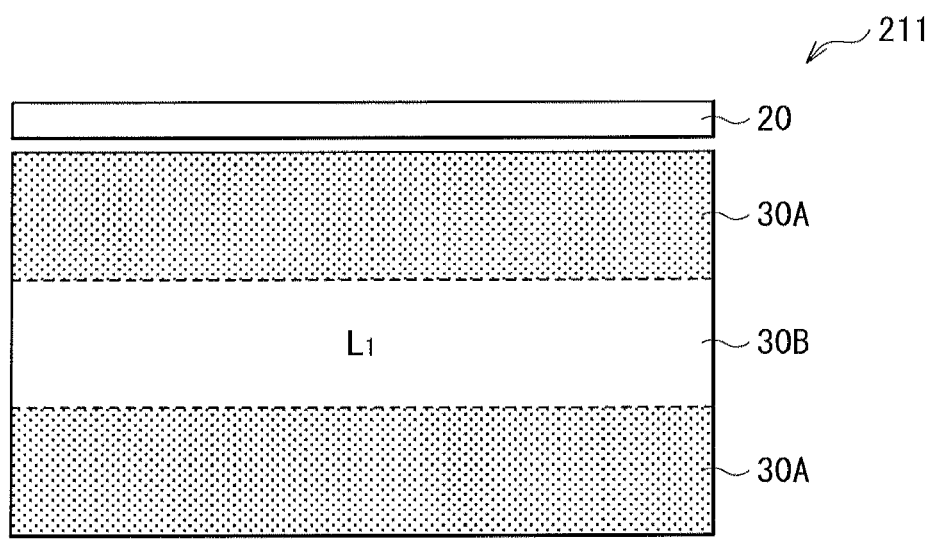
FIG. 58 is a schematic view for describing another example of the function of the light modulation device having the electrode configuration in FIG. 56.
Figure 59:
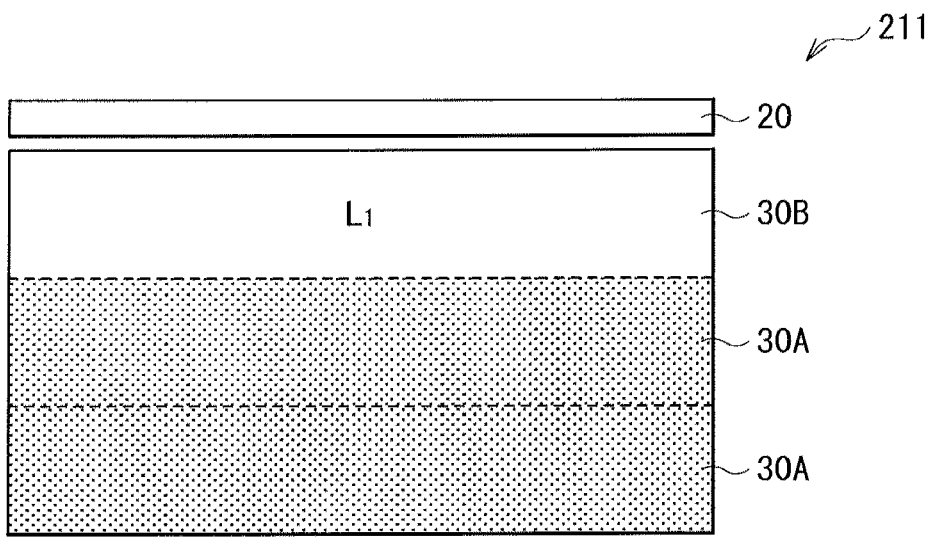
FIG. 59 is a schematic view for describing still another example of the function of the light modulation device having the electrode configuration in FIG. 56.

In the above-described respective embodiments and the first to third modifications, the upper electrode 36 is configured of a solid film formed on an entire surface; however, for example, as illustrated in FIG. 56, the upper electrode 36 may be configured of a plurality of sub-electrodes 36A extending in a direction parallel to the light incident surface 10A. At this time, the drive circuit 50 selects one sub-electrode 36A to allow a strip-like illumination light beam to be emitted from a position corresponding to the selected sub-electrode 36A. Moreover, when the drive circuit 50 sequentially selects the sub-electrodes 36A, for example, as illustrated in FIGS. 57, 58, and 59, strip-like illumination light beams L1 extending in a direction parallel to the light incident surface 10A are allowed to be scanned.

Moreover, in this modification, for example, as illustrated in FIG. 56, each of sub-electrodes 36A preferably has a concavo-convex section 36-1 (a concavo-convex shape) at an edge in proximity to an adjacent sub-electrode 36A. In this case, a concavo-convex pitch of the concavo-convex section 36-1 is preferably approximately equal to or smaller than the width of the sub-electrode 32A (for example, several tens of micrometers) to reduce a contrast ratio of a boundary in the case where some of the sub-electrodes 36A are driven (in the case where a partial drive is performed). Therefore, in the case where each sub-electrode 36A has the concavo-convex section 36-1, edges of illumination light beams from the backlight 211 are allowed to be prevented from being too conspicuous, when different voltages are applied to two adjacent sub-electrodes 36A, respectively.

Moreover, in this modification, the drive circuit 50 may apply an equal voltage to the respective sub-electrodes 36A irrespective of the distance from the light source 20. Further, the drive circuit 50 may apply, to each of the sub-electrodes 36A, a voltage varying with the distance from the light source 20, as necessary. In such a case, when illumination light beams allowing a part of a top surface of the backlight 211 to have white luminance are emitted, a possibility of causing a difference in the magnitude of white luminance between the case where the part having white luminance is located close to the light source 20 and the case where the part having white luminance is located far from the light source 20 is allowed to be reduced.

[Eighth Modification]

In the above-described respective embodiments and modifications thereof, for example, as illustrated in FIG. 60A, the light source 20 may be configured of a linear light source 21 and a reflective mirror 22. The linear light source 21 is configured of, for example, a HCFL or a CCFL. The reflective mirror 22 reflects, to the light incident surface 10A, light toward a direction not directly entering the light incident surface 10A of light emitted from the linear light source 21. For example, as illustrated in FIG. 60B or 60C, the light source 20 may be configured of a plurality of point-like light sources 23 arranged in one line. Each of the point-like light sources 23 emits light toward the light incident surface 10A, and is configured of, for example, a light-emitting device having a light emission spot on a surface facing the light incident surface 10A. Examples of such a light-emitting device include an LED and a laser diode (LD). Each of the point-like light sources 23 is preferably configured of a white LED in terms of efficiency, a reduction in profile, and uniformity. It is to be noted that the plurality of point-like light sources 23 included in the light source 20 may be configured of, for example, a red LED, a green LED, and a blue LED.

For example, as illustrated in FIGS. 60B and 60C, every two or more point-like light sources 23 in the plurality of point-like light sources 23 may be arranged on one common substrate 24. In this case, a light source block 25 is configured of one substrate 24 and two or more point-like light sources 23 arranged on the substrate 24. The substrate 24 is, for example, a circuit board on which wiring electrically connecting the point-like light sources 23 and the drive circuit 50 to each other is installed, and the respective point-like light sources 23 are mounted on the circuit board. The respective point-like light sources 23 arranged on one substrate 24 (the respective point-like light sources 23 in one light source block 25) are collectively (not independently) driven by the drive circuit 50, and are connected to one another in parallel or in series (not illustrated). Moreover, the point-like light sources 23 arranged on different substrates 24 (the point-like light sources 23 in respective light source blocks 25) may be driven by the drive circuit 50 independently of one light source block 25 to another. At this time, for example, as illustrated in FIG. 60C, the point-like light sources 23 arranged on different substrates 24 (the point-like light sources 23 in respective light source blocks 25) are connected to different current paths.

As illustrated in FIGS. 60A to 60C, the light source 20 may be disposed on only one side surface of the light guide plate 10, or although not illustrated, the light sources 20 may be disposed on two side surfaces, three side surfaces, or all side surfaces of the light guide plate 10. Moreover, in the case where the light sources 20 are disposed on three side surfaces or all side surfaces, only light sources 20 disposed on two facing side surfaces may illuminate when partial lighting is performed, and all light sources 20 may illuminate when entire lighting is performed.

[Ninth Modification]

Figure 61A:
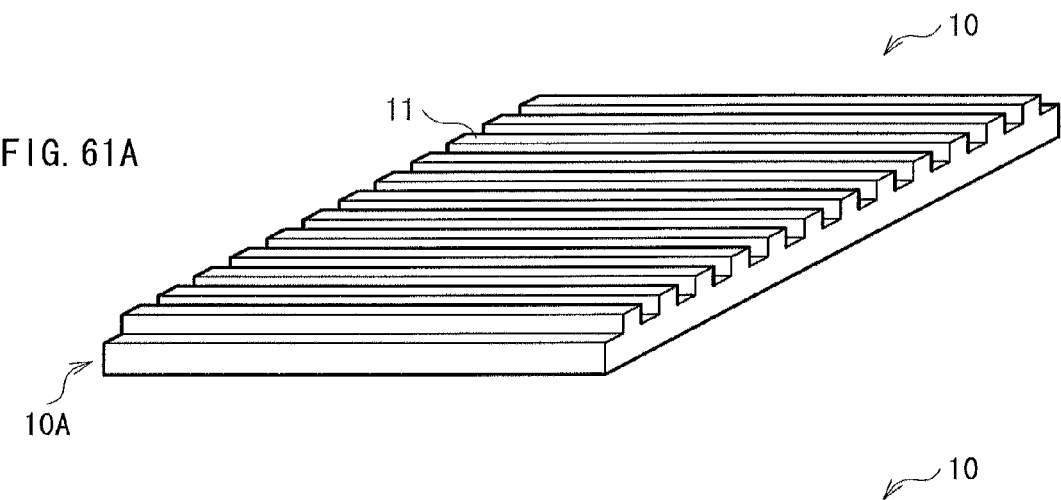
FIGS. 61A and 61B are perspective views illustrating examples of a configuration of a light guide plate in each of the embodiments.
Figure 61B:
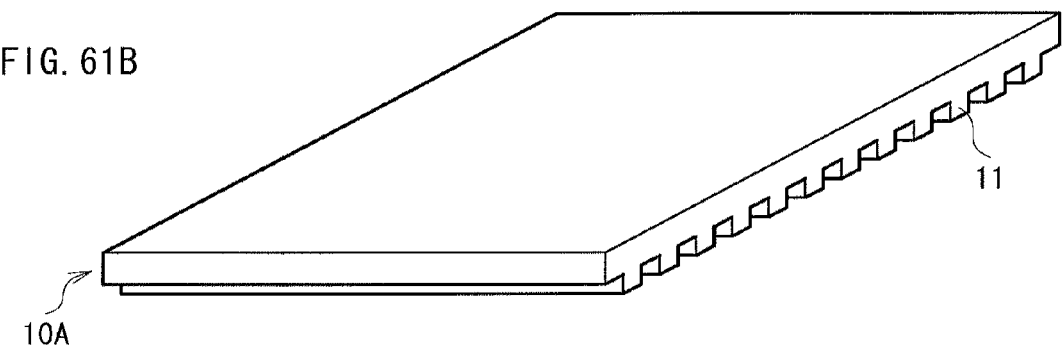

In the above-described embodiments and modifications thereof, for example, as illustrated in FIG. 61A, the light guide plate 10 may have a plurality of strip-like projections 11 on a top surface thereof. It is to be noted that, for example, as illustrated in FIG. 61B, the light guide plate 10 may have a plurality of strip-like projections 11 on a bottom surface thereof. Moreover, for example, the light guide plate 10 may have a plurality of strip-like projections 11 in the light guide plate 10 (not illustrated). Further, the light guide plate 10 may be hollow, or may be densely packed.

The projections 11 extend in a direction parallel to the normal to the light incident surface 10A, and, for example, as illustrated in FIGS. 61A and 61B, the projections 11 are successively formed from one side surface of the light guide plate 10 to another side surface facing the side surface. A section in an arrangement direction of each of the projections 11 has, for example, a rectangular shape, a trapezoidal shape, or a triangular shape. In the case where the section in the arrangement direction of each projection 11 has a rectangular shape, a rectilinear propagation property of light is extremely high, and the projections 11 are suitable for a large-scale backlight. In the case where the section in the arrangement direction of each projection 11 has a trapezoidal shape, processing of a die used to form each projection 11 by injection molding, extrusion molding, heat-press molding, or the like is easy, and mold releasability in molding is high, and yields and molding speed are allowed to be improved due to a reduction in errors.

Figure 62A:
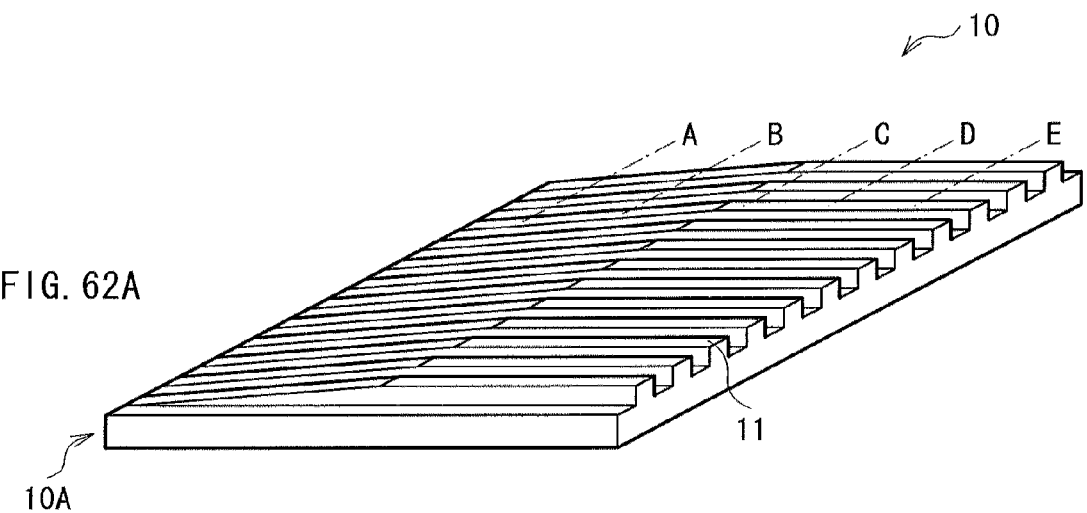
FIGS. 62A and 62B are a perspective view and a sectional view, respectively, illustrating another example of the configuration of the light guide plate in each of the embodiments.
Figure 62B:
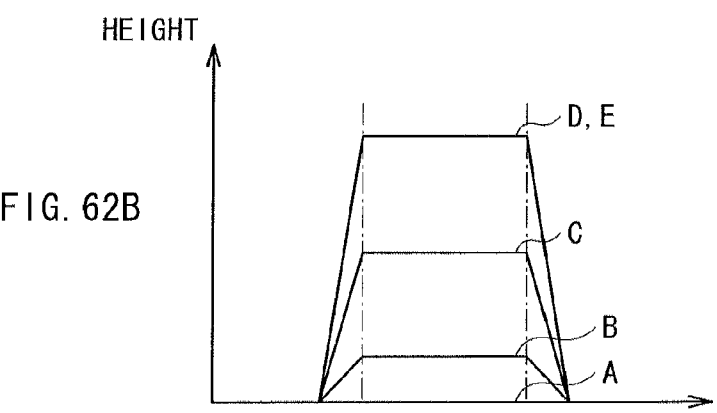

A flat surface may or may not be disposed between adjacent projections 11. The height of each of the projections 11 may be uniform or nonuniform in a plane. For example, as illustrated in FIGS. 62A and 62B, when one side surface of the light guide plate 10 is the light incident surface 10A, the height of each of the projections 11 may be smaller on a side closer to the light incident surface 10A, and higher on a side closer to a side surface facing the light incident surface 10A. Moreover, for example, when a pair of facing side surfaces of the side surfaces of the light guide plate 10 are light incident surfaces 10A, the height of each of the projections 11 may be lower at and in proximity to both of the light incident surfaces 10A, and is higher in other regions. The height at and in proximity to the light incident surface 10A of each of the projections 11 may be zero or substantially zero. For example, as illustrated in FIGS. 62A and 62B, the height of each of the projections 11 may be increased from a side closer to the light incident surface 10A with increasing distance from the light incident surface 10A. At this time, the height of each of the projections 11 may be uniform in a midway from the light incident surface 10A to the side surface facing the light incident surface 10A. It is to be noted that a plurality of projections 11 with a nonuniform height as illustrated in FIG. 62A may be disposed in a region other than the top surface of the light guide plate 10, and, for example, the plurality of projections 11 with a nonuniform height may be disposed on the bottom surface of the light guide plate 10 or in the light guide plate 10.

Figure 63A:
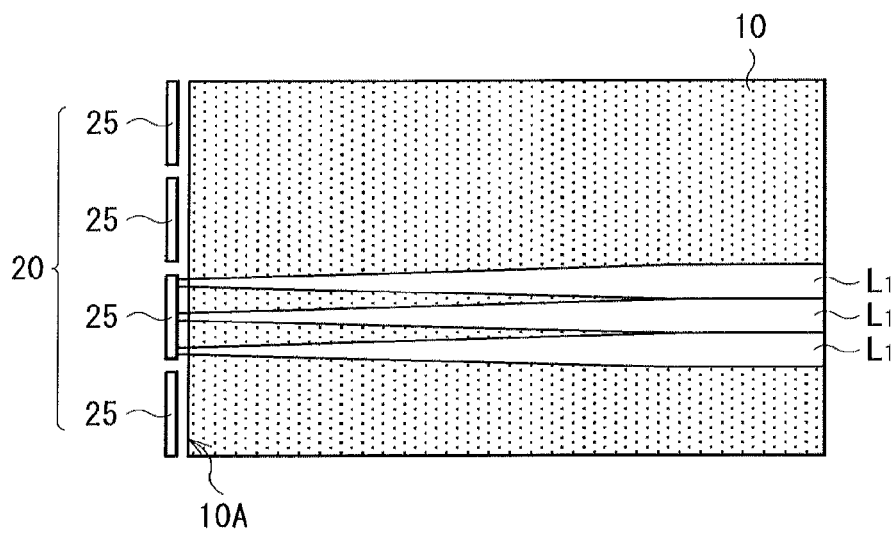
FIGS. 63A and 63B are schematic views illustrating an example of functions of a typical light guide plate and the light guide plate in FIGS. 62A and 62B.
Figure 63B:
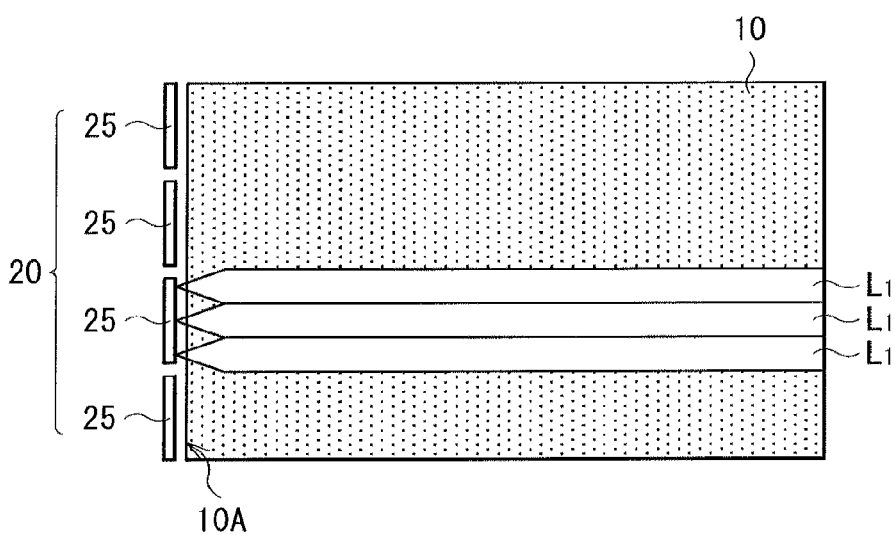

As described above, when the height of each of the projections 11 (in other words, the depth of a groove formed between the projections 11) varies, the rectilinear propagation property of light is allowed to vary. For example, as illustrated in FIGS. 61A and 61B, in the case where the projections 11 are disposed on and in proximity to the light incident surface 10A, for example, as illustrated in FIG. 63A, when one light source block 25 illuminates, light L1 emitted from the light source block 25 propagates through the light guide plate 10 while not spreading too much in a horizontal direction (a width direction). In this case, a dark region may be generated between the point-like light sources 23 in proximity to the light incident surface 10A, and in this case, image quality may be degraded. Therefore, in such a case, for example, as illustrated in FIGS. 62A and 62B, the height of each of the projections 11 is preferably lower or zero at and in proximity to the light incident surface 10A. In doing so, as illustrated in FIG. 63B, the light L1 emitted from the light source block 25 is allowed to be spread in the horizontal direction (the width direction) at a divergent angle of the point-like light source 23 at and in proximity to the light incident surface 10A, thereby enabling to propagate with a substantially uniform width in a region farther from the light incident surface 10A.

[Tenth Modification]

Figure 64A:
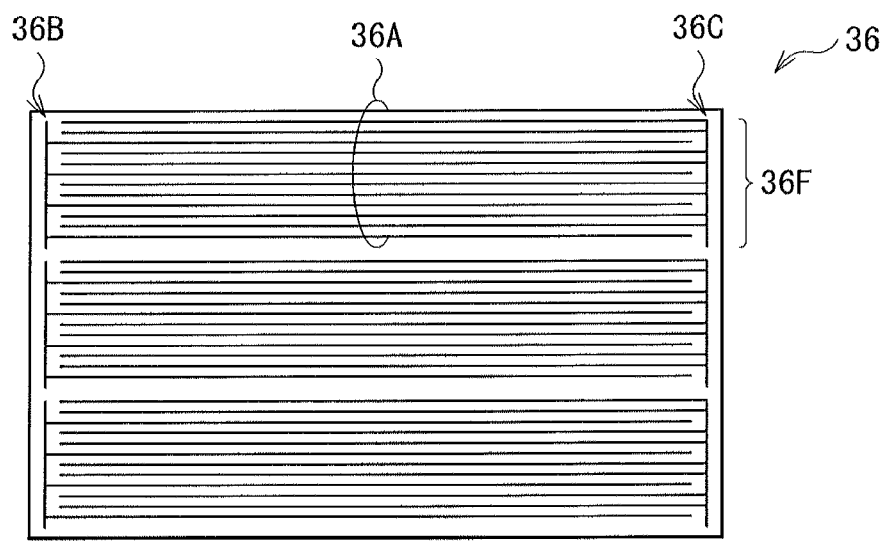
FIGS. 64A and 64B are schematic views illustrating another example of the function of the light guide plate in FIGS. 62A and 62B.
Figure 64B:
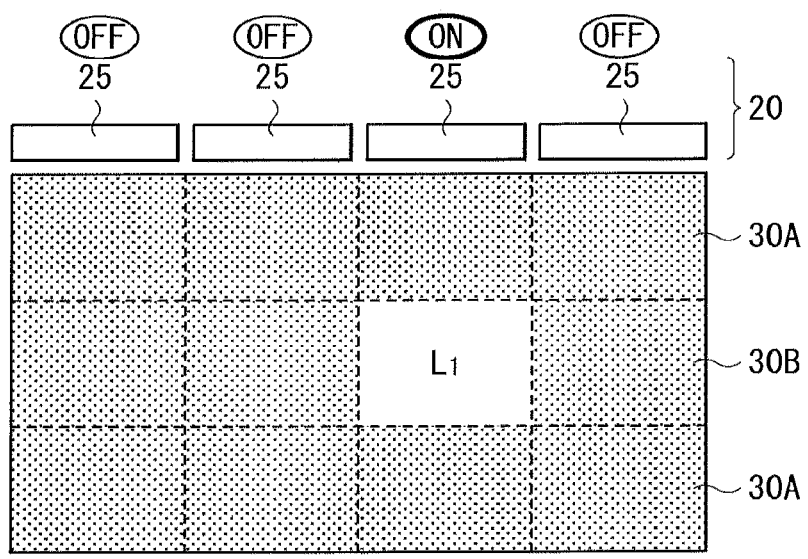

In the above-described embodiments and modifications thereof, for example, as illustrated in FIG. 64A, the upper electrode 36 may include a plurality of sub-electrodes 36F each configured of a plurality of sub-electrodes 36A and wiring lines 36B and 36C. The sub-electrodes 36F may be driven independently of one another or may be driven collectively. For example, in the case where the sub-electrodes 36F are allowed to be driven independently of one another, the light source 20 may be configured of a plurality of light source blocks 25 allowed to be driven independently of one another, and the light guide plate 10 may have a plurality of strip-like projections 11 on the top surface or the bottom surface thereof, or therein. At this time, when the drive circuit 50 selects one sub-electrode 36F and one light source block 25, for example, as illustrated in FIG. 64B, only a region where the selected sub-electrode 36F and an optical path of light emitted from the selected light source block 25 intersect with each other is allowed to selectively illuminate.

[Eleventh Modification]

Figure 65:
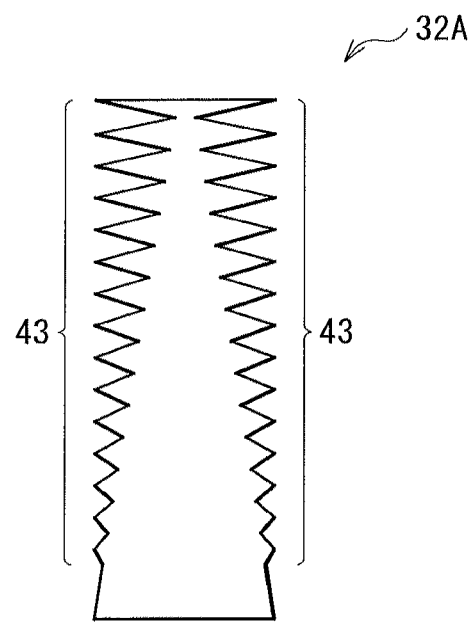
FIG. 65 is a plan view illustrating an example of a configuration of a sub-electrode in the light modulation device in each of the embodiments.
Figure 66:
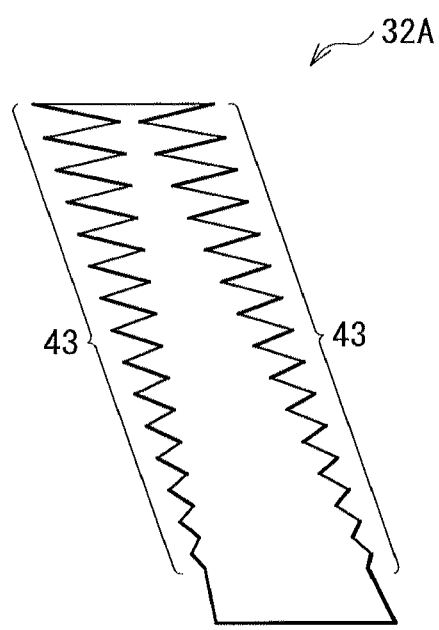
FIG. 66 is a plan view illustrating another example of the configuration of the sub-electrode in the light modulation device in each of the embodiments.

In the above-described respective embodiments and modifications thereof, the width of each sub-electrode 32A varies with the distance from the light source 20; however, an edge of the sub-electrode 32A may have a concavo-convex shape. The concavo-convex amplitude of the concavo-convex shape is larger at a shorter distance from the light source 20, and smaller at a longer distance from the light source 20. For example, as illustrated in FIGS. 65 and 66, the sub-electrode 32A has a concavo-convex section 43 at an edge on a longer side thereof. The concavo-convex amplitude of the concavo-convex section 43 is larger at a shorter distance from the light source 20, and smaller at a longer distance from the light source 20. In the case where the sub-electrode 32A has such a shape, an area of a portion used for one pixel 210a in the display panel 210 of the sub-electrodes 32A is also considered to vary with the distance from the light source 20.

[Twelfth Modification]

Figure 67:
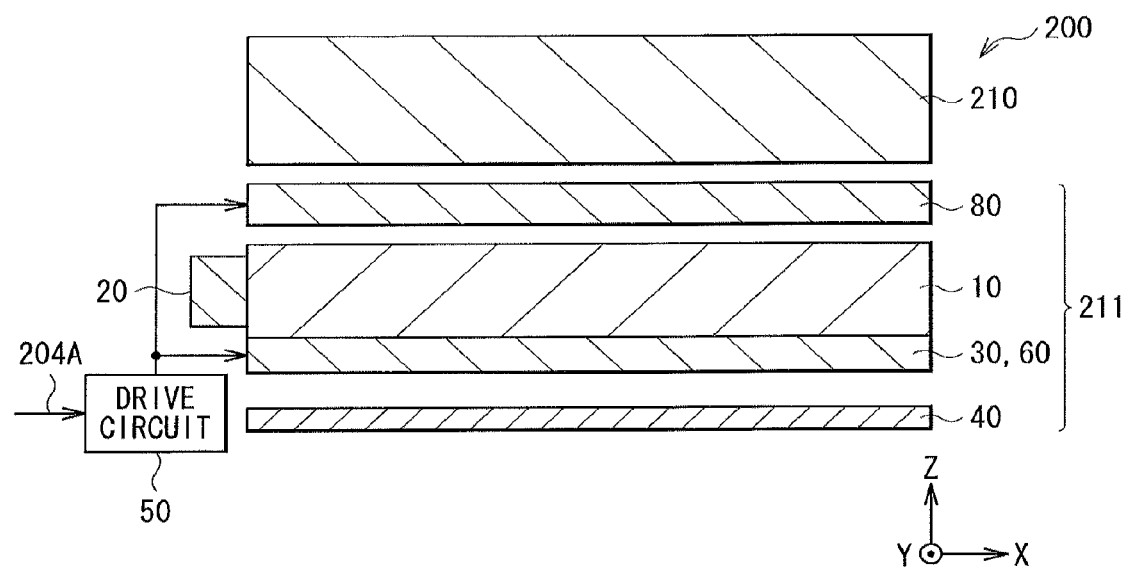
FIG. 67 is a sectional view illustrating an example of a configuration of a display including a parallax barrier in each of the embodiments.

In the above-described respective embodiments and modifications thereof, for example, as illustrated in FIG. 67, a parallax barrier 80 may be disposed on a light emission side of the backlight 211. In the case where three-dimensional display is performed, the parallax barrier 80 limits a light emission region of the backlight 211 to a region facing a plurality of sub-electrodes 32a or a region corresponding thereto, thereby shielding noise light which may be emitted from a region adjacent to the scattering region 30B (for example, an end of the transparent region 30A). Moreover, in the case where two-dimensional display is performed, the parallax barrier 80 expands the light emission region of the backlight 211 to a region facing a region where the lower electrode 32 and the upper electrode 36 face each other, or a region corresponding thereto, thereby allowing light emitted from the light modulation devices 30, and 60 to pass therethrough.

Figure 68:
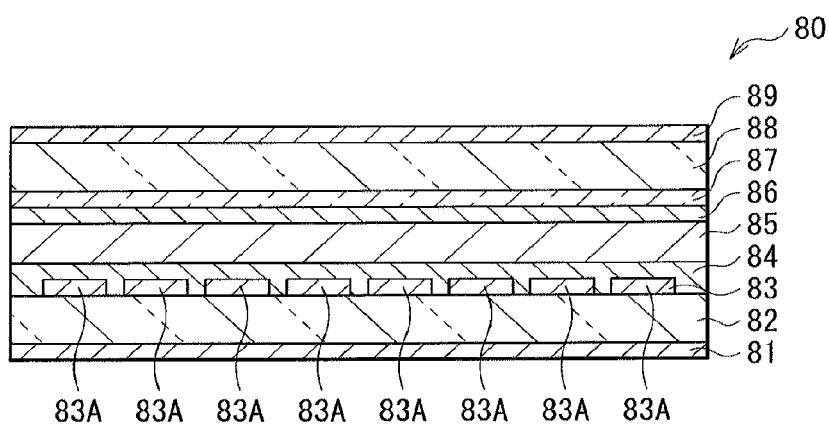
FIG. 68 is a sectional view illustrating an example of a configuration of the parallax barrier in FIG. 67.

For example, as illustrated in FIG. 68, the parallax barrier 80 includes a polarizing plate 81, a transparent substrate 82, a transparent electrode 83, an alignment film 84, a liquid crystal layer 85, an alignment film 86, a transparent electrode 87, a transparent substrate 88, and a polarizing plate 89 in order from the light guide plate 10.

The transparent substrates 82 and 88 are configured of substrates transparent to visible light, for example, plate glass. It is to be noted that, for example, an active drive circuit (not illustrated) including TFTs, wiring, and the like electrically connected to the transparent electrode 83 is formed on the transparent substrate located closer to the light guide plate 10. The transparent electrodes 83 and 87 are made of, for example, ITO. For example, as illustrated in FIG. 68, the transparent electrode 83 is configured of a plurality of sub-electrodes 83A. The plurality of sub-electrodes 83A are formed on the transparent substrate 82.

The plurality of sub-electrodes 83A each have a strip-like shape extending in one direction in a plane as well as in a direction intersecting with or orthogonal (or substantially orthogonal) to the light incident surface 10A. The sub-electrodes 83A are formed in a region facing the sub-electrodes 32a, 32b, and 32c or a region corresponding thereto. When three-dimensional display is performed in the receiver-side unit 200, the sub-electrodes 83A are used to allow strip-like illumination light beams to pass therethrough or to be shielded. Electrodes formed in regions facing the sub-electrode 32a or regions corresponding thereto of the plurality of sub-electrodes 83A are arranged with a pitch P3 corresponding to (equal to or close to) the pixel pitch P2 (refer to FIG. 24) when three-dimensional display is performed in the receiver-side unit 200. Electrodes formed in regions facing the sub-electrodes 32b and 32c or regions corresponding thereto of the plurality of sub-electrodes 83A are not used when three-dimensional display is performed in the receiver-side unit 200. It is to be noted that, when two-dimensional display is performed in the receiver-side unit 200, all of the sub-electrodes 83A are used to generate planar illumination light.

Each of the sub-electrodes 83A has a strip-like shape extending in one direction in a plane as well as in a direction intersecting with or orthogonal (or substantially orthogonal) to the light incident surface 10A. The area (coverage) per unit area of each sub-electrode 83A is uniform irrespective of the distance from the light source 20. More specifically, the width of each sub-electrode 83A is uniform.

Figure 69:
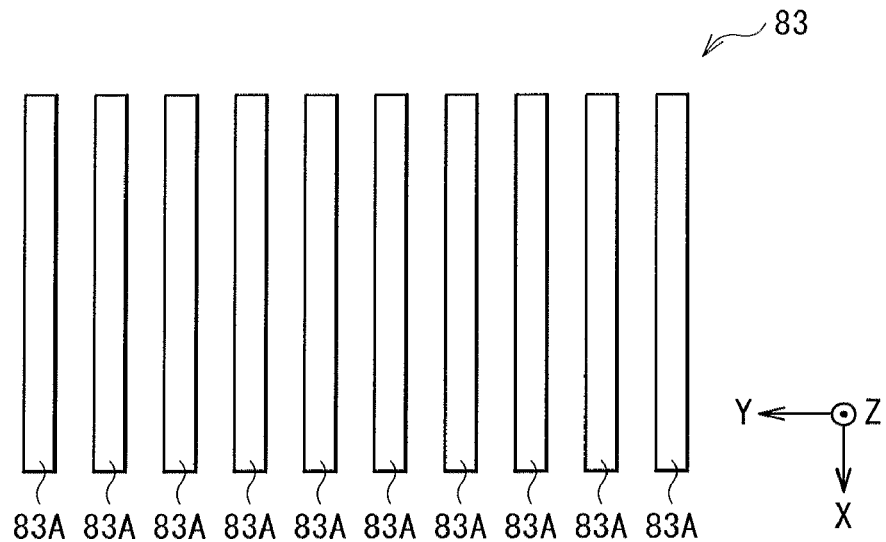
FIG. 69 is a plan view illustrating an example of a configuration of sub-electrodes in the parallax barrier in FIG. 68.
Figure 70:
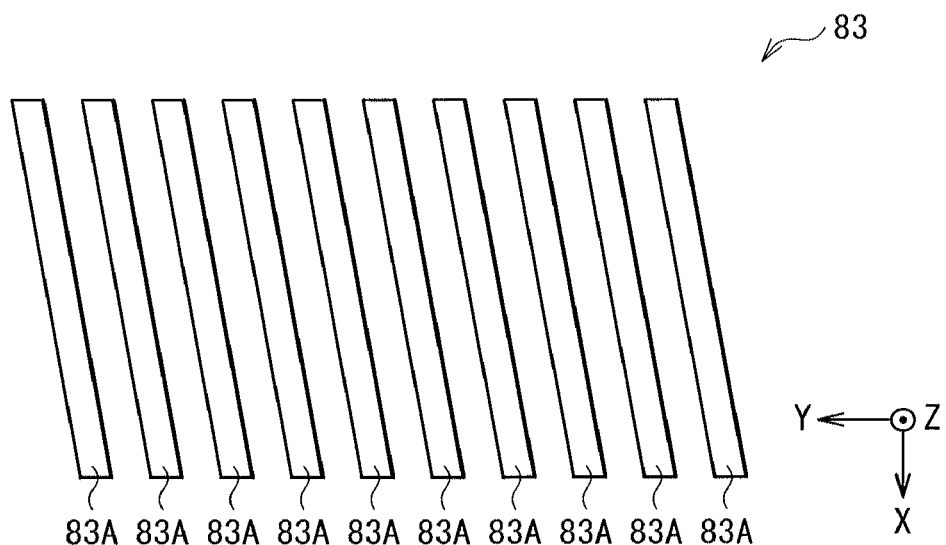
FIG. 70 is a plan view illustrating a first modification of the configuration of the sub-electrodes in FIG. 69.

For example, as illustrated in FIG. 69, the sub-electrodes 83A are formed separately from one another, and are allowed to be driven independently of one another. In the case where the sub-electrodes 32A are in states illustrated in FIGS. 4, 5, 6, and 7, for example, as illustrated in FIG. 69, the sub-electrodes 83A extend in a direction parallel or substantially parallel to the normal to the light incident surface 10A. Moreover, in the case where the sub-electrodes 32A are in states illustrated in FIGS. 4, 8, 9, and 10, for example, as illustrated in FIG. 70, the sub-electrodes 83A extend in a direction diagonally intersecting with the normal to the light incident surface 10A.

Figure 71:
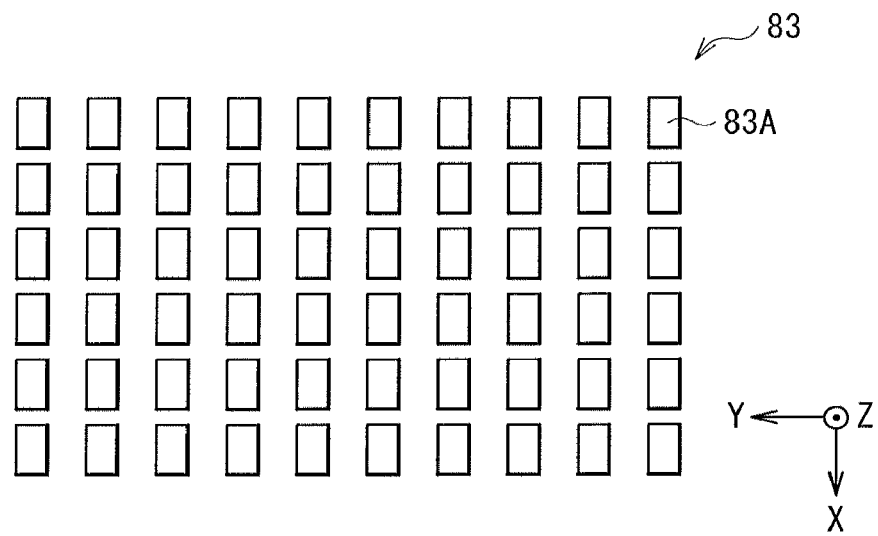
FIG. 71 is a plan view illustrating a second modification of the configuration of the sub-electrodes in FIG. 69.
Figure 72:
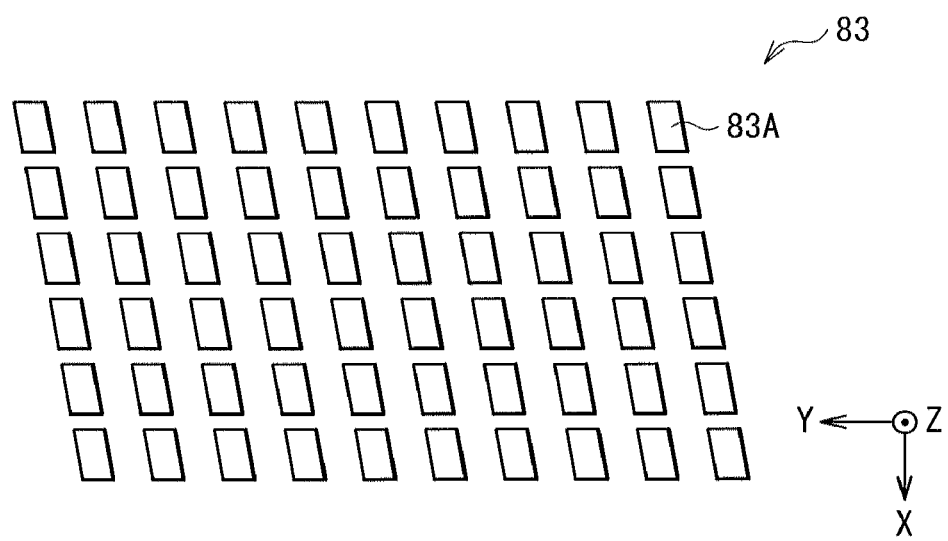
FIG. 72 is a plan view illustrating a third modification of the configuration of the sub-electrodes in FIG. 69.

Further, in the case where the sub-electrodes 32A are in a state illustrated in FIG. 11, for example, as illustrated in FIG. 71, the sub-electrodes 83A each have a block shape, and a plurality of sub-electrodes 83A are two-dimensionally arranged in a direction parallel or substantially parallel to the normal to the light incident surface 10A as well as in a direction orthogonal or substantially orthogonal to the normal to the light incident surface 10A. Moreover, in the case where the sub-electrodes 32A are in states illustrated in FIGS. 12 and 13, for example, as illustrated in FIG. 72, the sub-electrodes 83A each have a block shape, and are two-dimensionally arranged in a direction diagonally intersecting with the normal to the light incident surface 10A as well as in a direction orthogonal or substantially orthogonal to the normal to the light incident surface 10A.

Figure 73:
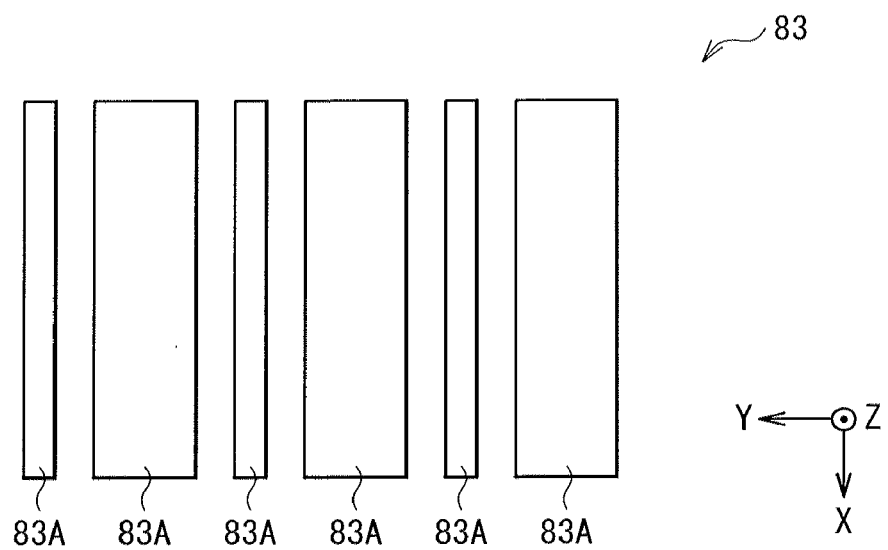
FIG. 73 is a plan view illustrating a fourth modification of the configuration of the sub-electrodes in FIG. 69.
Figure 74:
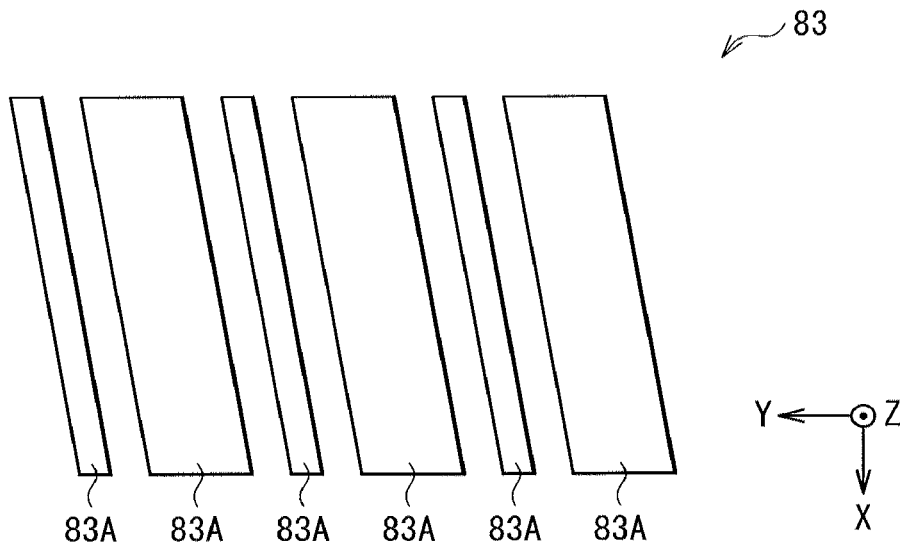
FIG. 74 is a plan view illustrating a fifth modification of the configuration of the sub-electrodes in FIG. 69.

Further, in the case where multi-perspective display is not performed, for example, as illustrated in FIGS. 73 and 74, a sub-electrode 83A corresponding to the sub-electrode 32b and a sub-electrode 83A corresponding to the sub-electrode 32c may be combined into one electrode.

The transparent electrode 87 is formed on an entire surface of the transparent substrate 88, and functions as a common electrode facing the respective sub-electrodes 83A. The alignment films 84 and 86 are made of a polymer material such as polyimide, and perform an alignment process on a liquid crystal. The liquid crystal layer 85 is made of, for example, a VA mode, TN mode, or STN mode liquid crystal, and has a function of changing the direction of a polarizing axis of light from the light guide plate 10 in each of regions facing the sub-electrodes 83A by a voltage applied from the drive circuit 50. The polarization plates 81 and 89 are optical shutters of one kind, and allow only light (polarized light) in a certain vibration direction to pass therethrough. It is to be noted that the polarization plates 81 and 89 may be absorption polarizers absorbing light (polarized light) in a vibration direction other than a transmission axis, or reflective polarizers reflecting light toward the light guide plate 10. The polarization plates 81 and 89 are disposed to allow their polarizing axes to be different by 90° from each other, or to be parallel to each other, thereby allowing light from the light guide plate 10 to pass therethrough via the liquid crystal layer 85, or to be shielded.

When the drive circuit 50 receives the signal specifying three-dimensional display as the control signal 204A, the drive circuit 50 allows the parallax barrier 80 to function as a slit-like transmission section. More specifically, the drive circuit 50 applies, to electrodes formed in regions facing the sub-electrodes 32a or regions corresponding thereto of the plurality of specific sub-electrodes 83A, a voltage allowing the parallax barrier 80 to exhibit transparency, as well as applies, to electrodes formed in regions facing the sub-electrodes 32b and 32c or regions corresponding thereto of the plurality of sub-electrodes 83A, a voltage allowing the parallax barrier 80 to exhibit a light-shielding effect.

Moreover, when the drive circuit 50 receives the signal specifying two-dimensional display as the control signal 204A, the drive circuit 50 allows the entire parallax barrier 80 to function as a light transmission section. More specifically, the drive circuit 50 applies, to all of the sub-electrodes 83A, a voltage allowing the parallax barrier 80 to exhibit transparency.

In this modification, the parallax barrier 80 is disposed on the light emission side of the backlight 211; therefore, when a plurality of strip-like illumination light beams are emitted from the light modulation devices 30 and 60, noise light which may be emitted from a region adjacent to the scattering region 30B is allowed to be shielded. Therefore, in three-dimensional display, light incident at an angle different from the incident angles of respective strip-like illumination light beams to the pixels 210-1, 210-2, 210-3, and 210-4 (refer to FIG. 24) is allowed to be reduced. As a result, a clear three-dimensional image is allowed to be obtained.

[Thirteenth Modification]

Figure 75:
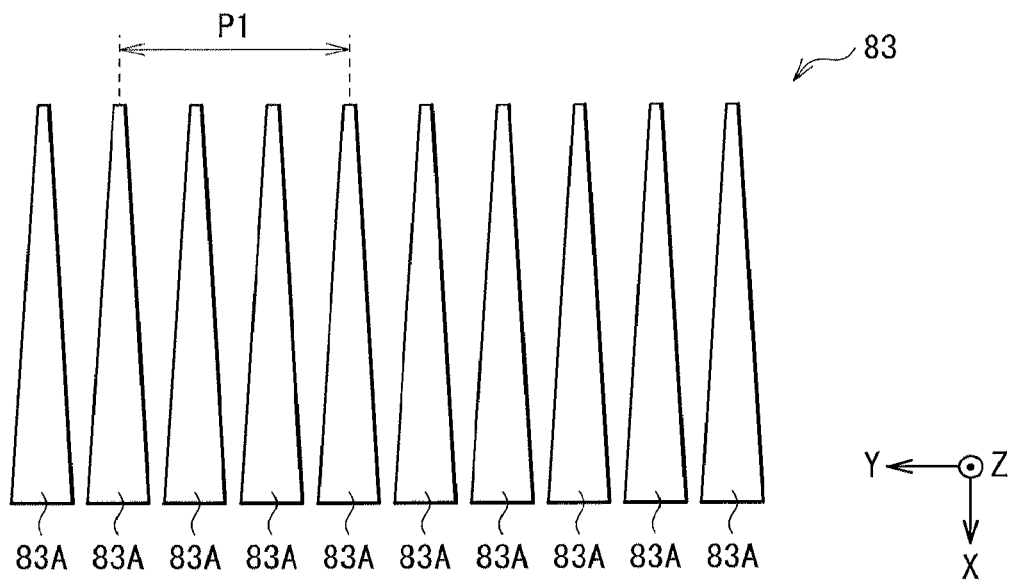
FIG. 75 is a plan view illustrating a sixth modification of the configuration of the sub-electrodes in FIG. 69.

In the twelfth modification, for example, as illustrated in FIG. 75, the sub-electrodes 83A each may have a strip-like shape extending in one direction in a plane as well as in a direction intersecting with or orthogonal (or substantially orthogonal) to the light incident surface 10A. An area of a portion used for one pixel 210a in the display panel 210 of each of the sub-electrodes 83A varies with the distance from the light source 20. More specifically, the width of each of the sub-electrodes 83A varies with the distance from the light source 20, and is smaller at a shorter distance from the light source 20 and larger at a longer distance from the light source 20. For example, as illustrated in FIG. 75, the width of each of the sub-electrodes 83A is increased in proportion to the distance from the light source 20. It is to be noted that the widths of the respective sub-electrodes 83A may be uniform at ends thereof located farthest from or closest to the light source 20.

For example, as illustrated in FIG. 75, the sub-electrodes 83A may be formed separately from one another, and may be driven independently of one another; however, the sub-electrodes 83A may be electrically connected to one another. For example, all of the sub-electrodes 83A used for three-dimensional display may be electrically connected to one another. Moreover, all of the sub-electrodes 83A used only for two-dimensional display may be electrically connected to one another. It is to be noted that, in the case where multi-perspective display is performed in two-dimensional display, the sub-electrodes 83A for one perspective are preferably electrically separated from the sub-electrodes 83A for other perspectives. For example, in the case where two-perspective display is performed, the sub-electrodes 83A used for one perspective may be electrically connected to one another, and sub-electrodes 83A used for the other perspective may be electrically connected to one another.

Figure 76:
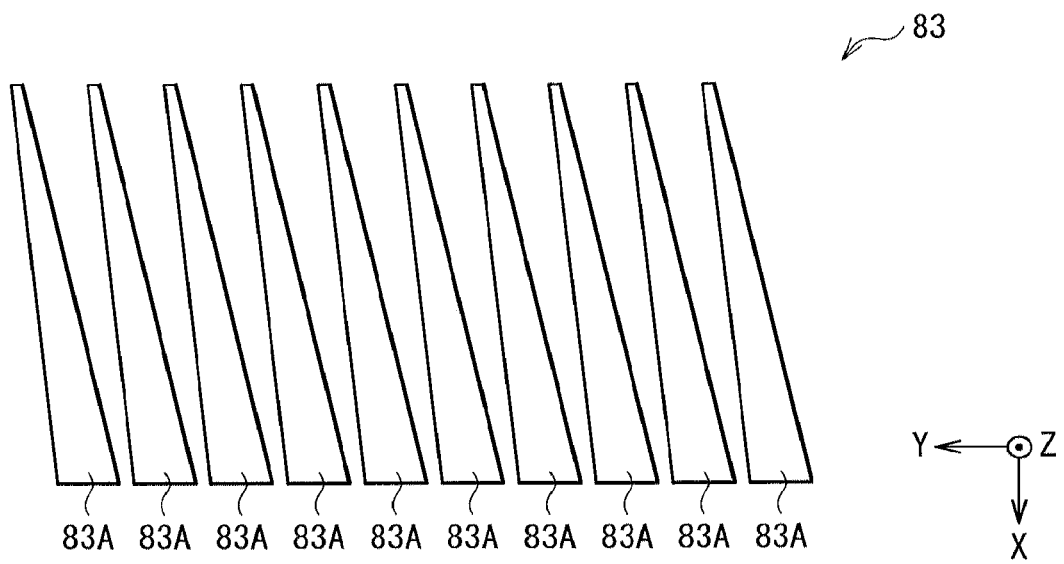
FIG. 76 is a plan view illustrating a seventh modification of the configuration of the sub-electrodes in FIG. 69.

For example, as illustrated in FIG. 76, the sub-electrodes 83A may extend in a direction diagonally intersecting with the normal to the light incident surface 10A (or an optical axis of the light source 20). In such a case, the extending direction of the sub-electrodes 83A is displaced from a pixel arrangement direction of the display panel 210; therefore, occurrence of moiré caused by an arrangement relationship between the sub-electrodes 83A and pixels is allowed to be reduced.

Figure 77:
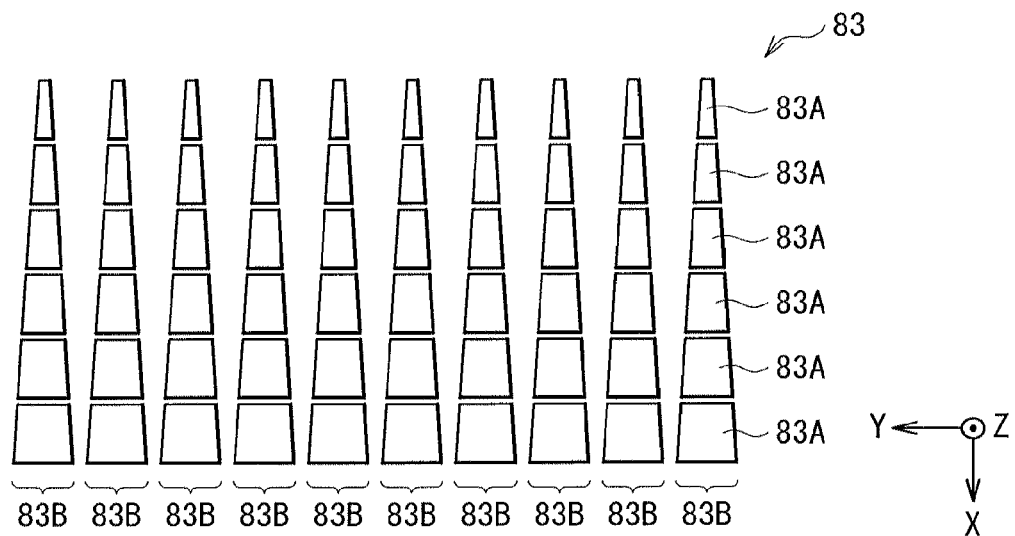
FIG. 77 is a plan view illustrating an eighth modification of the configuration of the sub-electrodes in FIG. 69.
Figure 78:
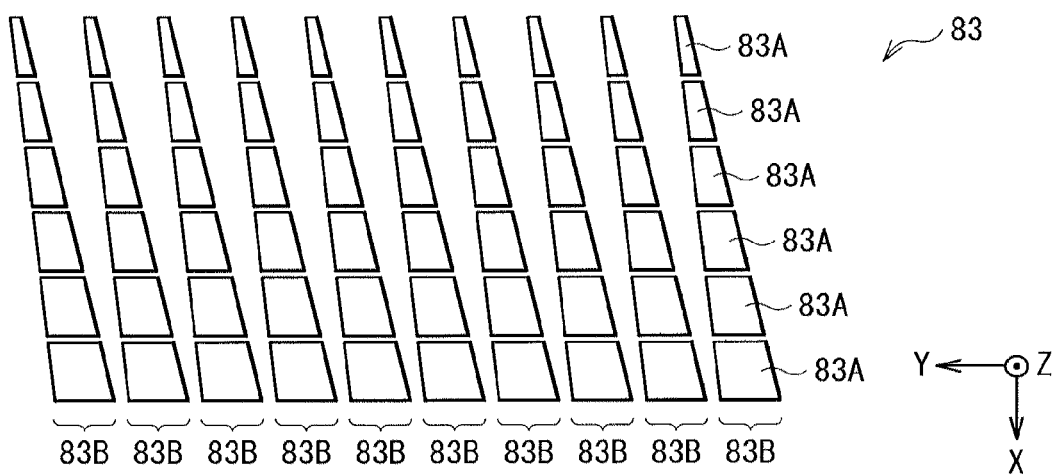
FIG. 78 is a plan view illustrating a ninth modification of the configuration of the sub-electrodes in FIG. 69.

Moreover, for example, as illustrated in FIGS. 77 and 78, the sub-electrodes 83A each may have a block shape, and a plurality of sub-electrodes 83A may be two-dimensionally arranged. In this case, when two or more of the plurality of sub-electrodes 83A are considered as one linear electrode 83B, an area of a portion used for one pixel 210a in the display panel 210 of each linear electrode 83B varies with the distance from the light source 20. More specifically, the width of each linear electrode 83B varies with the distance from the light source 20, and is smaller at a shorter distance from the light source 20, and larger at a longer distance from the light source 20. For example, as illustrated in FIGS. 77 and 78, the width of each linear electrode 83B is increased in proportion to the distance from the light source 20. It is to be noted that the widths of the linear electrodes 83B may be uniform at ends thereof located farthest from or closest to the light source 20.

[Fourteenth Modification]

Figure 79:
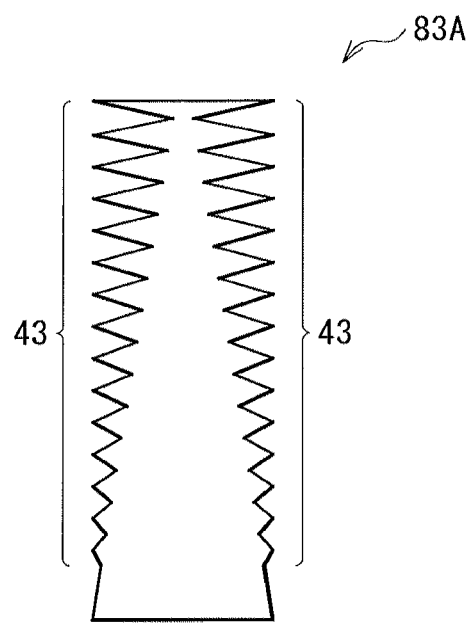
FIG. 79 is a plan view illustrating a tenth modification of the configuration of the sub-electrodes in FIG. 69.
Figure 80:
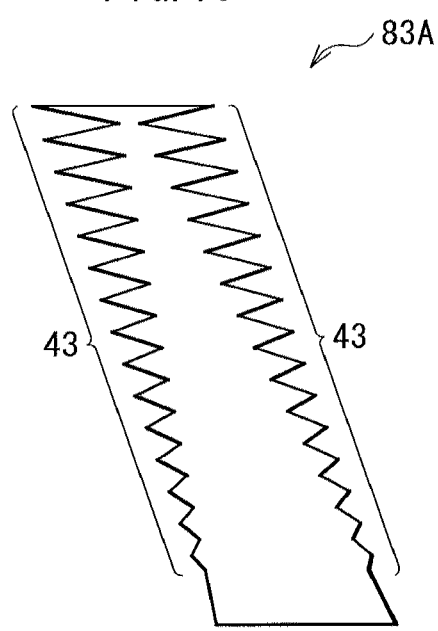
FIG. 80 is a plan view illustrating an eleventh modification of the configuration of the sub-electrodes in FIG. 69.
Figure 81:
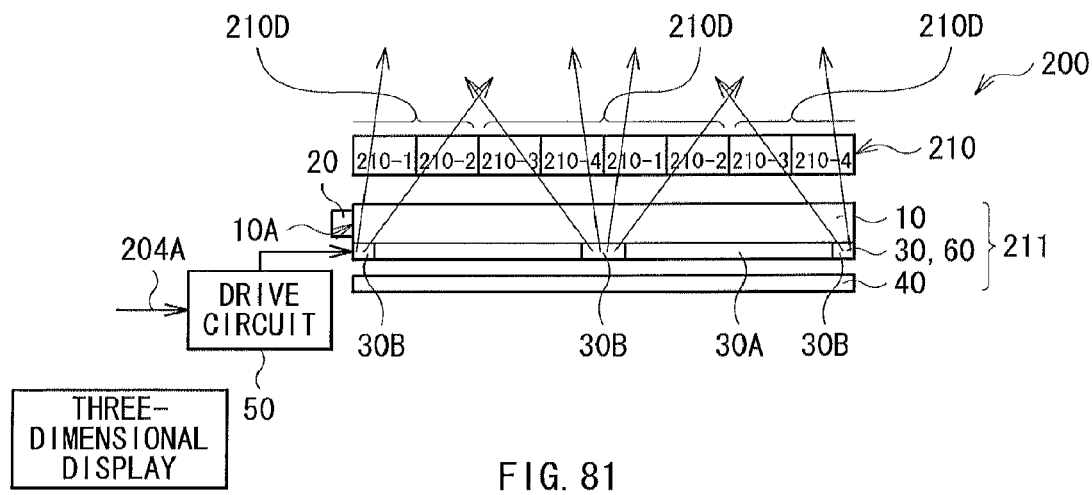
FIG. 81 is a schematic view illustrating an example of time-divisional drive in three-dimensional display.
Figure 82:
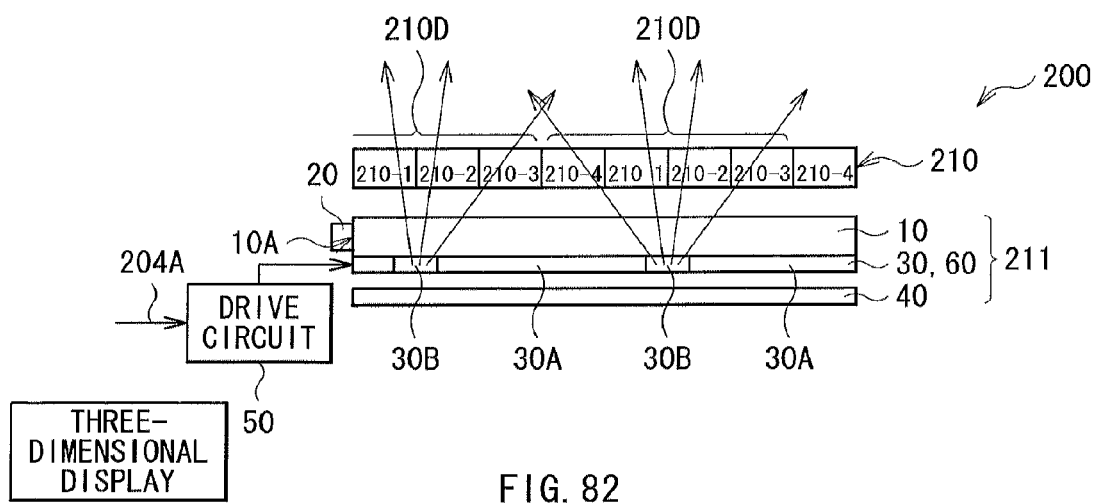
FIG. 82 is a schematic view illustrating an example of time-divisional drive following FIG. 81.
Figure 83:
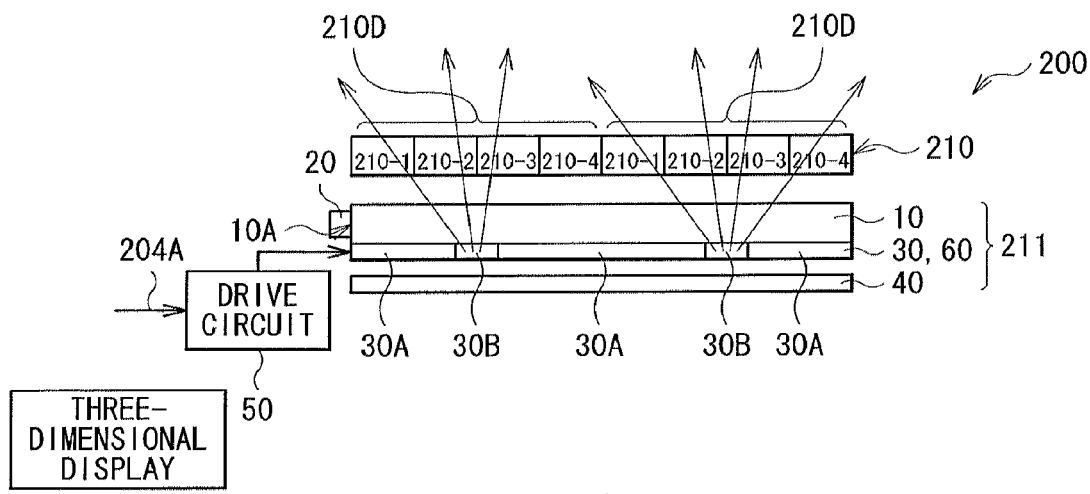
FIG. 83 is a schematic view illustrating an example of time-divisional drive following FIG. 82.
Figure 84:
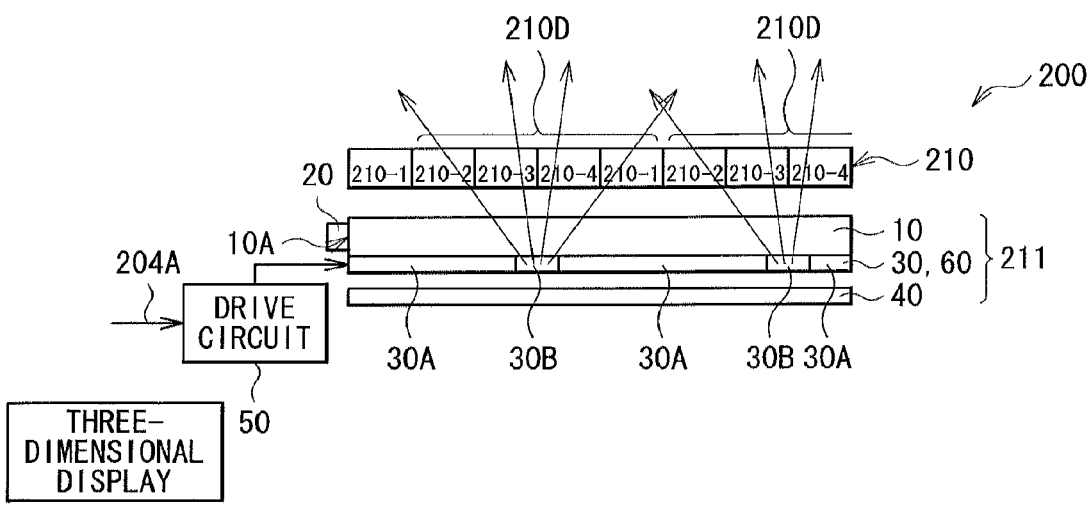
FIG. 84 is a schematic view illustrating an example of time-divisional drive following FIG. 83.

In the thirteenth modification, the width of each sub-electrode 83A varies with the distance from the light source 20; however, an edge of the sub-electrode 83A may have a concavo-convex shape. The concavo-convex amplitude of the concavo-convex shape is larger at a shorter distance from the light source 20, and smaller at a longer distance from the light source 20. For example, as illustrated in FIGS. 79 and 80, the sub-electrode 83A has a concavo-convex section 43 at an edge on a longer side thereof. The concavo-convex amplitude of the concavo-convex section 43 is larger at a shorter distance from the light source 20, and smaller at a longer distance from the light source 20. In the case where the sub-electrode 83A has such a shape, in each of the sub-electrodes 83A, an area of a portion used for one pixel 210a in the display panel 210 is also considered to vary with the distance from the light source 20.

[Fifteenth Modification]

In the above-described respective embodiments and modifications thereof, a drive circuit (not illustrated) driving the display panel 210 may time-divisionally drive the display panel 210. In this case, the drive circuit 50 switches emission points for strip-like illumination light beams from the backlight 211 in synchronization with sequential display switching in the display panel 210 from one pixel row to another in an equal number of pixel rows to the number of parallaxes. For example, as illustrated in FIGS. 81, 82, 83, and 84 in order, the drive circuit 50 switches the emission points for strip-like illumination light beams from the backlight 211 in synchronization with sequential display switching in the display panel 210 from one pixel row to another in four pixel rows within one frame period (1/60 seconds). At this time, the drive circuit (not illustrated) driving the display panel 210 applies a voltage corresponding to an image signal to each pixel to perform sequential display switching in the display panel 210 from one pixel row to another in an equal number of pixel rows to the number of parallaxes within one frame period (1/60 seconds). When such switching is performed at high speed, a viewer perceives a number of pixels which is four times as large as the number of pixels illuminating at a moment, thereby allowing substantial resolution to be enhanced.

[Sixteenth Modification]

In the above-described respective embodiments and modifications thereof, one or both of the transparent substrate 31 and the transparent substrate 37 may be integrally formed with the light guide plate 10. For example, in the above-described embodiments and modifications thereof, in the case where the transparent substrate 37 is in contact with the light guide plate 10, the transparent substrate 37 may be integrally formed with the light guide plate 10. At this time, the transparent substrate 37 corresponds to a specific example of "first transparent substrate" or "second transparent substrate" in the application. Moreover, for example, in the above-described respective embodiments and modifications thereof, in the case where the transparent substrate 31 is in contact with the light guide plate 10, the transparent substrate 31 may be integrally formed with the light guide plate 10. At this time, the transparent substrate 31 corresponds to a specific example of "first transparent substrate" or "second transparent substrate" in the application. Further, for example, in the above-described respective embodiments and modifications thereof, in the case where the transparent substrates 31 and 37 are in contact with the light guide plate 10, the transparent substrates 31 and 37 may be integrally formed with the light guide plate 10. At this time, the transparent substrate 31 or the transparent substrate 37 corresponds to a specific example of "first transparent substrate" or "second transparent substrate" in the application.

[Seventeenth Modification]

Figure 85:
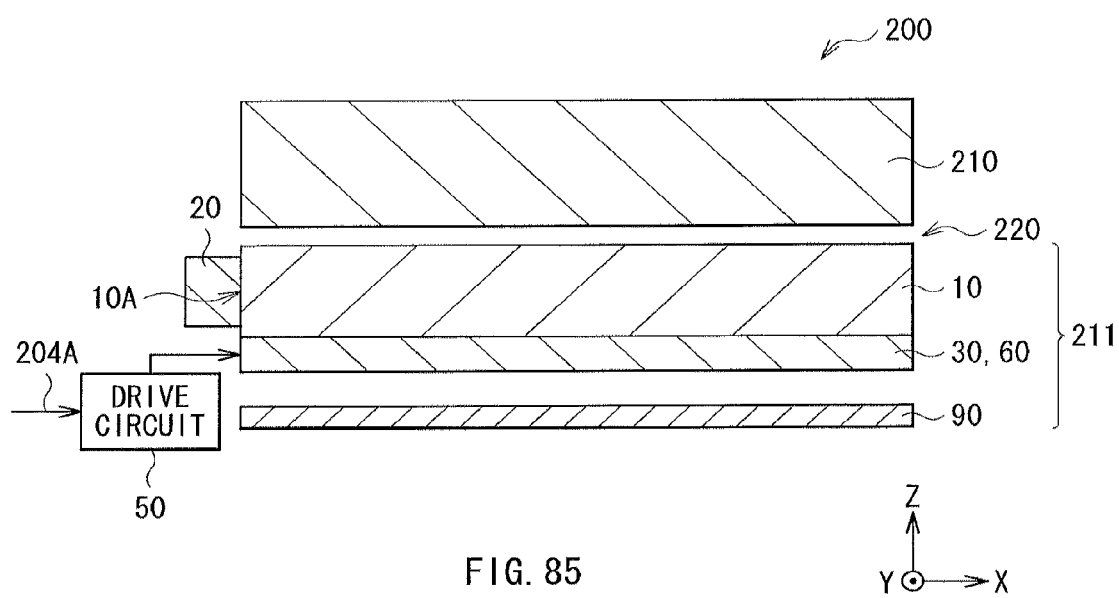
FIG. 85 is a sectional view illustrating a sixth modification of the configuration of the display section in the receiver-side unit in each of the embodiments.

In the above-described respective embodiments and modifications thereof, a light-reflection suppression layer may be included instead of the reflective plate 40. The light-reflection suppression layer may be a layer formed by coating a low-reflectivity material or a material absorbing light on a surface of a base. For example, as illustrated in FIG. 85, instead of the reflective plate 40, a light-reflection suppression layer 90 may be included. The light-reflection suppression layer 90 is configured of, for example, a layer formed by coating a low-reflectivity material on a surface of a base, or a layer formed by coating a material absorbing light on the surface of the base. Thus, when the light-reflection suppression layer 90 is included, a rate at which light reflected by the reflective plate 40 in the case where the reflective plate 40 is included passes through the transparent region 30A to enter the display panel 210 is allowed to be reduced. As a result, contrast is allowed to be improved.

[Eighteenth Modification]

Figure 88:
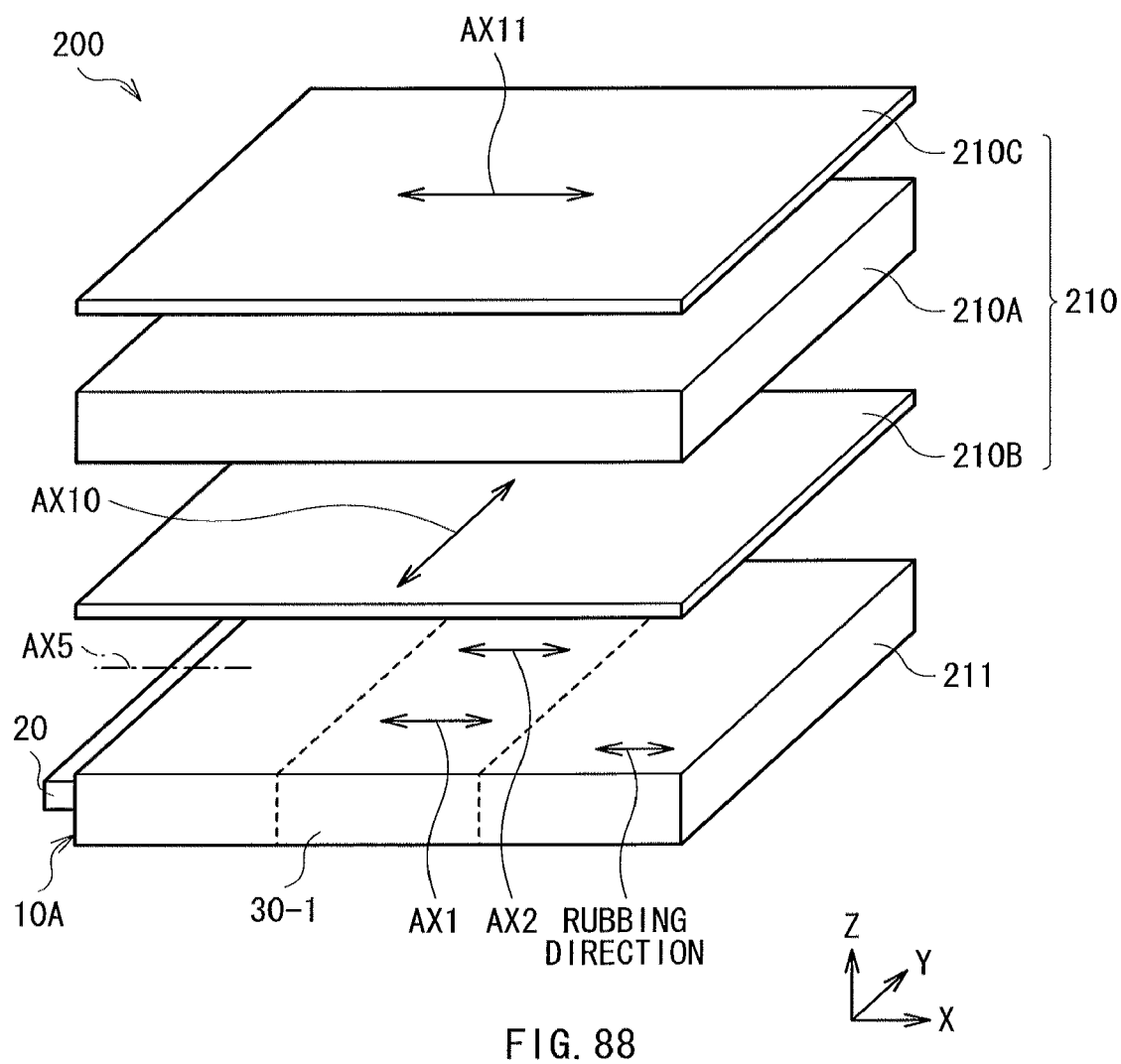
FIG. 88 is a diagram illustrating an example of a relationship between optical axes of polarizing plates of the display panel and the optical axes of the light modulation layer in FIG. 39.

In the first embodiment, under no potential difference application, the optical axis AX1 of the bulk 34A and the optical axis AX2 of the microparticle 34B each mainly have an optical-axis component in the same direction, and, for example, as illustrated in FIGS. 86 and 88, the optical axes AX1 and AX2 are preferably oriented in the rubbing direction of the alignment films 33 and 35. Moreover, for example, as illustrated in FIGS. 86 and 88, under no potential difference application, the optical axes AX1 and AX2 preferably mainly have an optical-axis component in a direction parallel to a transmission axis AX10 of the polarizing plate 210B located closer to the backlight 211. For example, as illustrated in FIG. 86, the transmission axis AX10 is preferably oriented in the rubbing direction of the alignment films 33 and 35.

For example, as illustrated in FIG. 86, under no potential difference application, the optical axes AX1 and AX2 are preferably oriented in a direction intersecting with or orthogonal (or substantially orthogonal) to a normal AX5 to the light incident surface 10A. Moreover, for example, as illustrated in FIGS. 4 and 86, under no potential difference application, the optical axes AX1 and AX2 are preferably parallel or substantially parallel to the transparent substrate 31. In other words, under no potential difference application, the optical axes AX1 and AX2 are preferably oriented substantially in a Y-axis direction in FIG. 86, because of reasons described in [Anisotropic Scattering] in the above-described embodiment.

Figure 87:
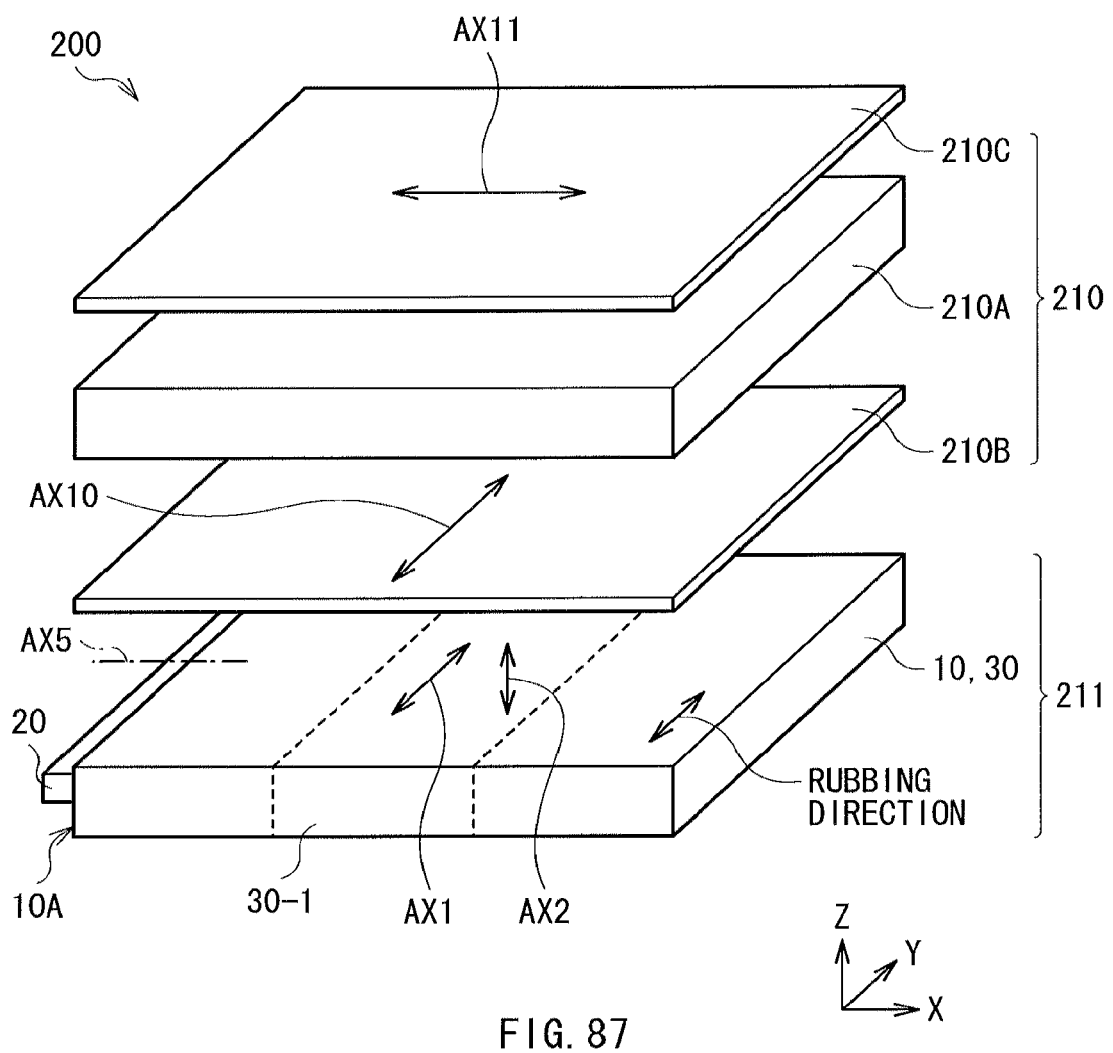
FIG. 87 is a diagram illustrating another example of the relationship between the optical axes of the polarizing plates of the display panel and the optical axes of the light modulation layer in FIG. 3.

Moreover, as described above, under potential difference application, the optical axis AX1 is preferably oriented in the same direction or substantially the same direction as that under no potential difference application. Under potential difference application, the optical axis AX1 mainly has an optical-axis component in a direction parallel to the transmission axis AX10 of the polarizing plate 210B, and, for example, as illustrated in FIG. 87, the optical axis AX1 is preferably oriented in a direction parallel to the transmission axis AX10. Under potential difference application, the optical axis AX1 is oriented in a direction intersecting with or orthogonal (or substantially orthogonal) to the optical axis AX5 of the light source 20, and is preferably parallel or substantially parallel to the transparent substrate 31.

On the other hand, under potential difference application, the optical axis AX2 is preferably displaced in a predetermined direction by an influence of an electric field generated by a potential difference applied to the lower electrode 32 and the upper electrode 36. For example, as illustrated in FIGS. 4 and 87, under potential difference application, the optical axis AX2 preferably intersects with or is preferably orthogonal (or substantially orthogonal) to the transparent substrate 31. In other words, the optical axis AX2 is preferably displaced in a direction where an angle between the optical axis AX2 and the normal to the transparent substrate 31 is reduced by potential difference application to the lower electrode 32 and the upper electrode 36. At this time, the optical axis AX2 intersects with or is orthogonal (or substantially orthogonal) to the optical axis AX1, and preferably intersects with or is preferably orthogonal (or substantially orthogonal) to the transparent substrate 31.

Further, for example, as illustrated in FIG. 88, under no potential difference application, the optical axes AX1 and AX2 may be parallel or substantially parallel to the optical axis AX5 of the light source 20. For example, as illustrated in FIGS. 40 and 88, under no potential difference application, the optical axes AX1 and AX2 may be parallel or substantially parallel to the transparent substrate 31. In other words, under no potential difference application, the optical axes AX1 and AX2 may be oriented substantially in an X-axis direction in FIG. 88.

Moreover, under potential difference application, the optical axis AX1 may be oriented in the same or substantially the same direction as that under no potential difference application. Under potential difference application, the optical axis AX1 mainly has an optical-axis component in a direction parallel to the transmission axis AX10 of the polarizing plate 210B, and, for example, as illustrated in FIG. 88, the optical axis AX1 may be oriented in a direction parallel to the transmission axis AX10. Under potential difference application, the optical axis AX1 is parallel or substantially parallel to, for example, the optical axis AX5 of the light source 20, and may be parallel or substantially parallel to the transparent substrate 31.

Figure 89:
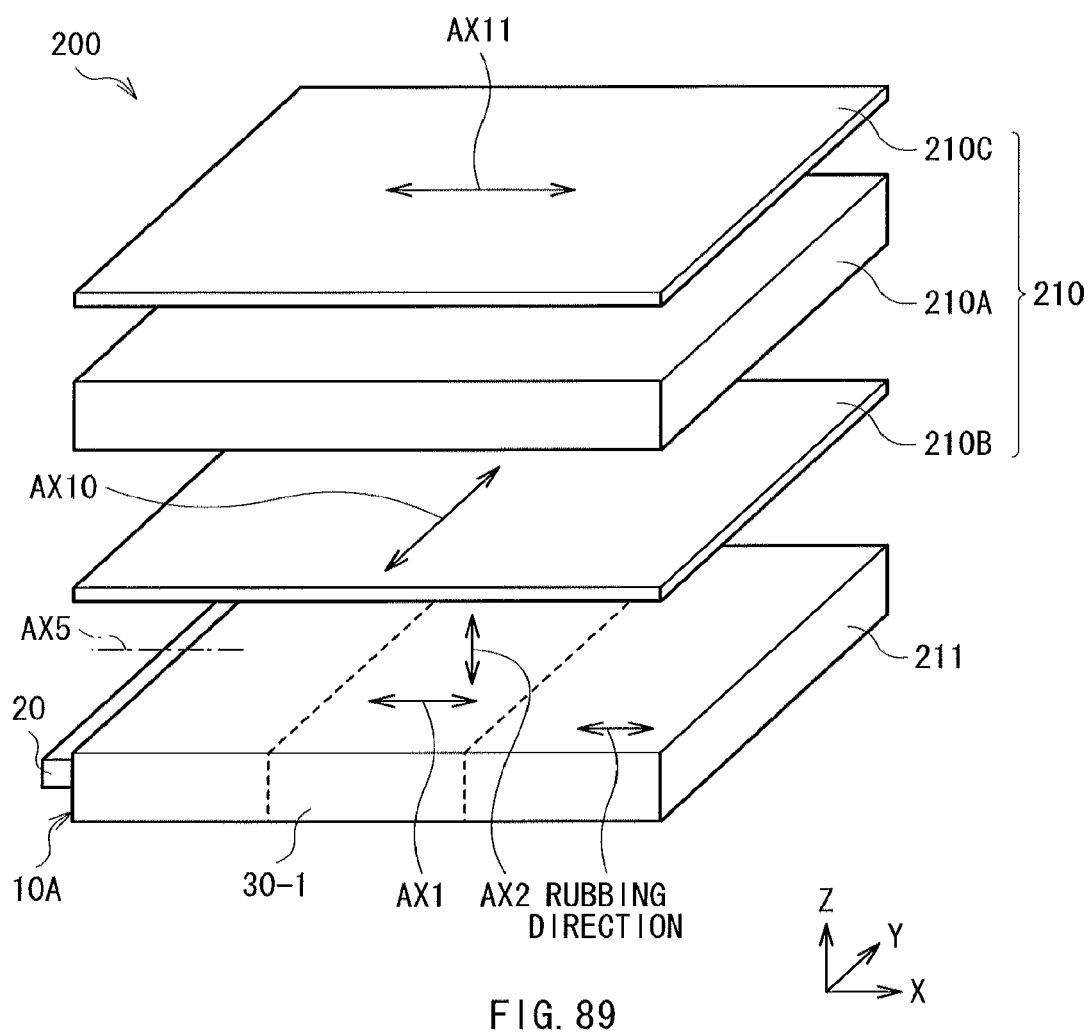
FIG. 89 is a diagram illustrating another example of the relationship between the optical axes of the polarizing plates of the display panel and the optical axes of the light modulation layer in FIG. 39.

On the other hand, under potential difference application, the optical axis AX2 may be displaced in a predetermined direction by an influence of an electric field generated by the potential difference applied to the lower electrode 32 and the upper electrode 36. For example, as illustrated in FIGS. 40 and 89, under potential difference application, the optical axis AX2 may be orthogonal or substantially orthogonal to (or intersect with) the transparent substrate 31. In other words, the optical axis AX2 may be displaced in a direction where an angle between the optical axis AX2 and the normal to the transparent substrate 31 is reduced by voltage application to the lower electrode 32 and the upper electrode 36. At this time, the optical axis AX2 is orthogonal or substantially orthogonal to (or intersects with) the optical axis AX1, and may be orthogonal or substantially orthogonal to (intersect with) the transparent substrate 31.

[Nineteenth Modification]

In the above-described respective embodiments and modifications thereof, in the case where the upper electrode 36 is configured of one solid film (a planar electrode) formed on an entire surface, patterning may be included in the planar electrode. For example, as illustrated in FIGS. 90 and 91, the upper electrode 36 may have a plurality of holes H. The holes H may have any one of various shapes including a circular shape, an ellipse shape, a square shape, and a polygonal shape.

In this case, the radii of the holes H may vary with the distance from the light source 20. In the case where uniformization of in-plane luminance of the illumination unit 1 is considered, radii of the holes H arranged in a direction orthogonal to the light incident surface 10A are preferably larger at a shorter distance from the light source 20 and smaller at a larger distance from the light source 20. For example, as illustrated in FIGS. 90 and 91, radii r of the holes H arranged in the direction orthogonal to the light incident surface 10A are ra at a shorter distance from the light source 20 and rb (<ra) at a longer distance from the light source 20. Moreover, in the case where the light source 20 is configured of a plurality of light source blocks 25, when a distance between two adjacent light source blocks 25 is longer than a distance between two adjacent sub-electrodes 32A, radii of the holes H arranged in a direction parallel to the light incident surface 10A are preferably larger at a shorter distance from the light source 20 and smaller at a longer distance from the light source 20. For example, as illustrated in FIG. 91, the radii r of the holes H arranged in the direction parallel to the light incident surface 10A is r1 at a shorter distance from the light source 20 and r2 (<r1) at a longer distance from the light source 20, and r3 (<r2) at a longest distance from the light source 20.

In the case where moiré is considered, a pitch of the hole H is preferably equal to a half-integral fraction of a maximum width of the sub-electrode 32A in the direction parallel to the light incident surface 10A. Moreover, the radii r of the holes H are preferably smaller than the maximum width of the sub-electrode 32A. For example, the radii r of the holes H are preferably equal to approximately one quarter of the maximum width of the sub-electrode 32A. Moreover, the arrangement direction of the holes H is not specifically limited; however, for example, the arrangement direction of the holes H may be equal to a direction parallel to the normal to the light incident surface 10A or a direction parallel to the extending direction of the sub-electrodes 32A. It is to be noted that the holes H may be randomly (irregularly) arranged.

(4. Examples)

Next, an example of the backlight 211 according to the above-described respective embodiments and modifications thereof will be described below.

Figure 92:
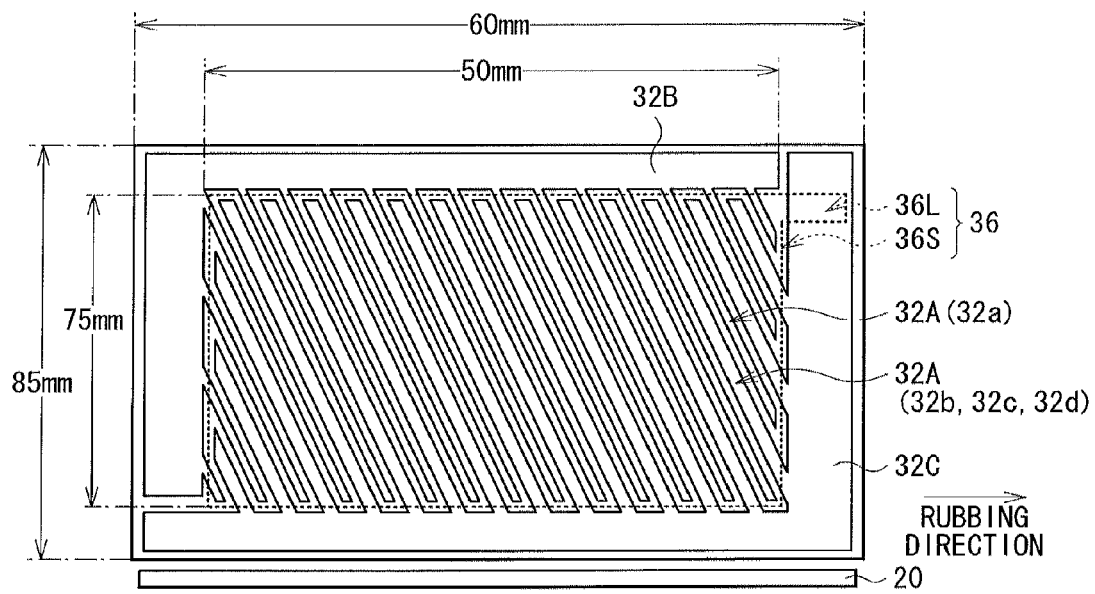
FIG. 92 is a diagram illustrating an electrode layout according to an example.
Figure 93:
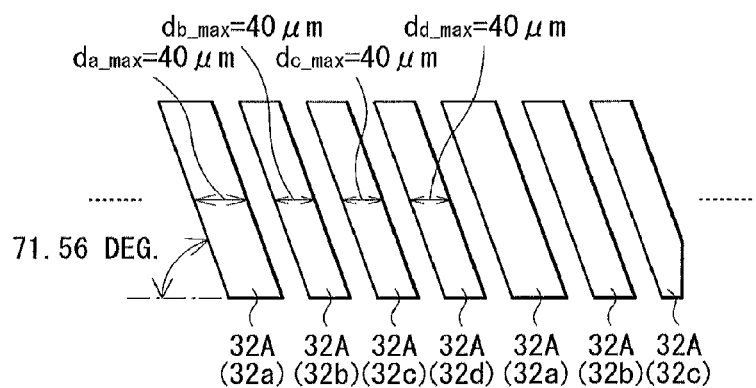
FIG. 93 is an enlarged view of the electrode layout in FIG. 92.

FIG. 92 illustrates an example of a layout of the lower electrode 32 (the sub-electrodes 32A and the wiring lines 32B and 32C) and the upper electrode 36 of the backlight 211 according to the example. FIG. 93 illustrates an enlarged view of a part of the lower electrode 32 (the sub-electrodes 32A and the wiring lines 32B and 32C) in FIG. 92.

The lower electrode 32 (the sub-electrodes 32A and the wiring lines 32B and 32C) was formed by forming an ITO film on a substrate with a size of 60 mm wide×85 mm high×0.7 mm thick and performing patterning. At that time, the plurality of sub-electrodes 32A were configured of the sub-electrodes 32a of one kind used for three-dimensional display and two-dimensional display and the sub-electrodes 32b, 32c, and 32d of three kinds used only for two-dimensional display, and the sub-electrodes 32a, 32b, 32c, and 32d were tilted in a direction intersecting with the light incident surface 10A at 71.56 degrees. Maximum widths (da_max, db_max, dc_max, and dd_max) of the sub-electrodes 32a, 32b, 32c, and 32d were 40 μm, and widths thereof at a shorter distance from the light source 20 are smaller than those at a longer distance from the light source 20. The sub-electrodes 32A were disposed in a region with a size of 50 mm wide×75 mm high.

Moreover, the upper electrode 36 was formed by forming an ITO film on a substrate with a size of 60 mm wide×85 mm high×0.7 mm thick and performing patterning. At that time, the upper electrode 36 was configured of a planar electrode 36S with a size of 50 mm wide×75 mm high and a wiring line 36S extracted from the planar electrode 36S.

After surfaces of the lower electrode 32 and the upper electrode 36 were coated with alignment films, the respective alignment films were rubbed in a predetermined direction (refer to FIGS. 92), and 4-μm spacers were sprayed on a surface of the alignment film located on the lower electrode 32, and a ring-shaped sealant was drawn on a surface of the alignment film located on the upper electrode 36. After that, the lower electrode 32 and the upper electrode 36 were bonded together to allow the planar electrode 36S to be disposed in a region facing the sub-electrodes 32A, as well as to allow the wiring line 36S to be disposed in a region facing the wiring line 32C at a longest possible distance from the light source 20. Next, a PDLC was vacuum-injected in a gap between the lower electrode 32 and the upper electrode 36 to complete a display panel. Next, seven LED light sources were disposed at intervals of 7 mm on an end surface having a length of 60 mm, and a black plate was disposed on a back surface of the display panel to complete an illumination unit.

In the illumination unit, in three-dimensional display, the sub-electrodes 32a were driven with a 60-Hz 100-V pulse, and the sub-electrodes 32b, 32c, and 32d and the upper electrode 36 were GNDs. Moreover, as necessary, the display panel was disposed on the illumination unit to form a display, and evaluation as the display was performed. Respective examples will be described in detail below.

Example 1

Figure 94:
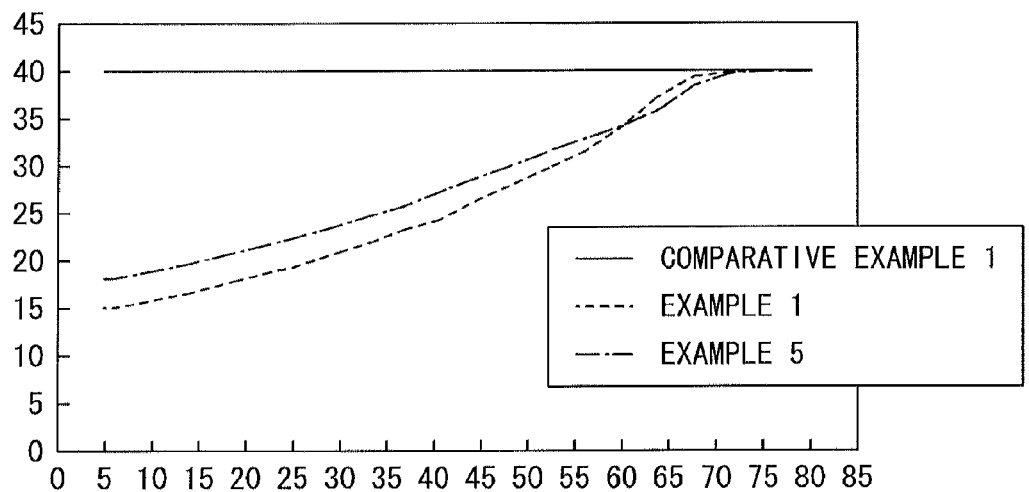
FIG. 94 is a diagram illustrating line-width variations in electrodes in FIG. 93.

The optical axis AX2 was parallel to the light incident surface 10A and the transmission axis AX10 of the polarizing plate 210B. Variations in line widths of the sub-electrodes 32b, 32c, and 32d were as illustrated in FIG. 94.

Example 2

The optical axis AX2 was oriented parallel to the light incident surface 10A, as well as in a direction forming 45° with the transmission axis AX10 of the polarizing plate 210B. Variations in line widths of the sub-electrodes 32b, 32c, and 32d were similar to Example 1.

Example 3

The optical axis AX2 was oriented parallel to the light incident surface 10A, as well as in a direction forming 90° with the transmission axis AX10 of the polarizing plate 210B. Variations in line widths of the sub-electrodes 32b, 32c, and 32d were similar to Example 1.

Example 4

The optical axis AX2 was oriented perpendicular to the light incident surface 10A as well as parallel to the transmission axis AX10 of the polarizing plate 210B. Variations in line widths of the sub-electrodes 32*b*, 32*c*, and 32*d* were similar to Example 1.

Comparative Example 1

The optical axis AX2 was oriented parallel to the light incident surface 10A and the transmission axis AX10 of the polarizing plate 210B. The line widths of the sub-electrodes 32*b*, 32*c*, and 32*d* were fixed (40 μm).

Comparative Example 2

A fixed barrier was disposed on an emission surface of the illumination unit, and a prism sheet and a diffusion sheet were disposed between the fixed barrier and the PDLC. As in the case of the respective examples, a display region had a size of 50 mm×75 mm. A barrier formed by forming a patterned chromium film on a glass surface was used as the fixed barrier. Portions corresponding to the sub-electrodes 32*a* were transparent regions, and portions corresponding to the sub-electrodes 32*b*, 32*c*, and 32*d* were light-shielded. The line widths of the transparent regions were uniform (40 μm).

Next, evaluation results will be described below.

In Example 1 and Comparative Examples 1 and 2 as illumination units, luminance in a central portion was measured. In Example 1 and Comparative Example 1, a ratio of (in three-dimensional display/in two-dimensional display) was measured, and in Comparative Example 2, a ratio of (with the fixed barrier/without the fixed barrier) was measured. Results are as follows:

| | |
|---|---|
| Example 1 | 72% |
| Comparative Example 1 | 72% |
| Comparative Example 2 | 18% |

In Comparative Example 2, luminance in three-dimensional display was greatly reduced. In Example 1 and Comparative Example 1, it was found out that light was efficiently used even in three-dimensional display by a partial luminance enhancement effect.

Next, in Example 1 and Comparative Examples 1 and 2, image quality in three-dimensional display and two-dimensional display was evaluated.

Figure 95:
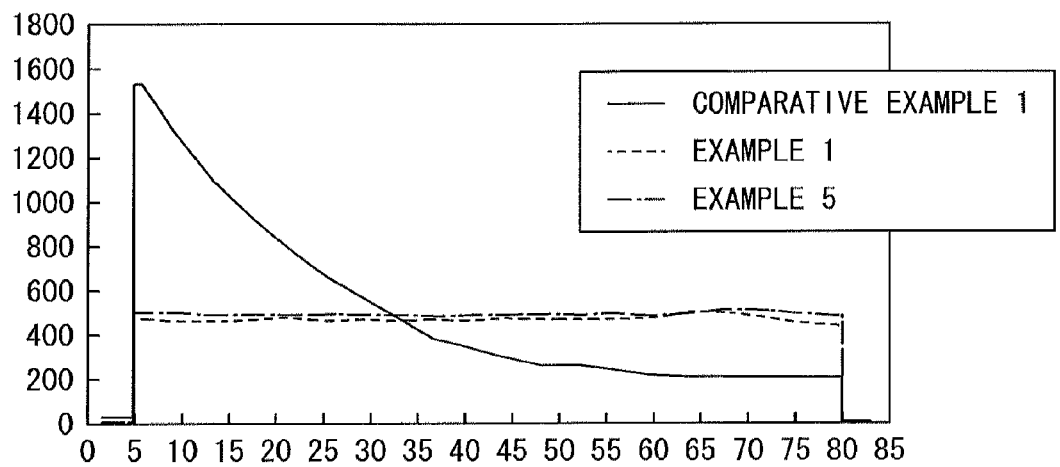
FIG. 95 is a diagram illustrating calculation results of luminance distributions in two-dimensional display in Examples 1 and 5, and Comparative Example 1.

In 3D
Example 1: 3D was perceived
Comparative Example 1: 3D was perceived
Comparative Example 2: 3D was perceived, but very dark
In two-dimensional display
Example 1: 2D was perceived
Comparative Example 1: 2D was perceived, but it was very bright in proximity to the LEDs, and brightness was nonuniform
Comparative Example 2: 2D was not allowed to be displayed Calculation results of luminance distributions in two-dimensional display in Example 1 and Comparative Example 1 are illustrated in FIG. 95 (horizontal axis: distance from LED, vertical axis: luminance). It was found out that, compared to Comparative Example 1, in Example 1, a luminance distribution was uniform. It is to be noted that the region at 5 mm or less from the LED and a region at 80 mm or over from the LED of ITO on the lower substrate were etched, because ITO in these regions was disposed out of a display region, and scattering was small; therefore, unnecessary light was not extracted.

Next, the display panel was disposed on each of the illumination units in Examples 1 to 4, and luminance in two-dimensional display in Examples 1 to 4 was measured.

Example 1: luminance 1102 cd/m$^2$
Example 2: luminance 660 cd/m$^2$
Example 3: luminance 114 cd/m$^2$
Example 4: luminance 370 cd/m$^2$ It was found out from results of Examples 1 to 3 that a ratio of (polarized light in a PDLC alignment direction): (polarized light in a direction perpendicular to the PDLC alignment direction) in the illumination units was 9:1, and when the transmission axis of the polarizing plate located on an emission side of the liquid crystal panel was aligned in the PDLC alignment direction, for example, a rubbing direction, light was allowed to be used efficiently. It was found out from results of Examples 1 and 4 that an anisotropic scattering effect of the PDLC was increased when the optical axis direction of the LED light source (a direction of a normal to the light incident surface) and the PDLC alignment direction were perpendicular, and luminance was enhanced.

Next, Example 5 with use of the upper electrode 36 having holes H will be described below. Example 5 has the same configuration as that of Example 1, except that the upper electrode 36 had the holes H. The holes H of the upper electrode 36 were formed throughout the entire display section to allow pattern density (an area of a portion including ITO per unit area) to become 75%. An ITO pattern of the sub-electrode 32A was as illustrated in FIG. 93.

Calculation results of luminance distributions in two-dimensional display in Examples 1 and 5 and Comparative Example 1 are illustrated in FIG. 95. It was found out that, compared to Comparative Example 1, in Example 5, the luminance distribution was uniform. It is to be noted that the region at 5 mm or less from the LED and the region at 80 mm or over from the LED of ITO on the lower substrate were etched, because ITO in these regions was disposed out of the display region, and scattering was small; therefore, unnecessary light was not extracted. Moreover, compared to Example 1, in Example 5, luminance was entirely higher, because when ITO had holes, unnecessary absorption was suppressed.

Figure 96:
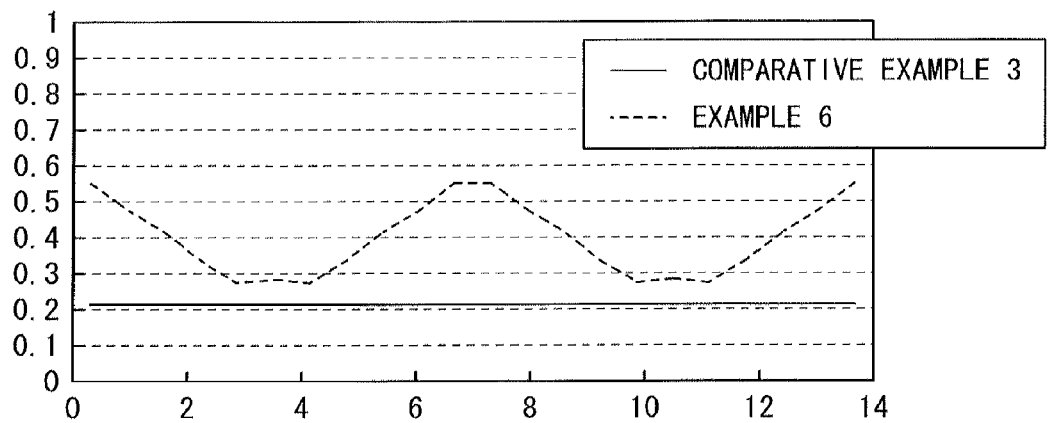
FIG. 96 is a diagram illustrating pattern density of the upper electrode in Example 6.
Figure 97:
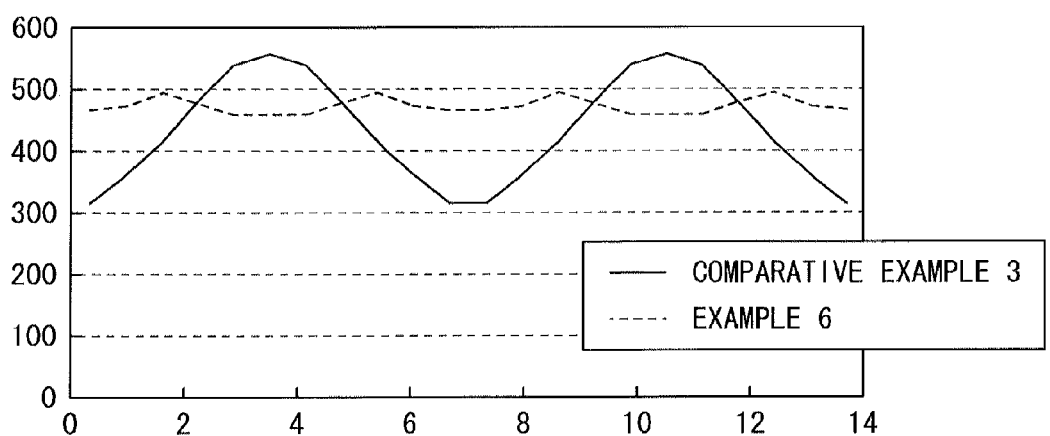
FIG. 97 is a diagram illustrating a calculation result of a luminance distribution in Example 6.

Next, Example 6 with use of the upper electrode 36 having the holes H will be described below. In Example 6, the ITO pattern of the upper electrode 36 was different from that in Example 5, and Example 6 had the same configuration as that in Example 1, except that a distance from the light incident surface 10A to the display region was reduced to 2 mm. In the upper electrode 36 in Example 6, radii of the holes H arranged in a direction parallel to the light incident surface 10A were larger at a shorter distance from the LED light source, and smaller at a longer distance from the LED light source. The pattern density in a region at a distance of 2 mm from the light incident surface 10A was as illustrated in FIG. 96. It is to be noted that the LED light sources were disposed at positions of 3.5 mm and 10.5 mm in the drawing. Comparative Example 3 has the same configuration as that in Comparative Example 1, except that the distance from the light incident surface to the display region was reduced to 2 mm. When luminance distributions in a Y direction at a distance of 2 mm from the light incident surface in Example 6 and Comparative Example 3 were calculated, the luminance distributions were as illustrated in FIG. 97. It was found out that, in Example 6, luminance was uniform, and brightness variations caused by the LED light sources were reduced, and image quality was improved.

It is to be noted that the application is allowed to have the following configurations.

(1) An illumination unit including:

a first transparent substrate and a second transparent substrate being separated from and facing each other;

a light source emitting light to a first end surface of the first transparent substrate or the second transparent substrate;

a light modulation layer disposed in a gap between the first transparent substrate and the second transparent substrate, and exhibiting a scattering property or transparency with respect to light from the light source, depending on magnitude of an electric field; and an electrode generating an electric field in the light modulation layer, when a voltage is applied thereto, in which the light modulation layer generates a plurality of strip-like illumination light beams extending in a direction intersecting with the first end surface with use of light from the light source, when an electric field for a three-dimensional display mode is applied from the electrode to the light modulation layer, and a light emission area per unit area of each of the strip-like illumination light beams varies with a distance from the light source.

(2) The illumination unit according to (1), in which each of the strip-like illumination light beams has one continuous strip-like light emission shape, or a light emission shape configured of a plurality of block-like illumination light beams arranged in one line.

(3) The illumination unit according to (1) or (2), in which a width of each of the strip-like illumination light beams varies with a distance from the light source.

(4) The illumination unit according to any one of (1) to (3), in which central lines in a width direction of the strip-like illumination light beams are parallel to one another.

(5) The illumination unit according to (1) or (2), in which an edge of each of the strip-like illumination light beams has a concavo-convex shape, and concavo-convex amplitude of the concavo-convex shape varies with a distance from the light source.

(6) The illumination unit according to any one of (1) to (5), in which the strip-like illumination light beams extend in a direction orthogonal to the first end surface.

(7) The illumination unit according to any one of (1) to (5), in which the strip-like illumination light beams extend in a direction intersecting with the first end surface as well as in a direction intersecting with an arrangement direction of a plurality of pixels included in a display panel, when the illumination unit is used as a backlight of the display panel.

(8) The illumination unit according to any one of (1) to (7), in which the electrode has a shape corresponding to a light emission shape of the strip-like illumination light beams.

(9) The illumination unit according to (8), in which the electrode includes a plurality of strip-like electrodes extending in an extending direction of the strip-like illumination light beams, or a plurality of sub-electrodes arranged in the extending direction of the strip-like illumination light beams as well as in a direction intersecting with the strip-like illumination light beams.

(10) The illumination unit according to (9), in which the electrode includes, on a surface of the first transparent substrate, the plurality of strip-like electrodes or the plurality of sub-electrodes, and a wiring line connecting some or all of the plurality of strip-like electrodes or the plurality of sub-electrodes to one another, and the electrode further includes, on a surface of the second transparent substrate, a planar electrode mainly formed in a region facing the strip-like electrodes or the sub-electrodes.

(11) The illumination unit according to (8), in which the electrode includes a plurality of strip-like electrodes extending in an extending direction of the strip-like illumination light beams, and a width of each of the strip-like electrodes varies with a distance from the light source.

(12) The illumination unit according to (8), in which the electrode includes a plurality of sub-electrodes arranged in an extending direction of the strip-like illumination light beams as well as in a direction intersecting with the strip-like illumination light beams, and a width of each of the sub-electrodes varies with a distance from the light source.

(13) The illumination unit according to (8), in which the electrode includes a plurality of strip-like electrodes extending in an extending direction of the strip-like illumination light beams, an edge of each of the strip-like electrodes has a concavo-convex shape, and concavo-convex amplitude of the concavo-convex shape varies with a distance from the light source.

(14) The illumination unit according to (8), in which the electrode includes a plurality of sub-electrodes arranged in an extending direction of the strip-like illumination light beams as well as in a direction intersecting with the strip-like illumination light beams, an edge of each of the sub-electrodes has a concavo-convex shape, and concavo-convex amplitude of the concavo-convex shape varies with a distance from the light source.

(15) The illumination unit according to (3), in which an absolute value of a first voltage allowing the light modulation layer to exhibit the scattering property is higher than an absolute value of a second voltage allowing the light modulation layer to exhibit transparency, and the width of each of the strip-like illumination light beams is smaller at a shorter distance from the light source and larger at a longer distance from the light source.

(16) The illumination unit according to (5), in which an absolute value of a first voltage allowing the light modulation layer to exhibit a scattering property is higher than an absolute value of a second voltage allowing the light modulation layer to exhibit transparency, and the concavo-convex amplitude of the concavo-convex shape is larger at a shorter distance from the light source and smaller at a longer distance from the light source.

(17) The illumination unit according to (9), in which an absolute value of a first voltage allowing the light modulation layer to exhibit the scattering property is higher than an absolute value of a second voltage allowing the light modulation layer to exhibit transparency, and a width of each of the strip-like electrodes or a width of one virtual strip-like electrode is smaller at a shorter distance from the light source and larger at a longer distance from the light source, the virtual strip-like electrode being configured of two or more of the plurality of sub-electrodes arranged in the extending direction of the strip-like illumination light beams.

(18) The illumination unit according to (13), in which
an absolute value of a first voltage allowing the light modulation layer to exhibit a scattering property is higher than an absolute value of a second voltage allowing the light modulation layer to exhibit transparency, and
the concavo-convex amplitude of the concavo-convex shape is larger at a shorter distance from the light source and smaller at a longer distance from the light source.

(19) The illumination unit according to (14), in which
an absolute value of a first voltage allowing the light modulation layer to exhibit the scattering property is higher than an absolute value of a second voltage allowing the light modulation layer to exhibit transparency, and
the concavo-convex amplitude of the concavo-convex shape is larger at a shorter distance from the light source and smaller at a longer distance from the light source.

(20) The illumination unit according to (1), in which
the light modulation layer includes a first region and a second region both having optical anisotropy, and having response speeds with respect to an electric field,
the response speeds being different from each other,
the first region mainly includes a liquid crystal material,
the second region mainly includes a polymer material, and
an optical-axis component in the first region and an optical-axis component in the second region are aligned in a direction parallel to each other, when the light modulation layer exhibits transparency.

(21) The illumination unit according to (10), in which
the planar electrode has a plurality of holes, and
radii of the holes arranged in a direction orthogonal to the first end surface are larger at a shorter distance from the light source and smaller at a longer distance from the light source.

(22) The illumination unit according to (21), in which
the radii of the holes arranged in a direction parallel to the first end surface are larger at a shorter distance from the light source and smaller at a longer distance from the light source.

(23) A display including:
a display panel being driven based on an image signal; and
an illumination unit illuminating the display panel, the illumination unit including
a first transparent substrate and a second transparent substrate being separated from and facing each other,
a light source emitting light to a first end surface of the first transparent substrate,
a light modulation layer disposed in a gap between the first transparent substrate and the second transparent substrate, and exhibiting a scattering property or transparency with respect to light from the light source, depending on magnitude of an electric field, and
an electrode generating an electric field in the light modulation layer, when a voltage is applied thereto,
in which the light modulation layer generates plurality of strip-like illumination light beam extending in a direction intersecting with the first end surface with use of light from the light source, when an electric field for a three-dimensional display mode is applied from the electrode to the light modulation layer, and
a light emission area per unit area of each of the strip-like illumination light beams varies with a distance from the light source.

(24) The display according to (23), further including a pair of polarizing plates facing each other with the display panel in between,
in which the light modulation layer includes a first region and a section region, the first region having optical anisotropy and higher responsivity with respect to an electric field, the second region having optical anisotropy and lower responsivity with respect to an electric field,
the first region and the second region each mainly have an optical-axis component in a direction parallel to a transmission axis of one polarizing plate located closer to the illumination unit of the pair of polarizing plates, when the light modulation layer exhibits transparency, and
the second region mainly has an optical-axis component in a direction parallel to the transmission axis of the polarizing plate located closer to the illumination unit of the pair of polarizing plate, and the first region mainly has an optical-axis component in a direction intersecting with or orthogonal to an optical axis of the second region as well as in a direction intersecting with or orthogonal to the first transparent substrate, when the light modulation layer exhibits the scattering property.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. An illumination unit comprising:
a first transparent substrate and a second transparent substrate being separated from and facing each other;
a light source emitting light to a first end surface of the first transparent substrate or the second transparent substrate;
a light modulation layer disposed in a gap between the first transparent substrate and the second transparent substrate, and exhibiting a scattering property or transparency with respect to light from the light source, depending on magnitude of an electric field; and
an electrode generating an electric field in the light modulation layer, when a voltage is applied thereto,
wherein the light modulation layer generates a plurality of strip-like illumination light beams extending in a direction intersecting with the first end surface with use of light from the light source, when an electric field for a three-dimensional display mode is applied from the electrode to the light modulation layer, and
a light emission area per unit area of each of the strip-like illumination light beams continuously varies with a distance from the light source,
wherein the electrode has a shape corresponding to a light emission shape of the strip-like illumination light beams,
wherein the electrode includes a plurality of strip-like electrodes extending in an extending direction of the strip-like illumination light beams, and
wherein a width of each of the strip-like electrodes continuously varies with a distance from the light source.

2. The illumination unit according to claim 1, wherein
each of the strip-like illumination light beams has one continuous strip-like light emission shape, or a light emission shape configured of a plurality of block-like illumination light beams arranged in one line.

3. The illumination unit according to claim 1, wherein central lines in a width direction of the strip-like illumination light beams are parallel to one another.

4. The illumination unit according to claim 1, wherein
an edge of each of the strip-like illumination light beams has a concavo-convex shape, and
concavo-convex amplitude of the concavo-convex shape varies with a distance from the light source.

5. The illumination unit according to claim 4, wherein
an absolute value of a first voltage allowing the light modulation layer to exhibit the scattering property is higher than an absolute value of a second voltage allowing the light modulation layer to exhibit transparency, and
the concavo-convex amplitude of the concavo-convex shape is larger at a shorter distance from the light source and smaller at a longer distance from the light source.

6. The illumination unit according to claim 1, wherein
the strip-like illumination light beams extend in a direction orthogonal to the first end surface.

7. The illumination unit according to claim 1, wherein
the strip-like illumination light beams extend in a direction intersecting with the first end surface as well as in a direction intersecting with an arrangement direction of a plurality of pixels included in a display panel, when the illumination unit is used as a backlight of the display panel.

8. The illumination unit according to claim 1, wherein
the electrode includes, on a surface of the first transparent substrate, the plurality of strip-like electrodes, and a wiring line connecting some or all of the plurality of strip-like electrodes to one another, and
the electrode further includes, on a surface of the second transparent substrate, a planar electrode mainly formed in a region facing the strip-like electrodes.

9. The illumination unit according to claim 8, wherein
the planar electrode has a plurality of holes, and
radii of the holes arranged in a direction orthogonal to the first end surface are larger at a shorter distance from the light source and smaller at a longer distance from the light source.

10. The illumination unit according to claim 9, wherein
the radii of the holes arranged in a direction parallel to the first end surface are larger at a shorter distance from the light source and smaller at a longer distance from the light source.

11. The illumination unit according to claim 1, wherein
an absolute value of a first voltage allowing the light modulation layer to exhibit the scattering property is higher than an absolute value of a second voltage allowing the light modulation layer to exhibit transparency, and
the width of each of the strip-like illumination light beams gradually increases in a direction away from the light source.

12. The illumination unit according to claim 1, wherein
an absolute value of a first voltage allowing the light modulation layer to exhibit the scattering property is higher than an absolute value of a second voltage allowing the light modulation layer to exhibit transparency, and
a width of each of the strip-like electrodes or a width of a grouping of two or more strip-like electrodes gradually increases in a direction away from the light source.

13. The illumination unit according to claim 4, wherein
an absolute value of a first voltage allowing the light modulation layer to exhibit the scattering property is higher than an absolute value of a second voltage allowing the light modulation layer to exhibit transparency, and
the concavo-convex amplitude of the concavo-convex shape is larger at a shorter distance from the light source and smaller at a longer distance from the light source.

14. The illumination unit according to claim 1, wherein
the light modulation layer includes a first region and a second region both having optical anisotropy, and having response speeds with respect to an electric field, the response speeds being different from each other,
the first region mainly includes a liquid crystal material,
the second region mainly includes a polymer material, and
an optical-axis component in the first region and an optical-axis component in the second region are aligned in a direction parallel to each other, when the light modulation layer exhibits transparency.

15. A display comprising:
a display panel being driven based on an image signal; and
an illumination unit illuminating the display panel, the illumination unit including
a first transparent substrate and a second transparent substrate being separated from and facing each other,
a light source emitting light to a first end surface of the first transparent substrate,
a light modulation layer disposed in a gap between the first transparent substrate and the second transparent substrate, and exhibiting a scattering property or transparency with respect to light from the light source, depending on magnitude of an electric field, and
an electrode generating an electric field in the light modulation layer, when a voltage is applied thereto,
wherein the light modulation layer generates a plurality of strip-like illumination light beams extending in a direction intersecting with the first end surface with use of light from the light source, when an electric field for a three-dimensional display mode is applied from the electrode to the light modulation layer, and
a light emission area per unit area of each of the strip-like illumination light beams continuously varies with a distance from the light source,
wherein the electrode has a shape corresponding to a light emission shape of the strip-like illumination light beams,
wherein the electrode includes a plurality of strip-like electrodes extending in an extending direction of the strip-like illumination light beams, and
wherein a width of each of the strip-like electrodes continuously varies with a distance from the light source.

16. The display according to claim 15, further comprising
a pair of polarizing plates facing each other with the display panel in between,
wherein the light modulation layer includes a first region and a section region, the first region having optical anisotropy and higher responsivity with respect to an electric field, the second region having optical anisotropy and lower responsivity with respect to an electric field,
the first region and the second region each mainly have an optical-axis component in a direction parallel to a transmission axis of one polarizing plate located closer to the illumination unit of the pair of polarizing plates, when the light modulation layer exhibits transparency, and the second region mainly has an optical-axis component in a direction parallel to the transmission axis of the polarizing plate located closer to the illumination unit of the pair of polarizing plate, and the first region mainly has an optical-axis component in a direction intersecting with or orthogonal to an optical axis of the second region as well as in a direction intersecting with or orthogonal to the first transparent substrate, when the light modulation layer exhibits the scattering property.

* * * * *